US012812277B2

(12) United States Patent
Williamson et al.

(10) Patent No.: US 12,812,277 B2
(45) Date of Patent: Nov. 24, 2026

(54) SPHEROID SPEAKER DEVICE

(71) Applicant: Sound United, LLC, Irvine, CA (US)

(72) Inventors: Timothy David Williamson, Chiswick (GB); Peter Joseph Hamblin, Epsom (GB); Maximilian Vincent Wozniak, Carshalton (GB); Robert James Wilson, Islington (GB); Wilson E. Taylor, Jr., Austin, TX (US); Larry E. Hand, Meridian, MS (US); Mark Robert Westcott, Battle Ground, WA (US); Mark Edward Trainer, Simi Valley, CA (US); Ellie Rei Fukuda, Los Angeles, CA (US); Joel Robert Sietsema, Carlsbad, CA (US); Paul Michael Belanger, Guelph (CA); Matthew Patrick Lyons, York, PA (US); Timothy Steven DeYoung, Severn, MD (US); Werner Kirchmann, Dornbirn (AT); Ralph Wilhelm Hermann, Hard (AT)

(73) Assignee: SOUND UNITED, LLC, Irvine, CA (US)

( * ) Notice: Subject to any disclaimer, the term of this patent is extended or adjusted under 35 U.S.C. 154(b) by 201 days.

(21) Appl. No.: 18/347,507

(22) Filed: Jul. 5, 2023

(65) Prior Publication Data

US 2024/0080594 A1 Mar. 7, 2024

Related U.S. Application Data

(60) Provisional application No. 63/367,812, filed on Jul. 6, 2022.

(51) Int. Cl.
*H04R 1/02* (2006.01)

(52) U.S. Cl.
CPC ........... *H04R 1/02* (2013.01); *H04R 2201/02* (2013.01)

(58) Field of Classification Search
CPC .......... H04R 1/025; H04R 1/08; H04R 1/403; H04R 1/406; H04R 1/02; H04R 1/028;
(Continued)

(56) References Cited

U.S. PATENT DOCUMENTS

| | | | | |
|---|---|---|---|---|
| 3,720,787 | A | 3/1973 | Ishii et al. | |
| 9,793,869 | B1 * | 10/2017 | Snyder | H04M 1/02 |
| 10,427,374 | B2 * | 10/2019 | Hamada | B32B 5/26 |
| 10,979,810 | B2 * | 4/2021 | Mata Magana | F21V 33/0056 |

(Continued)

FOREIGN PATENT DOCUMENTS

| | | |
|---|---|---|
| DE | 24 40 844 | 3/1976 |
| DE | 10 2006 047228 | 4/2008 |

(Continued)

OTHER PUBLICATIONS

Sony Europe, "Introducing the Sony SRS-XG500 Wireless Speaker," URL:https://www.youtube.com/watch?v=YxtgF3hUQGI, retrieved Oct. 31, 2023, dated Apr. 22, 2021; 1 page.

*Primary Examiner* — Ahmad F. Matar
*Assistant Examiner* — Sabrina Diaz
(74) *Attorney, Agent, or Firm* — Nieves IP Law Group, LLC; Peter A. Nieves

(57) ABSTRACT

A speaker can have a main body with a generally spheroidal shape, which can be supported standing on its end. The speaker can include a subwoofer that faces forward. A plurality of mid-range drivers can be distributed around the sub-woofer, facing generally forward and radially outward. A plurality of tweeters can be distributed around the sub-woofer, facing generally forward and generally outward. The outer housing portion of the speaker can be covered with a fabric material. A user interface ring 162 can be touch sensitive to receive input, and can have a plurality of lights
(Continued)

that can be illuminated separately to convey information to the user.

20 Claims, 52 Drawing Sheets

(58) Field of Classification Search
CPC .......... H04R 1/26; H04R 1/323; H04R 1/345; H04R 1/342; H04R 1/38; H04R 1/2819; H04R 1/2826; H04R 1/2842; H04R 1/026; H04R 1/021; H04R 2201/02; H04R 2201/021; H04R 2201/025; H04R 5/02; H04R 2205/021; H04R 2499/11; H04R 3/12; H04R 9/022; H04S 7/40
USPC .................. 381/386, 345, 87, 332, 334, 336
See application file for complete search history.

(56) References Cited

U.S. PATENT DOCUMENTS

| | | | | |
|---|---|---|---|---|
| 2013/0028457 | A1* | 1/2013 | Yeh | H04R 1/10<br>381/334 |
| 2015/0195635 | A1* | 7/2015 | Garfio | H04R 31/006<br>381/386 |
| 2018/0091901 | A1* | 3/2018 | Stanley | H04R 1/025 |
| 2019/0394547 | A1* | 12/2019 | Lemons | H04R 1/028 |
| 2023/0171534 | A1* | 6/2023 | Li | H04S 1/007<br>381/300 |

FOREIGN PATENT DOCUMENTS

| | | |
|---|---|---|
| WO | WO 2008/110199 | 9/2008 |
| WO | WO 2021/044078 | 3/2021 |
| WO | WO 2021/076051 | 4/2021 |

* cited by examiner

During playback, tap anywhere on the touch ring to pause.

The volume tick pulses to show that playback is paused. Tapping again...

Product shows the current volume with a single tick during playback

Proximity brings up the volume level by illuminating the ticks from zero and showing maximum volume A long press on the touch ring moves the volume to that point Once the volume is altered it remains on for a timeout seconds and then fades...

...back to the rest state

Swipe the touch ring clockwise to start the volume increasing at a preset speed.
Swiping counter-clockwise will make the volume decrease.

When the user stops touching, the volume stays at the current level.

Once the volume is altered it remains on for a timeout seconds and then fades...

...back to the rest state

SPHEROID SPEAKER DEVICE

CROSS-REFERENCE TO RELATED APPLICATIONS

This application claims the benefit of U.S. Provisional Patent Application No. 63/367,812, filed Jul. 6, 2022, and titled SPEAKERS. The entirety contents of each of the above-identified application(s) are hereby incorporated by reference herein and made part of this specification for all that they disclose.

BACKGROUND

Field of the Disclosure

Some embodiments disclosed herein relate to speakers.

Description of the Related Art

Although various speaker systems exist, there remains a need for improved speakers.

SUMMARY

Certain example aspects of the present disclosure are summarized below for illustrative purposes. The disclosure is not limited to the specific implementations recited herein. Aspects of the disclosure may include several novel features, no single one of which is solely responsible for its desirable attributes.

Various aspects of the disclosure can relate to a speaker, which can include an outer housing portion that substantially conforms to the shape of an spheroid, which can have an axis of rotation that is substantially horizontal. The speaker can have a first driver positioned facing forward in a direction that is substantially parallel with the axis of rotation. The speaker can have a plurality of additional drivers that are distributed around the first driver. Each of the plurality of additional drivers can partially face forward and can be angled partially outward away from the axis of rotation.

The first driver can be a sub-woofer. The plurality of additional drivers can include at least two mid-range drivers, and at least two tweeters. An axis of the first driver can be substantially collinear with the axis of rotation. Each of the plurality of additional drivers can be angled relative to the axis of rotation by an angle between about 30 degrees and about 60 degrees. Each of the plurality of additional drivers can be angled relative to the axis of rotation by an angle between about 40 degrees and about 50 degrees.

The speaker can include a front cover, which can be positioned in front of the first driver. A front surface of the front cover can substantially conform to the shape of the spheroid. The front cover can be suspended with a gap between the outer housing portion and the front cover. The front cover can include at least one light source that illuminates a ring. The speaker can include a user interface ring that includes a plurality of lights arranged in a circle on a front of the speaker. The lights of the user interface ring can be individually controlled. The user interface ring can be touch sensitive to receive touch inputs. The user interface ring can be configured to indicate a current volume level by illuminating one of the lights that corresponds to the current volume level. A subset of the lights on the user interface ring can correspond to an available volume range. The user interface ring can be configured to indicate a current volume level by illuminating one of the lights that corresponds to the current volume level and/or by illuminating the lights that correspond to volume levels lower than the current volume level. The user interface ring can be configured to also illuminate the light that corresponds to a maximum volume level.

The outer housing portion can be covered with a fabric covering. The fabric covering can be a seamless knitted fabric. The fabric covering can include a first opening at a first or front end, and a second opening at a second or back end. The fabric covering can include a first channel at the first or front end. A ring (e.g., a support ring) can extends through the first channel. The fabric covering can include a second channel at the second or back end. A drawstring can be in the second channel. The fabric covering can be made of a plastic material (e.g., Polyethersulfone (PES)).

The speaker can include an amplifier that includes a printed circuit board that extends at least partially around the first driver. The speaker can include an amplifier that has gallium nitride (GaN) transistors.

Various aspect of the disclosure can relate to a method for attaching a fabric to a speaker. The method can include accessing the fabric, which can include a generally cylindrical fabric body, a first opening at a first end of the fabric body, and a second opening at a second end of the fabric body. The method can include inverting the fabric. The method can include attaching the first end of the fabric to a first portion of a housing. The method can include at least partially assembling the housing. The method can include folding the fabric over the housing to uninvert the fabric. The method can include attaching the second end of the fabric to a second portion of the housing.

The fabric can include a first channel at the first end of the fabric. A ring can extend through the first channel. The method can include seating the ring onto a front outer housing portion with an opening. The method can include passing the inverted fabric through the opening. The fabric can include a second channel at the second end of the fabric. A drawstring can extend through the second channel. The fabric can be made of a plastic material. The fabric can be made of Polyethersulfone. The fabric can be knitted. The fabric can be seamless. The fabric can produce acoustic loss of less than about 3 dB across 100 Hz to 20 kHz.

Various aspects of the disclosure can relate to a speaker, which can include an outer housing portion that substantially conforms to the shape of a spheroid. The speaker can include a fabric covering the outer housing. The fabric covering can be a seamless knitted fabric. The fabric can include a first opening at a first or front end, and a second opening at a second or back end. The fabric can include a first channel at the first or front end. A ring can extend through the first channel. The fabric can includes a second channel at the second or back end. A drawstring can be in the second channel. The fabric can be made of a plastic material. The fabric can include Polyethersulfone. The fabric can be knitted. The fabric can be seamless. The fabric can produce acoustic loss of less than about 3 dB across 100 Hz to 20 kHz.

The speaker can include a driver. In some cases, the fabric not disposed in front of the driver. The speaker can include a front cover disposed in front of the driver. The front cover can be suspended to form a gap between the front cover and the outer housing portion. The speaker can include a plurality of additional drivers that are distributed around the driver, wherein each of the plurality of additional drivers are angled outward away from the direction of the driver.

BRIEF DESCRIPTION OF THE DRAWINGS

Certain embodiments will be discussed with reference to the following figures, wherein like reference numerals can refer to similar features throughout. The figures are provided for illustrative purposes and the innovations are not limited to the specific implementations illustrated in the figures.

DETAILED DESCRIPTION OF CERTAIN EMBODIMENTS

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
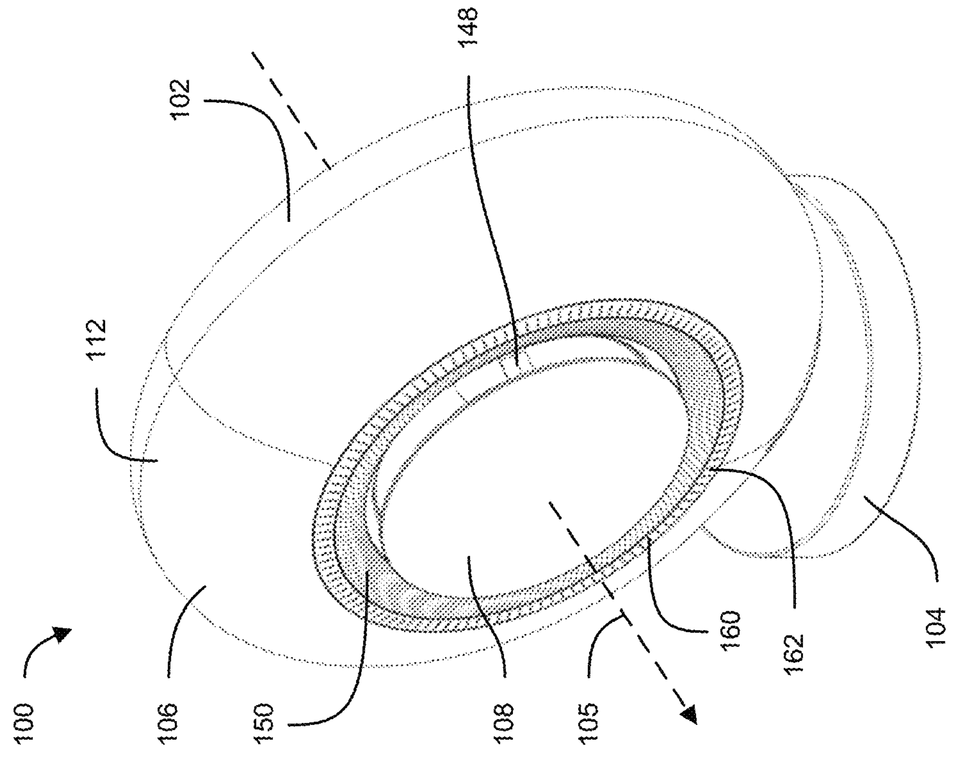
FIG. 1 is a front perspective view of an example speaker.
Figure 2:
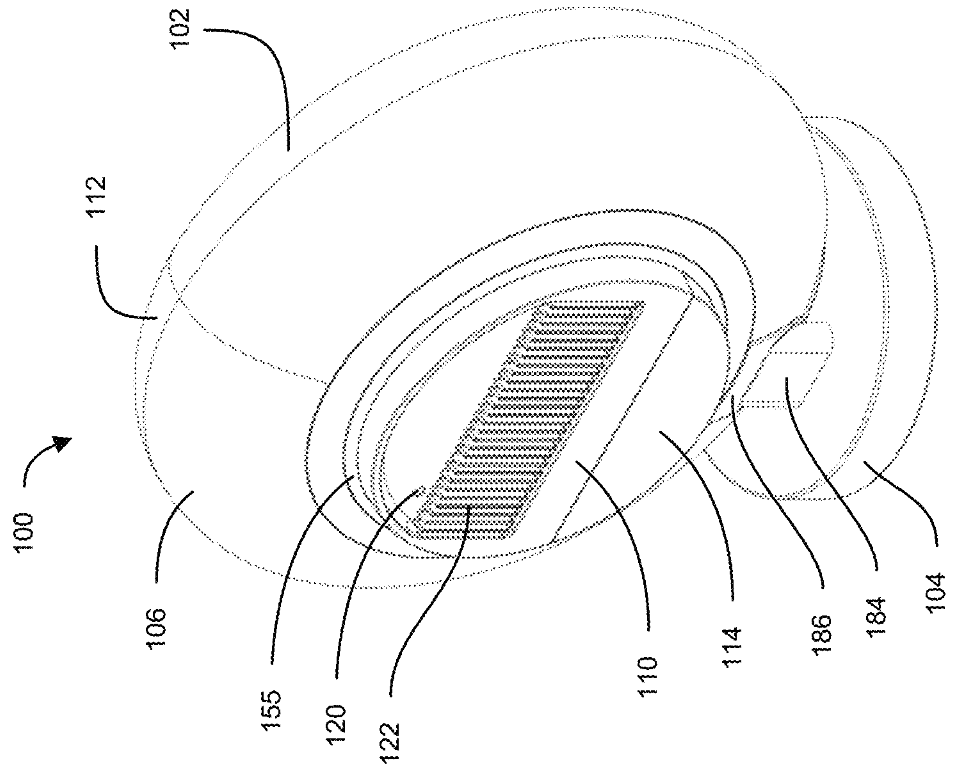
FIG. 2 is a rear perspective view of the example speaker.
Figure 3:
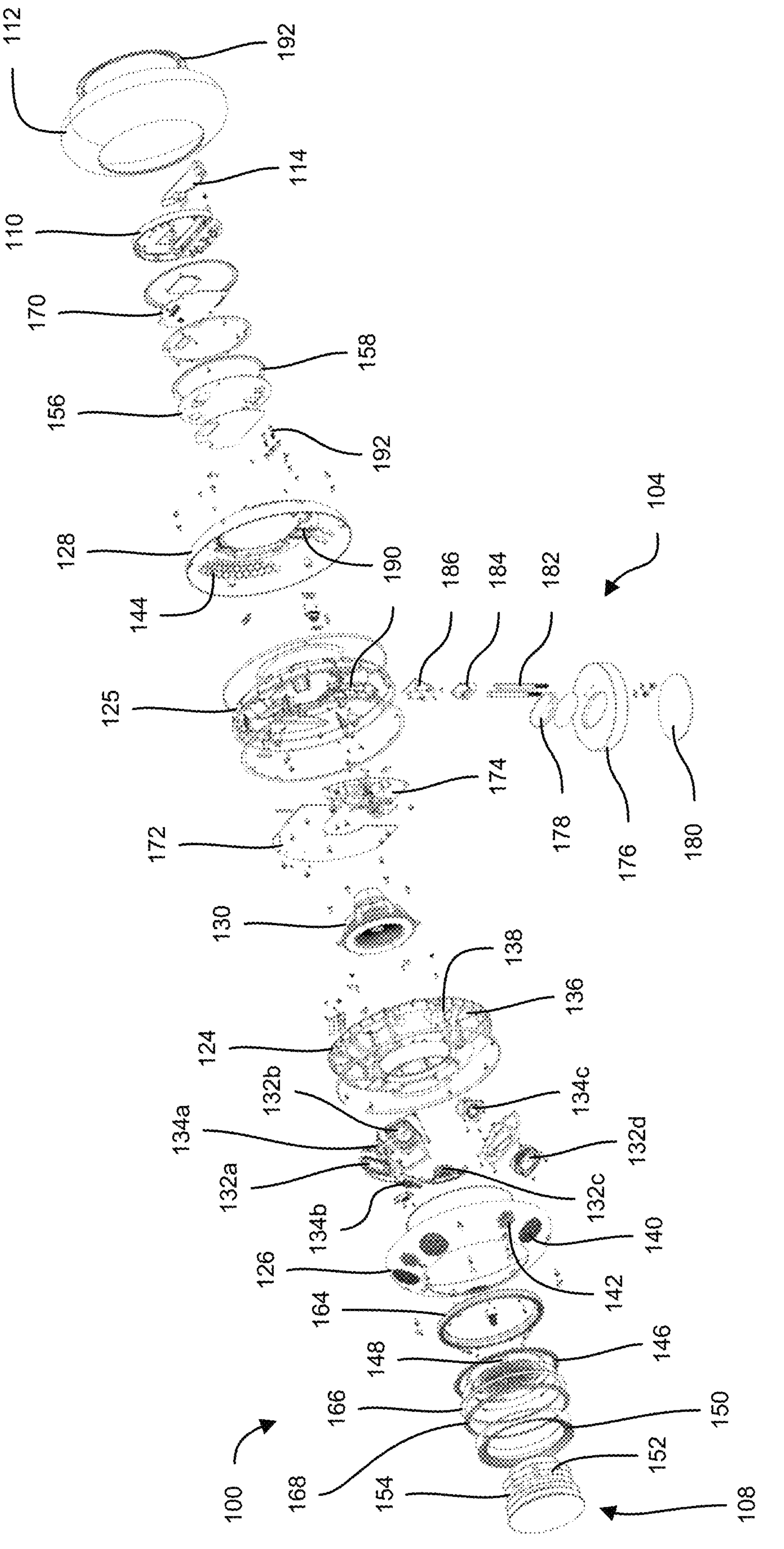
FIG. 3 is an exploded view of the example speaker.
Figure 4:
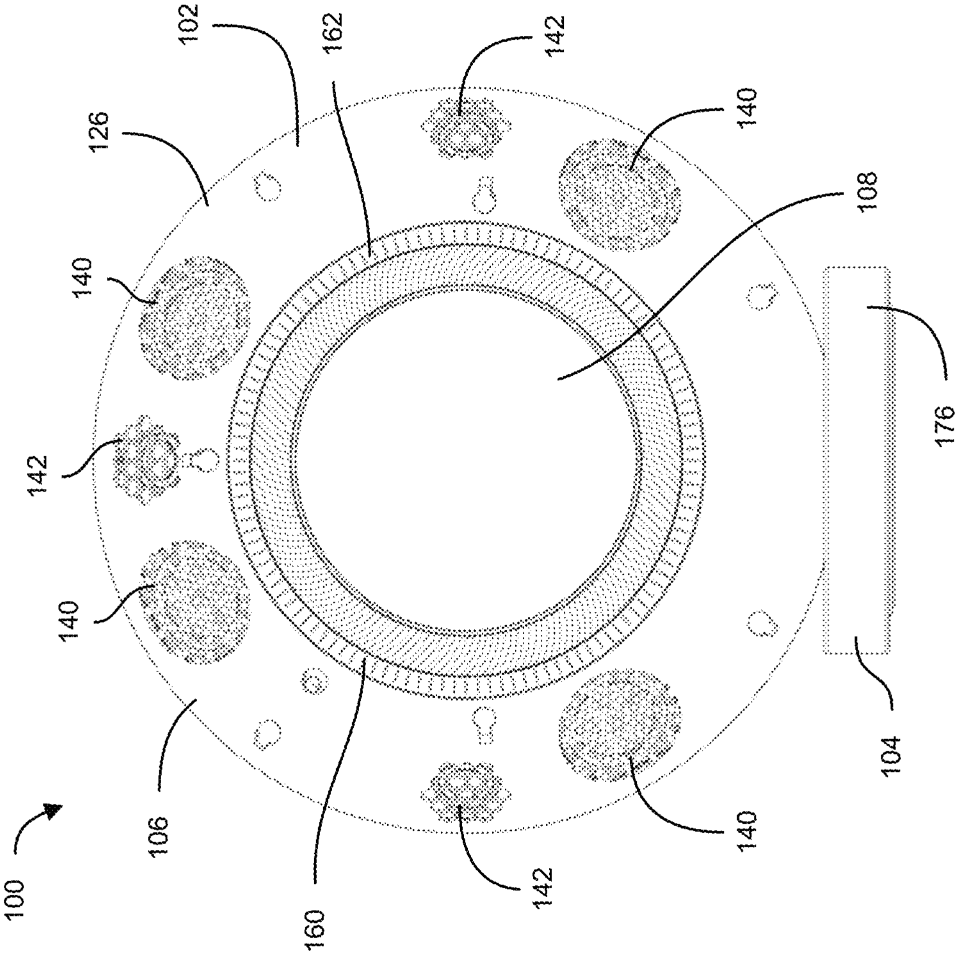
FIG. 4 is a front view of the example speaker with the fabric omitted.
Figure 5:
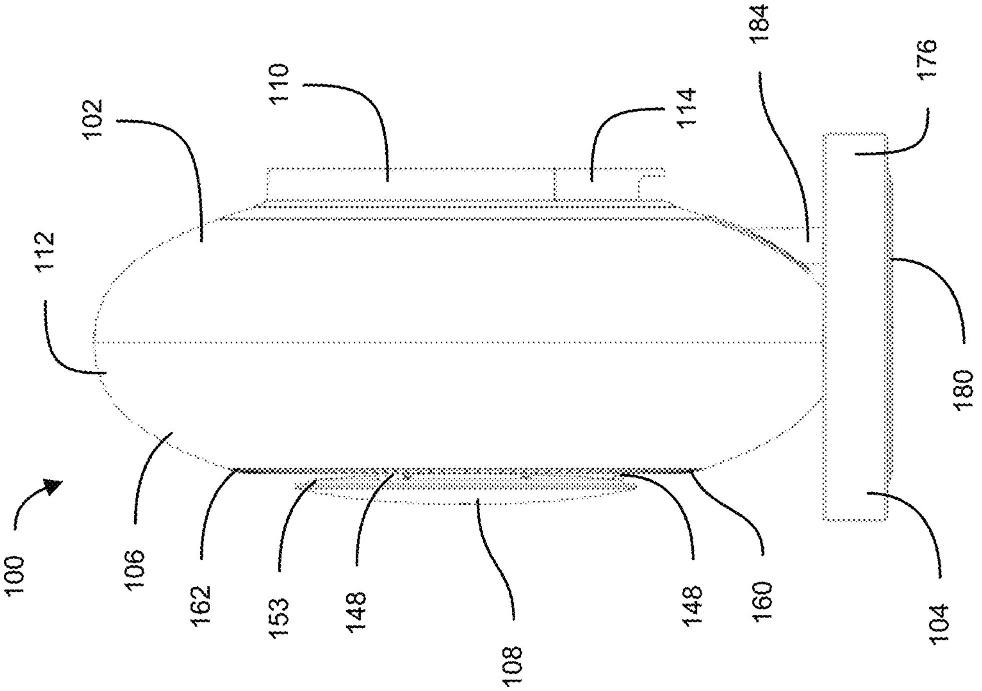
FIG. 5 is a side view of the example speaker.
Figure 7:
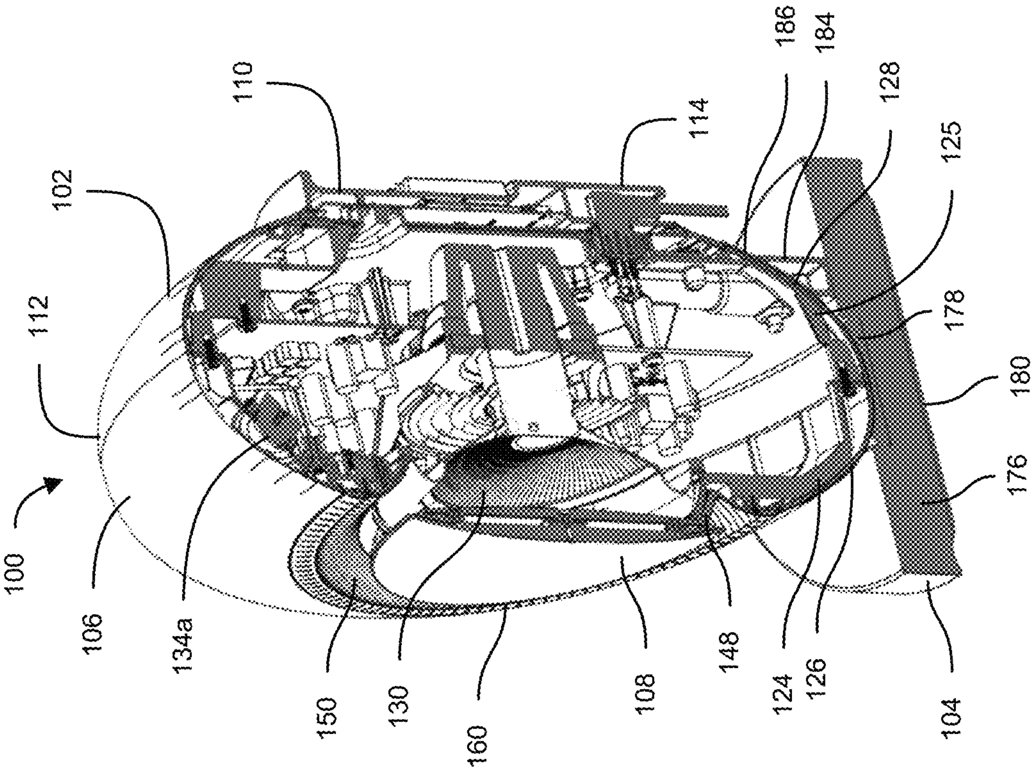
FIG. 7 is a perspective cross-sectional view of the example speaker.
Figure 6:
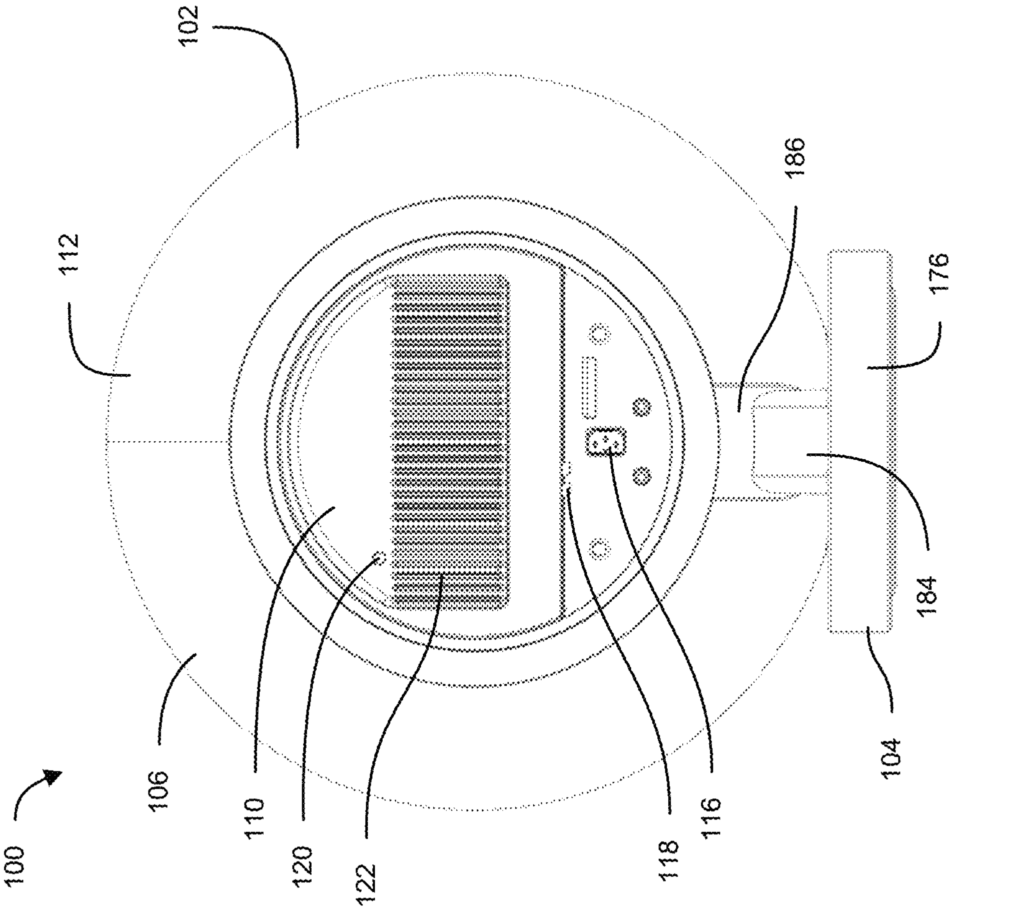
FIG. 6 is a rear view of the example speaker.

FIG. 1 is a front perspective view of an example embodiment of a speaker 100. FIG. 2 is a rear perspective view of the speaker 100. FIG. 3 is an exploded view of the speaker 100. FIG. 4 is a front view of the speaker 100. FIG. 5 is a side view of the speaker 100. FIG. 6 is a rear view of the speaker 100. FIG. 7 is a perspective cross-sectional view of the speaker 100.

The speaker 100 can have a housing 102 or main body portion, and a support 104, such as a base or other support structure. The speaker 100 (e.g., the housing 102 or main body portion of the speaker 100) can have a shape that generally corresponds to a spheroid or an ellipsoid (e.g., an oblate spheroid). The speaker 100 can have a first or outer housing portion 106, which can have a shape that generally corresponds to the surface of a spheroid or an ellipsoid with an opening through the center. The outer housing 106 can have a shape that generally conforms to the surface of a toroid, such as a toroidal shape with a larger center opening so that the surface does not taper in towards the center. The outer housing 106 can have a shape that generally corresponds to a semicircle, or a portion of an ellipse, or a parabola, that is revolved around an axis 105 (e.g., an axis of revolution) so that the curved portion faces laterally outward (e.g., to form a convex shape). The outer housing 106 and/or the housing 102 or main body portion of the speaker 100 can be generally rotationally symmetrical about the axis 105. The support 104 (e.g., the base) can support the housing 102 or main body of the speaker 100 so that the axis 105 is substantially horizontal. The housing 102 can be stood up on its end, as shown. The outer housing portion 106 can be covered with a fabric 112, as discussed herein. In FIG. 4, the fabric 112 is omitted from view.

The speaker 100 can have a front cover 108, which can be referred to herein as a second or front housing portion. As can be seen in the side view of FIG. 5, the front surface of the front cover 108 can be curved, and in some cases can substantially conform to the same shape (e.g., the spheroid or ellipsoid shape) as the outer housing 106. There can be a gap between the periphery of the front cover 108 and the outer housing 106, which can facilitate output of sound from the speaker 100. The curvature of the front cover 108 can align with the curvature of the outer housing 106. The front cover 108 can cover some or all of the front opening in the outer housing 106. The front cover 108 can be rigid.

The speaker can have a rear cover 110, which can be referred to herein as a third or rear housing portion. The rear cover 110 can cover some or all of a rear opening in the outer housing 106. The rear cover 110 can have one or more interface features, such as one or more power ports 116 (e.g., for receiving a power plug), one or more signal ports 118 (e.g., for receiving signal cables), one or more wireless interfaces, one or more input elements for receiving user input (e.g., one or more buttons, knobs, dials, keypads, touchscreens etc.), and/or one or more sensors. For example, an ambient light sensor 120 can be positioned on the rear cover 110 of the speaker 100, although various other suitable locations could be used (e.g., on the front cover 108 or on the outer housing 106, etc.). In some embodiments, the rear cover 110 can include a removable cover portion 114, which can be removably attached to the main portion of the rear cover 110, such as to conceal one or more of the interface features. The removable cover portion 114 can be detached from the main portion of the rear cover 110 to provide access to the interface features. FIG. 6 shows the speaker with the removable cover portion 114 detached.

Figure 8:
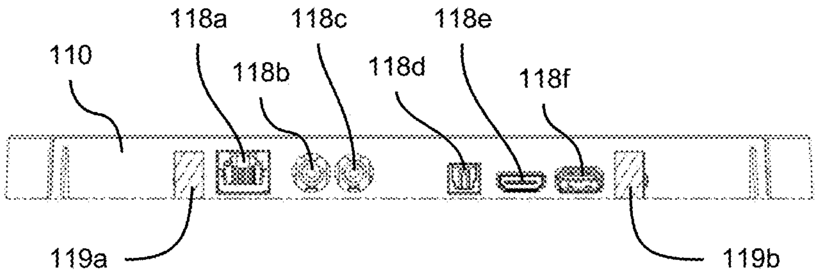
FIG. 8 shows an interface portion of the example speaker.

FIG. 8 shows the underside of the rear cover 110 portion (e.g., that is exposed when the removable cover is detached). The speaker 100 can have an Ethernet port 118*a*, a right analogue audio port 118*b* (e.g., partially visible in FIG. 6), a left analogue audio port 118*c* (e.g., partially visible in FIG. 6), an optical audio port 118*d*, an HDMI port 118*e*, and a USB port 118*f*. Various other ports or other interface features could be used, such as for a display port connection, a USB-c port, etc. The speaker 100 can include a Bluetooth connect button 119*a* (e.g., or other user input element), which a user can press to initiate or preform a Bluetooth pairing with another device, and/or to transition the speaker 100 to Bluetooth mode (e.g., as compared to a WiFi mode, or wired mode). The speaker 100 can include a speaker connect button 119*b* (e.g., or other user input element) to connect the speaker 100 to one or more other speakers, to an audio system, to a home automation system, and/or to one or more other devices (e.g., an AV receiver or an audio playback device, etc.). In some embodiments, the connection between the speaker 100 and another device or system can be a wireless, such as over WiFi or Bluetooth, although any suitable wireless protocol can be used.

In some embodiments, the speaker 100 can have a heatsink. The speaker 100 (e.g., the rear cover 110) can have a plurality of fins 122, which can be configured to dissipate heat from the speaker 100. The rear cover 110 can comprises a thermally conductive material (e.g., aluminum), which can transfer heat from the interior of the speaker 100 to the fins 122, which can dissipate heat to cool the speaker 100.

Figure 9:
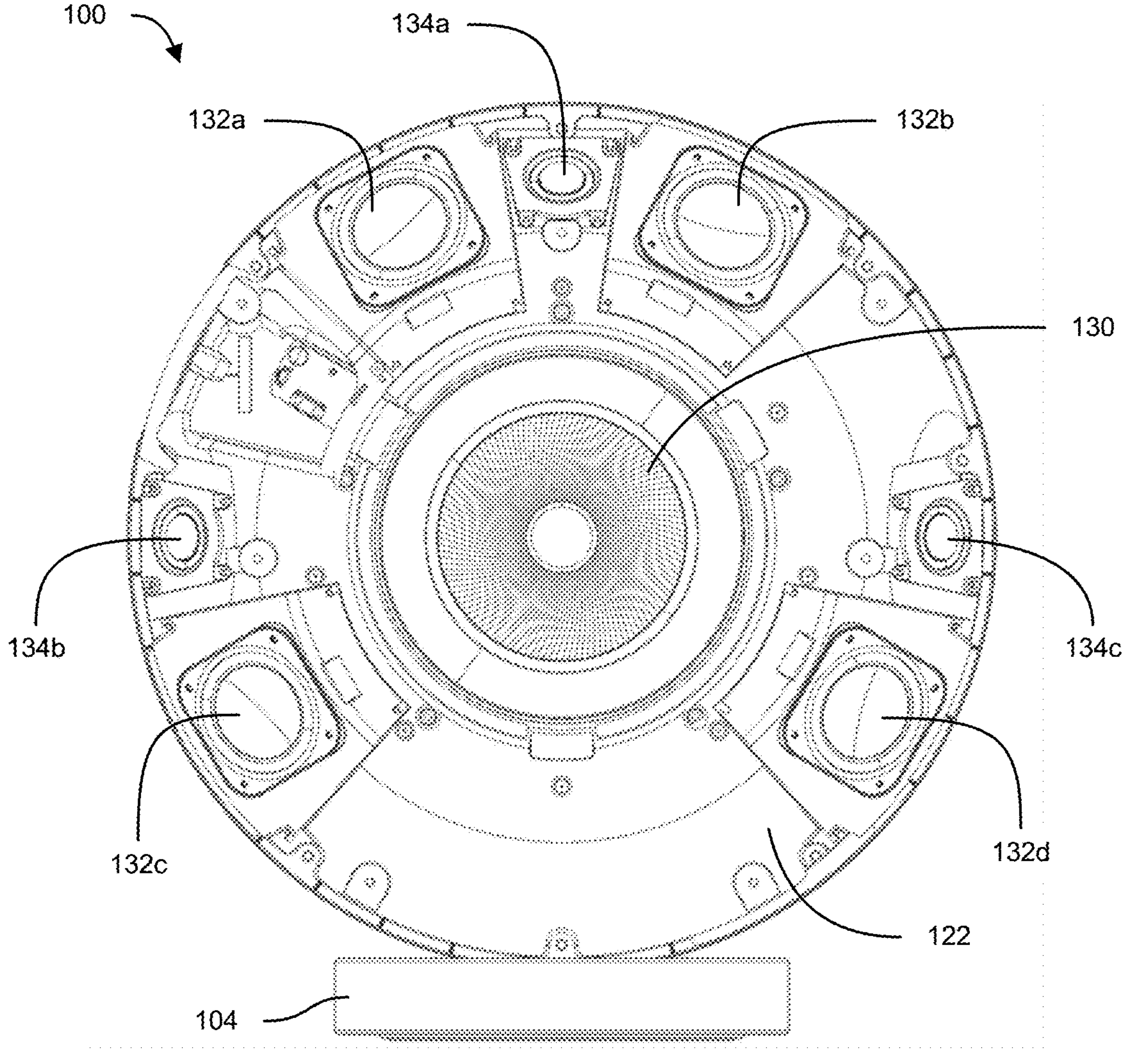
FIG. 9 is a front view of the example speaker with a front housing portion omitted.

The speaker 100 can have a front inner housing portion 124 and a rear inner housing portion 125, which can be coupled together using one or more screws, although any suitable fasteners can be used such as adhesive, double sided tape, bolts, clamps, snap-fit engagement structures, friction fittings, etc. The speaker 100 can have a front outer housing portion 126 and a rear outer housing portion 128, which couple to form the outer housing 106, such as using one or more screws, adhesive, double sided tape, bolts, clamps, snap-fit engagement structures, friction fittings, or any other suitable fastener or coupling manner. FIG. 9 shows a front view of the speaker 100 with the front outer housing portion 126 omitted from view to illustrate the interior of the speaker 100.

The speaker 100 can have a first or low driver 130 (e.g., a subwoofer), which can be configured to play relatively low frequencies, a plurality of second or mid-range drivers 132*a-d*, which can be configured to play relatively mid-range frequencies, and a plurality of third or high drivers 134*a-c* (e.g., tweeters), which can be configured to play relatively high frequencies. The low driver 130 can be disposed between the front inner housing portion 126 and the rear inner housing portion 128. A frame, housing, or base of the low driver 130 can be coupled (e.g., mounted) to the front inner housing portion 126 and/or to the rear inner housing portion 128, or to any other suitable portion of the speaker 100 (e.g., to secure the low driver in place), such as using one or more screws, adhesive, double sided tape, bolts, clamps, snap-fit engagement structures, friction fittings, or any other suitable fastener or coupling manner. The front inner housing portion 124 can have a generally annular shape, such as with an opening through the center that is configured to align with the lower driver 130, such as to facilitate output of sound from the lower driver 130.

In some embodiments, the mid-range drivers 132*a-d* can be coupled (e.g., mounted) to the front inner housing portion 126, or to any other suitable portion of the speaker 100 (e.g., to secure the drivers 132*a-d* in place), such as using one or more screws, adhesive, double sided tape, bolts, clamps, snap-fit engagement structures, friction fittings, or any other suitable fastener or coupling manner. The front inner housing portion 124 can include recesses (e.g., baffles) 136 that are configured to receive the mid-range drivers 132*a*-d. In some embodiments, the high-range drivers 134*a-c* can be coupled (e.g., mounted) to the front inner housing portion 126, or to any other suitable portion of the speaker 100 (e.g., to secure the drivers 134*a-c* in place), such as using one or more screws, adhesive, double sided tape, bolts, clamps, snap-fit engagement structures, friction fittings, or any other suitable fastener or coupling manner. The front inner housing portion 124 can include recesses (e.g., baffles) 138 that are configured to receive the high-range drivers 134*a-c*. The front outer housing portion 126 can include sets of openings 140 (e.g., forming a grille) in front of the respective mid-range drivers 132*a-d*. The front outer housing portion 126 can include sets of openings 142 (e.g., forming a grille) in front of the respective high-range drivers 134*a-c*. The openings 140 and 142 can facilitate output of sound from the speaker 100. The rear outer housing portion 128 can have one or more openings 144, which can enable air to flow into and/or out of the speaker 100, such as for cooling the speaker 100 and/or for porting the low driver 130 and/or the other driver(s).

Some of all of the drivers 130, 132, and/or 134 can use neodymium magnets. The low-frequency driver 130 and/or the mid-range driver(s) 132 can use paper cone diaphragms. The high-frequency driver(s) 134 can be silk dome tweeters. In some cases, the combination of the neodymium magnets and the paper diaphragms can produce a warm sound, as compared to using the neodymium magnets with other diaphragms, such as carbon fiber. The silk dome tweeters can also contribute to the warm sound of the speaker 100, such as when used with the neodymium magnets.

The front outer housing portion 126 can have a generally annular shape, with an opening through a center thereof. The rear outer housing portion 128 can have a generally annular shape, with an opening through a center thereof. The opening through the front inner housing portion 124 can align with the opening through the front outer housing portion 126 and/or the opening through the rear outer housing portion 128. For example, the axis 115 can extend through the openings. The front outer housing portion 126 can substantially conform to a spheroid shape (e.g., a front outer portion thereof). The rear outer housing portion 128 can substantially conform to a spheroid shape (e.g., a rear outer portion thereof).

The speaker 100 can include a mount member 146, which can be configured to couple the front cover 108 to the housing (e.g., to the front outer housing portion 126 and/or to the front inner housing portion 124). The mount member 146 can have an outer portion, an inner portion, and one or more arms 148, which can couple the inner portion to the outer portion. The stands 148 can space the inner portion away from the outer portion, such as to provide the gap between the front cover 108 can the outer housing portion 106. In some embodiments, the speaker 100 can have three arms 148, which can be equally spaced around the gap (e.g., separated by about 100 degrees to about 140 degrees, or by about 120 degrees), although any suitable number of arms 148 can be used (e.g., 1, 2, 3, 4, 5, 6, 8, 10, 12, etc.). The outer portion of the mount member 146 can have a generally annular shape. The outer portion of the mount member 146 can fit over the periphery of the opening through the front outer housing portion 126. The outer portion of the mount member 146 can be coupled to the front outer housing portion 126 and/or to the front inner housing portion 124, such as using one or more screws, adhesive, double sided tape, bolts, clamps, snap-fit engagement structures, friction fittings, or any other suitable fastener or coupling manner. The front cover 108 can be coupled to the inner portion of the mount member 146, such as using one or more screws, adhesive, double sided tape, bolts, clamps, snap-fit engagement structures, friction fittings, or any other suitable fastener or coupling manner. In some embodiments, a trim piece 150 can cover the outer portion of the mount member 146. The trim piece 150 can be curved inward. The trim piece 150 can be made of a reflective material, which can reflect light emitted by the speaker 100, as discussed herein. The trim piece 150 can be made of a metal material, such as aluminum, although various materials could be used.

In some embodiments, the front cover 108 can include a light (e.g., a front light) 153, which can be configured to illuminate the gap or recess between the front cover 108 and the outer housing portion 106. The front cover 108 can include one or more light sources 152 (e.g., light emitting diodes (LEDs)), which can be mounted onto a control board, such as a printed circuit board (PCB). A printed circuit board can include a plurality of LEDs (e.g., about 10, 12, 15, 18, 20, 24, 30, 36, or more, or any values or ranges therebetween), which can be arranged in a ring on the PCB. The front cover 108 can include at least one light modifying element 154, which can be configured to receive light from the light sources 152, to modify the light, and to output the modified light. For example, the light modifying element 154 can blend the light from multiple light sources 152 so as to output continuous light from a ring, arc, or other shape by impeding bright and dim spots based on the locations of the light sources, as can be seen in FIGS. 42, 43, 44, and 45, for example. The light modifying element 154 can scatter or diffuse light from the light sources, in some cases. In some implementations, the light modifying element 154 can include a light guide which can use total internal reflection (TIR) to blend and/or turn the light from the light sources 152. In some cases, the light can be reflected by the trim piece 150. The light sources 152 can be operated together to provide the appearance of a single light source, in some cases. The light sources 152 can be used to convey information to a user, as discussed herein.

In some embodiments, the rear cover 110 can include a light (e.g., a rear light) 155, which can be configured to output light from the rear cover 110 and/or from an interface between the rear cover 110 and the outer housing portion 106. The rear cover 110 can include one or more light sources (e.g., light emitting diodes (LEDs)), which can be mounted onto a control board, such as a printed circuit board (PCB) 156. The printed circuit board can include a plurality of LEDs (e.g., about 10, 12, 15, 18, 20, 24, 30, 36, or more, or any values or ranges therebetween), which can be arranged in a ring on the PCB 156. The rear cover 110 can include at least one light modifying element 158, which can be configured to receive light from the light sources, to modify the light, and to output the modified light. For example, the light modifying element 158 can blend the light from multiple light sources so as to output continuous light from a ring, arc, or other shape. The light modifying element 158 can impede bright and dim spots based on the locations of the light sources. The light modifying element 158 can scatter or diffuse light from the light sources, in some cases. In some implementations, the light modifying element 158 can include a light guide which can use total internal reflection (TIR) to blend and/or turn the light from the light sources. The light sources can be operated together to provide the appearance of a single light source, in some cases. In some cases, the light sources can be used to convey information to a user, as discussed herein. The rear light 155 can illuminate a rear of the speaker 100. The rear light 155 can be used to illuminate a wall or other structure behind the speaker 100.

The speaker 100 can include a plurality of lights 160, which can be arranged along a ring or other suitable shape. The lights 160 can be individually turned on and off, such as to convex information to a user. The lights 160 can have a diamond shape, although various other shapes could be used (e.g., circles, rectangles, triangles, etc.) A touch sensitive control ring 162 or other shape can be touch sensitive (e.g., having one or more capacitive touch elements), so that the user can provide input by touching the touch sensitive control ring 162, as discussed herein. The control ring 162 can include the lights 160, in some implementations. The speaker 100 can include a plurality of light sources 164 (e.g., light emitting diodes (LEDs)), which can be mounted onto a control board, such as a printed circuit board (PCB). A printed circuit board can include a plurality of LEDs (e.g., about 10, 20, 30, 40, 50, 60, 70, 80, 90, 100, 120, 130, 140, 150, 160, 170, 180, 190, 200, or more, or any values or ranges therebetween), which can be arranged in a ring on the PCB. The PCB can have an annular shape, such as with an opening through the center thereof. The PCB can be coupled to a back side of the outer portion of the mount member 146, such as using an adhesive, although various other types of fasteners or attachment approaches discussed herein could be used. The speaker 100 can include at least one light modifying element 166, which can be configured to receive light from the light sources 164, to modify the received light, and to output the modified light. For example, the light modifying elements 166 can define the output shape of the lights 160 (e.g., the diamond shapes shown in the illustrated embodiments). In some implementations, the light modifying elements 166 can include light guides which can use total internal reflection (TIR) to propagate light from the light sources 164 to the outputs (e.g., the shaped outputs). The outputs can have the diamond shapes, or any other suitable shape to define the shape of the lights 160. Accordingly, the light modifying elements 166 can be light pipes configured to alter or define the shape of the output light. The outer portion of the mount member 146 can have openings, and the light pipes can extend through the openings. A touch sensitive control surface 168 can be disposed in front of the light modifying element(s) 166. The touch sensitive control surface 168 can be transparent so that light from the LEDs 164 can be output through the control surface 168.

The speaker 100 can include controller, which can be configured to operate the speaker 100 as discussed herein. The speaker 100 can have a main control board 170, which can be a PCB. For example, the main control board 170 can have one or more processors an computer readable memory storing instructions that can be executed by the one or more processors to cause the speaker 100 to perform the functions discussed herein. The main control board 170 can be coupled to the rear internal housing portion 125 (e.g., on a back side thereof) and/or to the rear cover 110 (e.g., on a front side thereof), such as using one or more screws, adhesive, double sided tape, bolts, clamps, snap-fit engagement structures, friction fittings, or any other suitable fastener or coupling manner. The speaker 100 can include an amplifier 172, which can be used to generate signals for the drivers. The amplifier 172 can include a printed circuit board (PCB). The amplifier 172 can be mounted to or between the front inner housing portion 124 and/or the rear inner housing portion 125, such as using one or more screws, adhesive, double sided tape, bolts, clamps, snap-fit engagement structures, friction fittings, or any other suitable fastener or coupling manner. The speaker 100 can include a power supply 174, which can include a PCB. The power supply 174 can be mounted to or between the front inner housing portion 124 and/or the rear inner housing portion 125, such as using one or more screws, adhesive, double sided tape, bolts, clamps, snap-fit engagement structures, friction fittings, or any other suitable fastener or coupling manner. In some embodiments, the amplifier 172 and the power supply 174 can be incorporated into a single PCB. The amplifier 172 and/or the power supply 174 can at least partially surround the low driver 130. In some embodiments, the amplifier 172 and/or the power supply 174 can include an annular PCB, which can have an opening that receives a portion of the lower driver 130 therethrough. In some cases, the PCB can have an arched shaped without completing a full annular shape. A recess in the PCB can receive a portion of the lower driver 1300 therein. Various electrical components can be electrically interconnected, such as be wires or any other suitable electrical connections. The amplifier can output 500 watts, 600 watts, 700 watts, 800 watts, 900 watts, 1000 watts, 1100 watts, 1200 watts, 1300 watts, 1400 watts, 1500 watts, or more, or any values therebetween, or any ranges between any of these values, although other power levels could be used in some cases. In some implementations, the amplifier 172 can include gallium nitride (GaN) power semiconductors (e.g., transistors), such as GaN Field-Effect Transistors (GaN FETs) or GaN High-Electron-Mobility Transistors (GaN HEMTs).

Figure 9B:
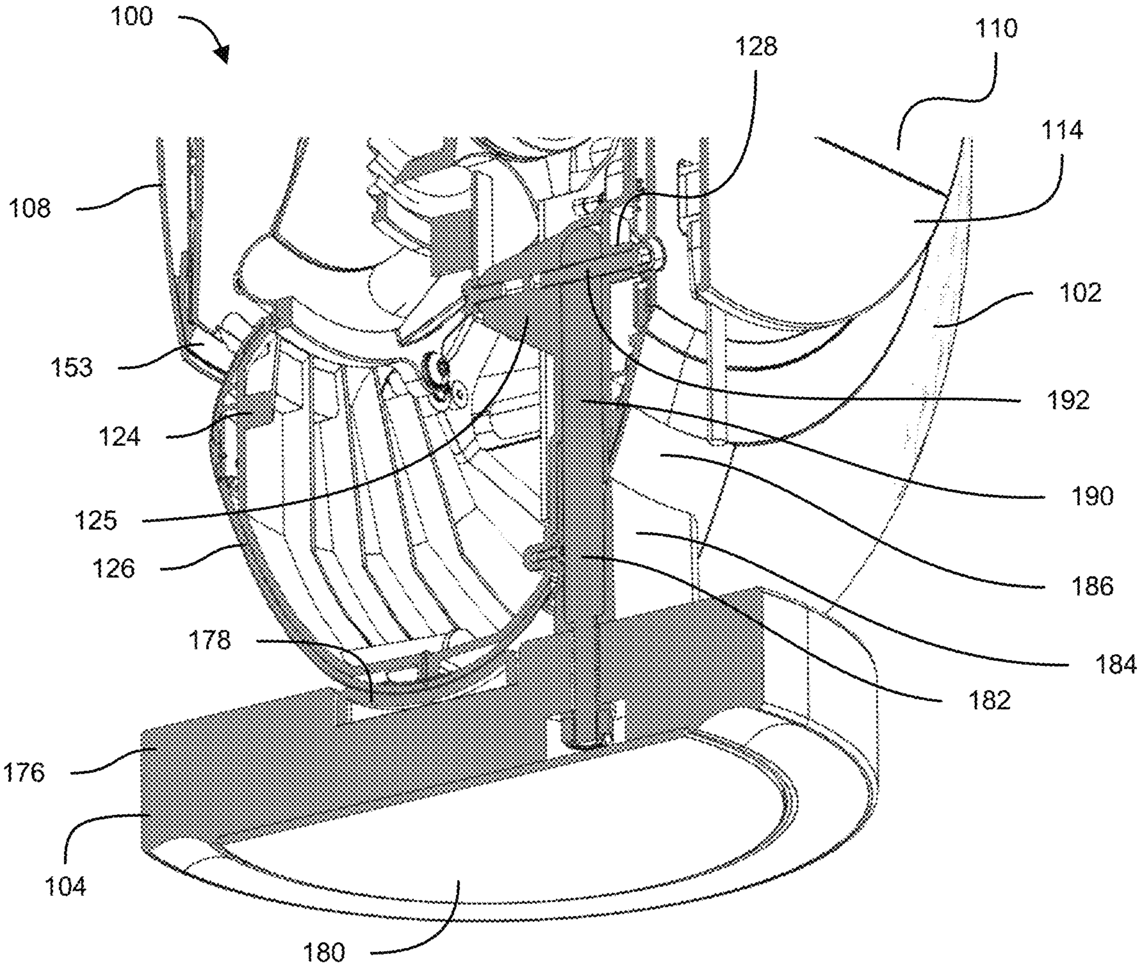
FIG. 9B is a partial cross-sectional view of the example speaker.

The base 104 or other support can support the main body portion 106 of the speaker 100 (e.g., on its end, with the axis 115 positioned substantially horizontal). FIG. 9B is a cross-sectional view of a portion of the speaker 100 that includes the interface between the base 104 and the main body 102 of the speaker 100. The base 104 can include a recessed portion, which can receive a portion of the main body 106 therein. The recessed portion can be curved. A main body 176 of the base can have an opening or recess. An insert piece 178 can be positioned in the recess of the main body 176 of the base 104. The insert piece 178 can have a curved top side, which can have curvature that corresponds to the bottom of the outer housing 106. A pad 180 can be positioned on an underside of the main body 176 of the base 104. The main body 102 of the speaker 100 can be coupled to the support or base 104 using one or more posts 182. In some cases, a single post can be used, or any other suitable number of posts (e.g., 2, 3, 4, 6, 8, etc.). The embodiment of FIG. 3 includes two posts 182, for example. The posts can extend through openings in the main body 176 of the base. The posts 182 can have threaded ends, and can engage with a nut to secure the posts 182 to the main body 176 of the base. In some cases, the posts 182 can thread directly into threaded bores of the base. The posts 182 can extend into slots 190 on the housing, which can be formed by the rear inner housing portion 125 and/or by the rear outer housing portion 128. Screws 192 can extend through transverse holes that extend through the posts 182 and through the housing (e.g., through the rear inner housing portion 125 and/or the rear outer housing portion 128). In some cases, the screws 192 can be threaded and can engage threading on corresponding holes on the housing (e.g., on the rear inner housing portion 125) and/or threading on the transverse holes through the posts 182. The posts 182 can extend through a cover 184, which can conceal the posts 182. The posts 82 can also extend through a trim piece 186, which can be mounted outside of holes for the slots 190 that receive the posts 182. The trim piece 186 can be screwed onto the rear inner housing 125. Various other coupling mechanisms can be used to couple the main body 102 to the base 104, such as using one or more screws, adhesive, double sided tape, bolts, clamps, snap-fit engagement structures, friction fittings, or any other suitable fastener or coupling manner.

Figure 12:
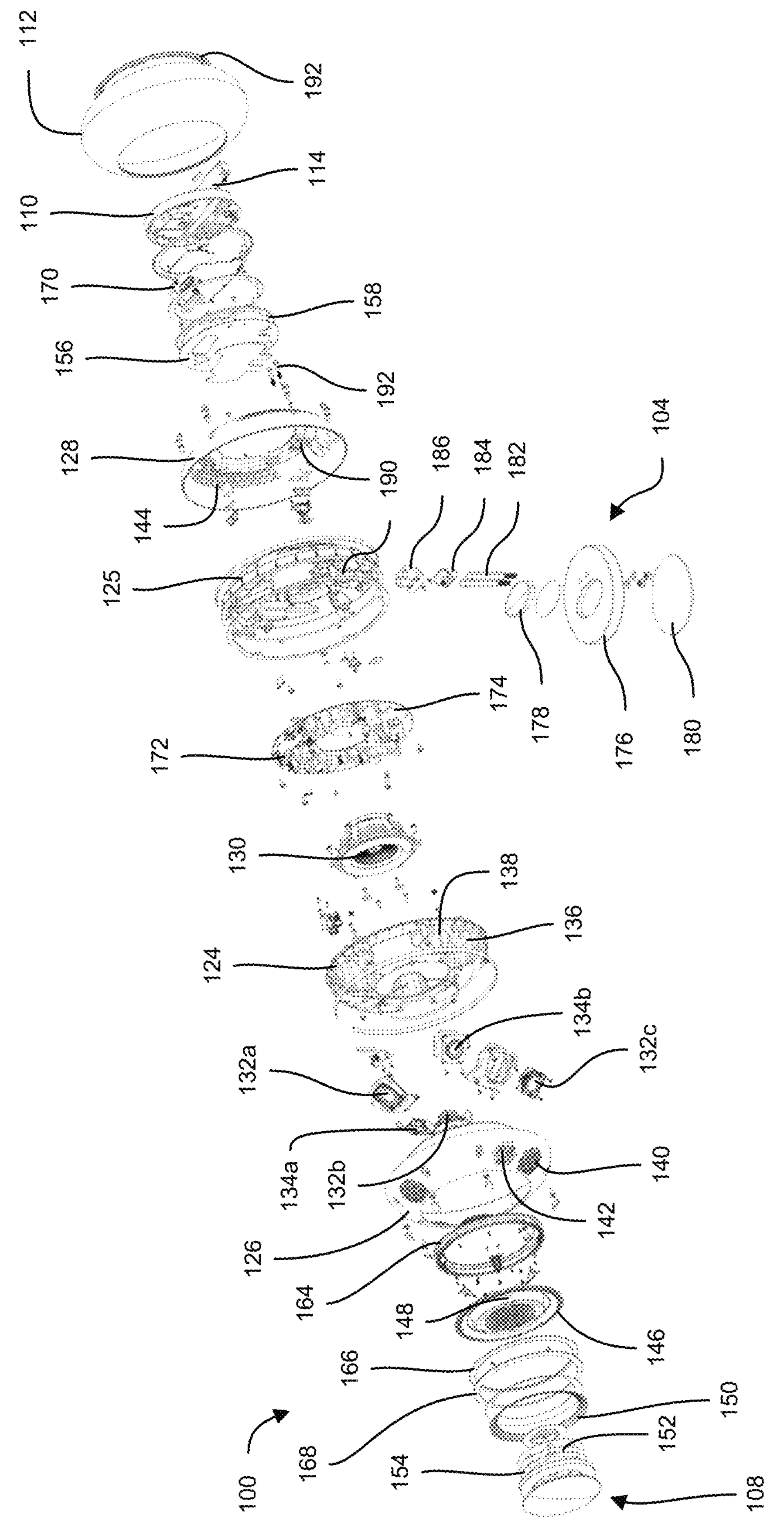
FIG. 12 is an exploded view of the example speaker.
Figure 14:
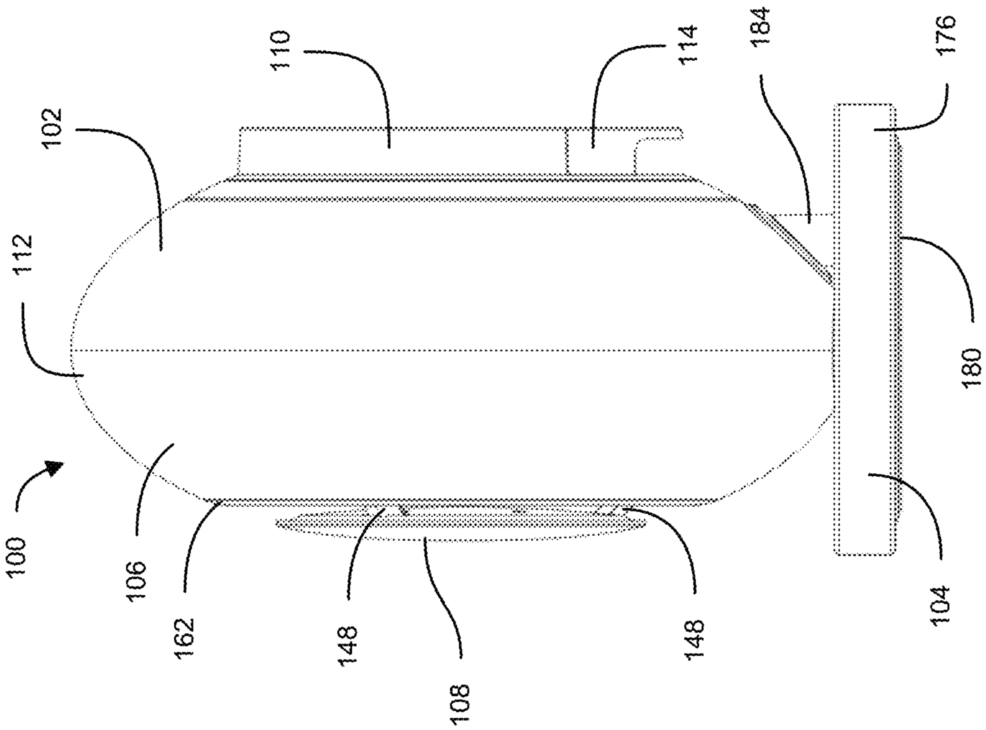
FIG. 14 is a side view of the example speaker.
Figure 13:
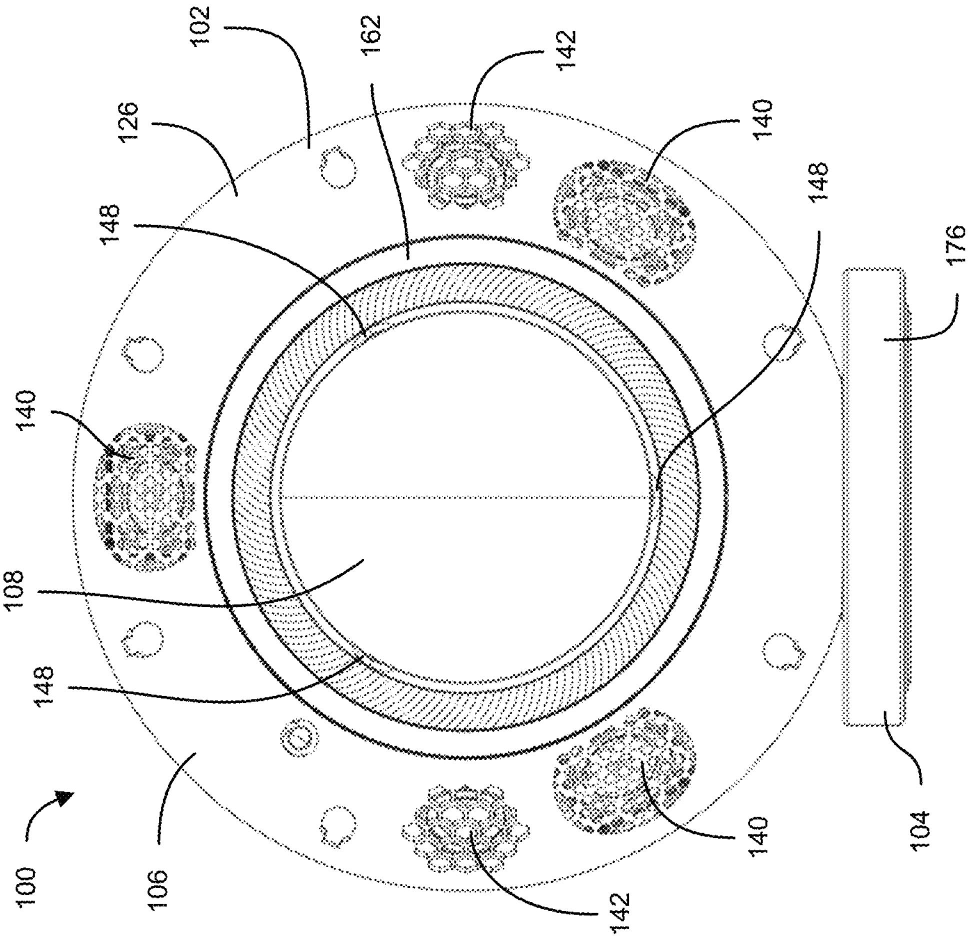
FIG. 13 is a front view of the example speaker with the fabric omitted.
Figure 15:
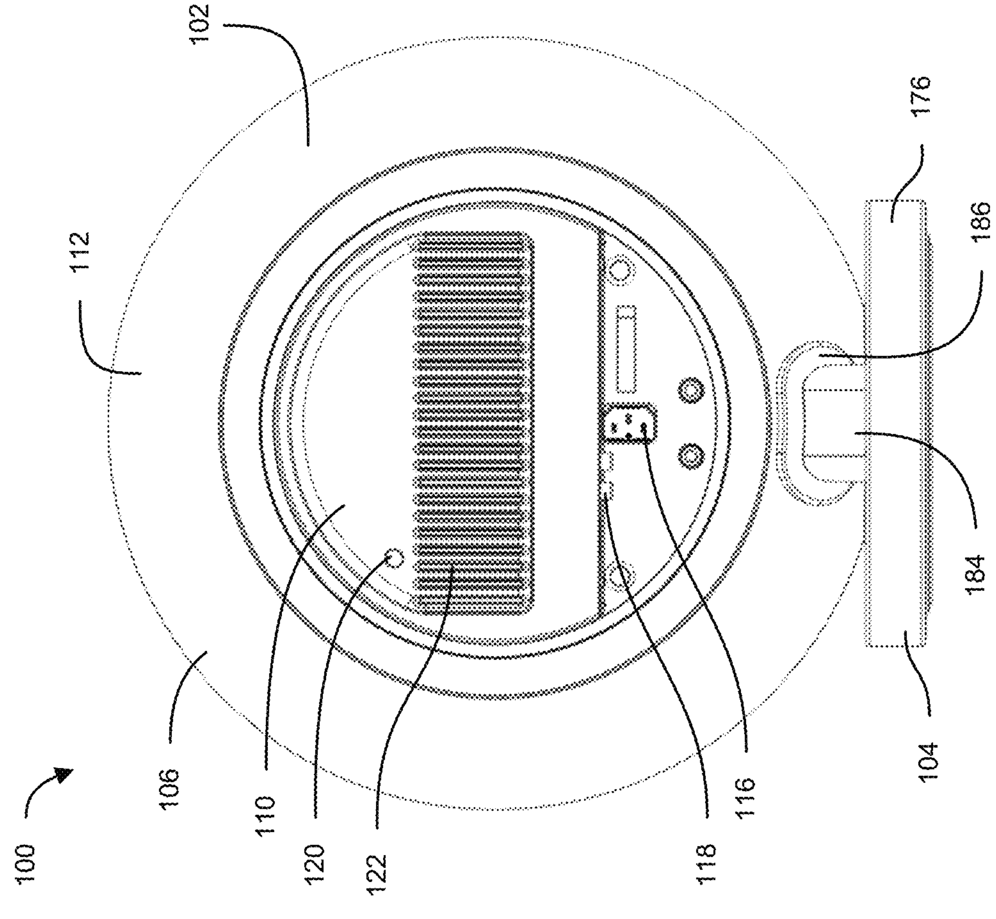
FIG. 15 is a rear view of the example speaker.

The exploded views (e.g., FIGS. 3 and 12) show various gaskets, trim pieces, screws and other fasteners, double sided tape, adhesive layers, caps, etc., which can be used to couple various components, to seal or insulate or damping various portions, or to cover various pieces, etc.

Figure 17:
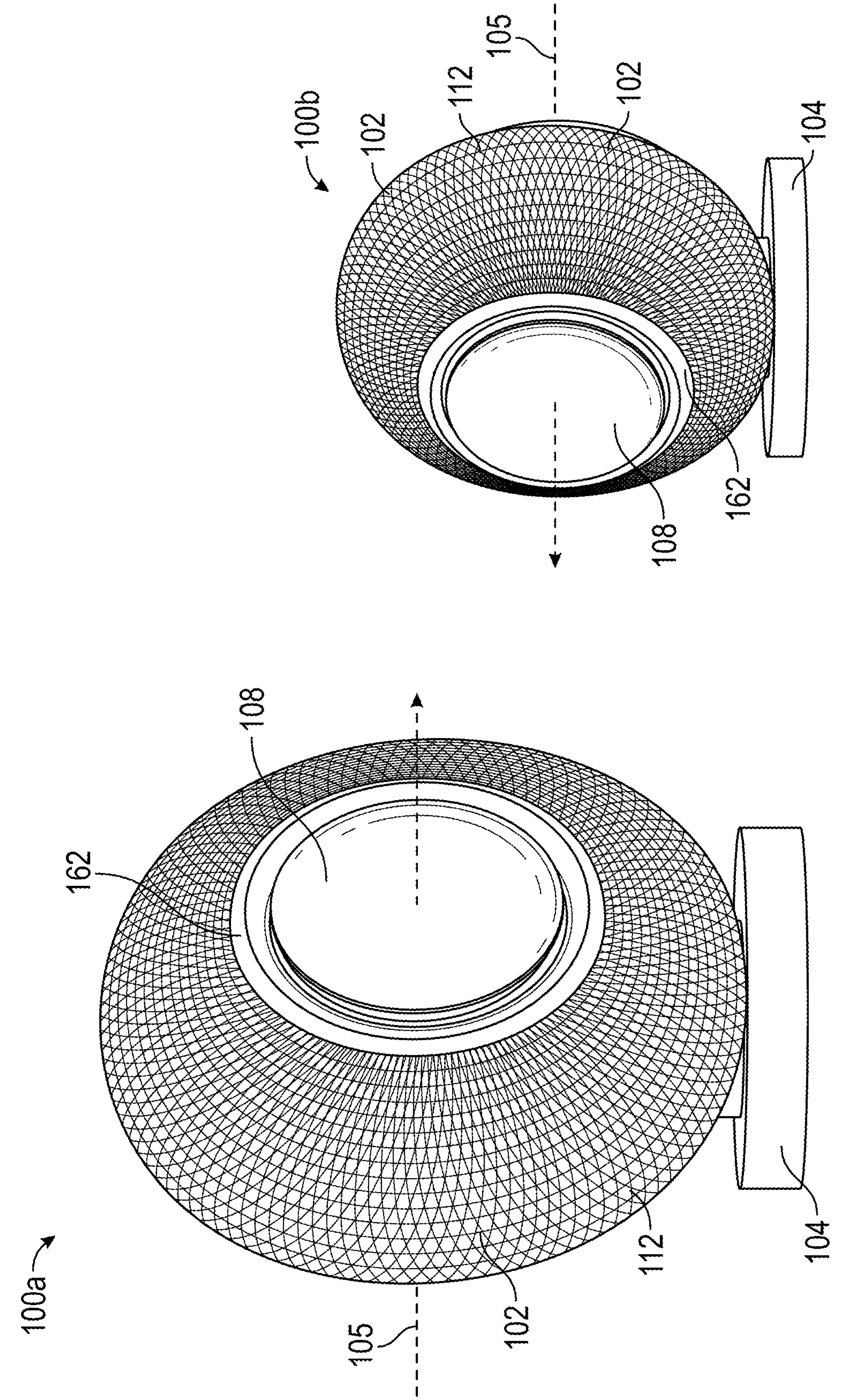
FIG. 17 shows two example speakers.

The speaker 100 can have various different sizes. FIG. 17 shows a first speaker 100*a* that is larger than a second speaker 100*b*, for example. FIGS. 1 to 9B can correspond to a larger speaker 100*a*, and FIGS. 10 to 16 can correspond to a smaller speaker 100*b*. FIGS. 24 to 32 can correspond to the main body portion 102 of a larger speaker 100*a*, and FIGS. 33 to 41 can correspond to the main body portion 102 of a smaller speaker 100*b*.

Figure 19:
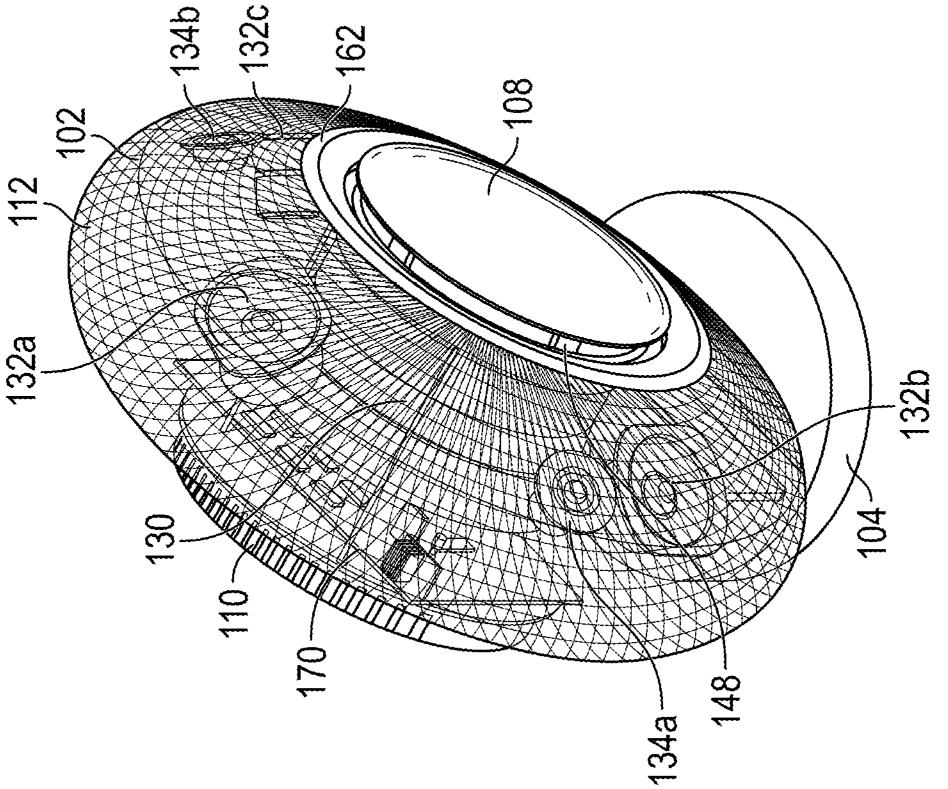
FIG. 19 shows a perspective view of an example speaker with a housing portion shown semi-transparent.
Figure 18:
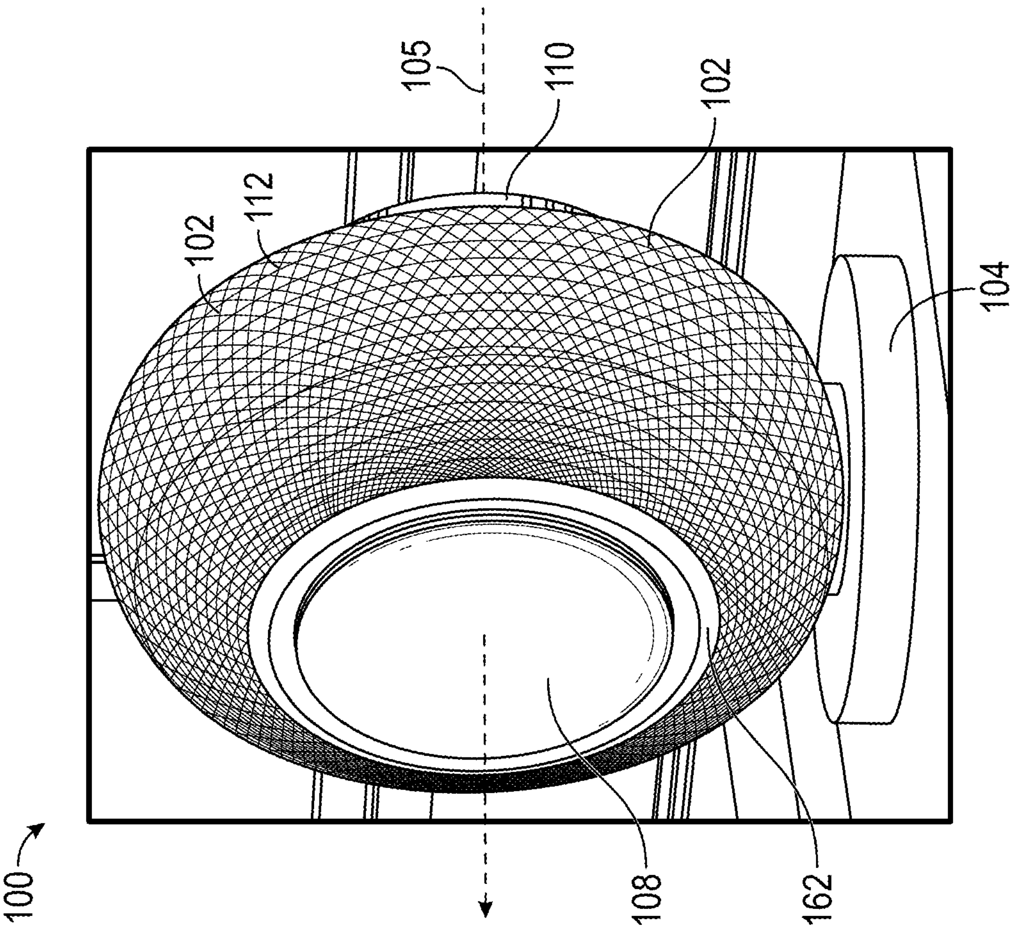
FIG. 18 shows a perspective view of an example speaker.
Figure 20:
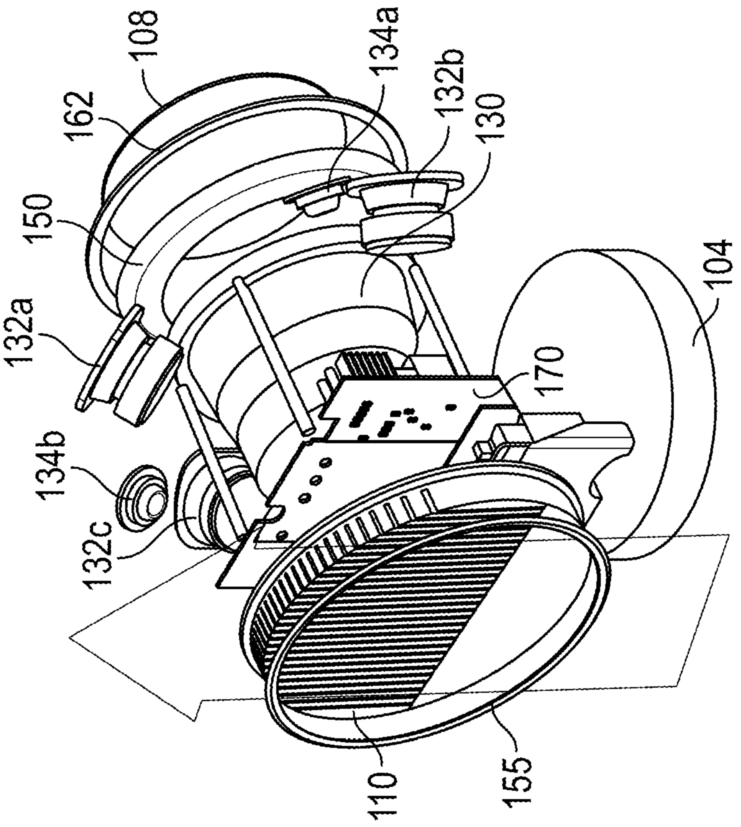
FIG. 20 shows an exploded view of an example speaker with a housing omitted from view.

FIG. 18 is a perspective view of an example embodiment of a speaker 100. FIG. 19 is a perspective view of an example embodiment of a speaker with the outer housing portion 106 shown semi-transparent. FIG. 20 is an exploded perspective view of the speaker with the outer housing portion omitted from view. As discussed herein, the speaker 100 can have an outer housing portion 106. The speaker can have a front cover 108, which can be a second or front housing portion, and which can cover some or all of the front of the opening through the outer housing portion 106. The speaker 100 can have a rear cover 110, which can be a third or rear housing portion, and which can cover some or all of the rear of the opening through the outer housing portion. Various suitable housing configurations can be used. In some embodiments, a front outer housing portion 126 and a rear outer housing portion 128 can join to enclose an interior and to provide an spheroid or ellipsoid shape. In some embodiments, the front or rear housing portion can be integral with the outer housing portion. In some cases, the outer housing 106 can have an opening at only one side (e.g., on the front or on the rear).

The speakers 100 disclosed herein can use various driver arrangements. The speaker 100 can have one or more drivers contained inside the housing. In some embodiments, the speaker 100 can have multiple drivers and/or multiple types of drivers. The speaker can have one or more high-frequency drivers (e.g., tweeters) 134, one or more mid-frequency drivers (e.g., woofers in some cases, although various types of drivers could be used) 132, and/or one or more low-frequency drivers (e.g., sub-woofers) 130. In the example embodiments of FIGS. 10 to 16B and 18 to 21, the speaker 100 can have two tweeters including a right tweeter 134*a*, which can be oriented to direct sound generally to the right of the speaker 100, and a left tweeter 134*b*, which can be oriented to direct sound generally to the left of the speaker 100. The speaker 100 can have three mid-range drivers including an upper driver 132*a*, which can direct sound generally upward from the speaker 100, a right driver 132*b*, which can direct sound generally to the right (e.g., and generally downward in some cases) from the speaker 100, and a left driver 132*c*, which can direct sound generally to the left (e.g., and generally downward in some cases) from the speaker 100. The 134 tweeters and/or mid-frequency drivers 132 can be disposed inside of the outer housing portion 106. The tweeters 134 and/or mid-frequency drivers 132 can be angled partially forward and partially radially outward, such as according to the curvature of the outer housing portion 106 where the driver(s) are mounted. The outer housing portion can have openings 140, 142 positioned to facilitate the sound from the one or more drivers (e.g., the tweeters 134 and/or mid-frequency drivers 132) to exit the housing. In some embodiments, the speaker can include a subwoofer or low-frequency driver 130, which can be positioned in the opening of the outer housing portion 106. The low-frequency driver (e.g., subwoofer) 130 can face forward. An axis of the subwoofer 130 can be substantially coaxial with the axis of rotation of the shape of the outer housing portion 106. In some embodiments, the front housing portion or front cover 108 can have one or more openings to facilitate sound from the subwoofer to exit the speaker. In some embodiments, the front housing portion or front cover 108 can be omitted, can be removable, or can have a removable portion (e.g., center portion). In some cases, a gap can be disposed between the front cover 108 and the outer housing portion 106.

Various different numbers and orientations of drivers can be used. In some embodiments, the subwoofer or low-frequency driver can be omitted. The speaker can include 1, 2, 3, 4, 5, 6, or more tweeters, which can be distributed (e.g., substantially evenly or unevenly) around the inside or periphery of the speaker housing. The speaker can include 1, 2, 3, 4, 5, 6, 7, 8, or more mid-frequency drivers, which can be distributed (e.g., substantially evenly or unevenly) around the inside or periphery of the speaker housing. The drivers can be angled radially outward, or facing forward, or at any angles therebetween, or at any other suitable orientations.

Figure 21:
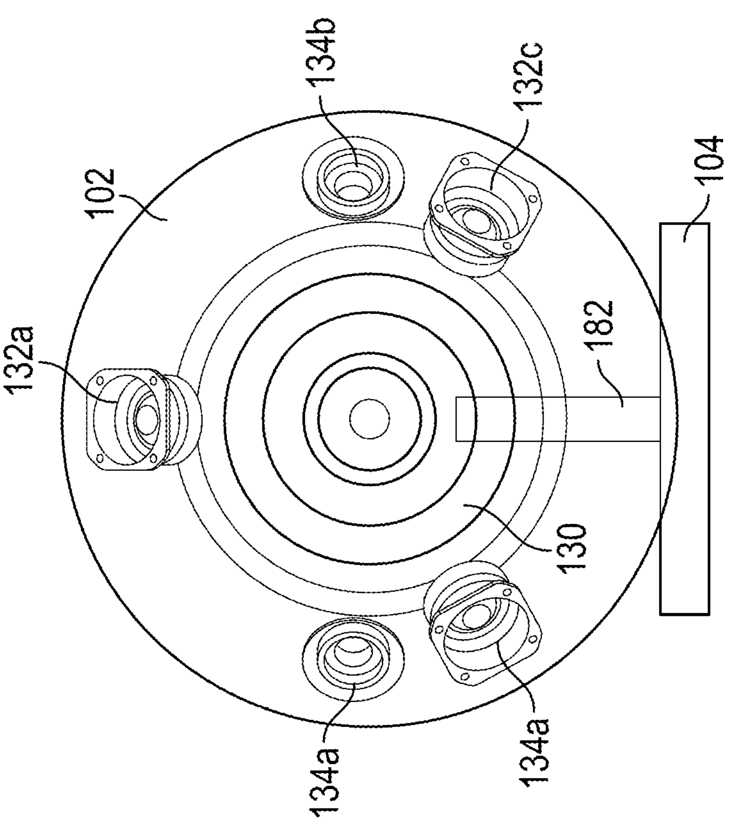
FIG. 21 shows a driver layout for an example speaker.
Figure 23:
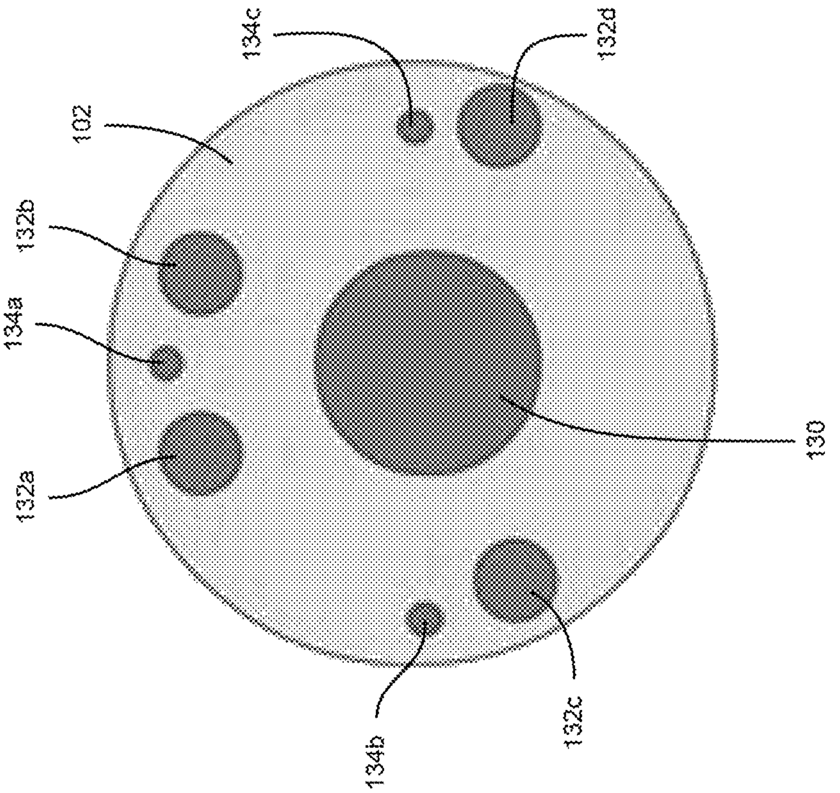
FIG. 23 shows a driver layout for an example speaker.
Figure 22:
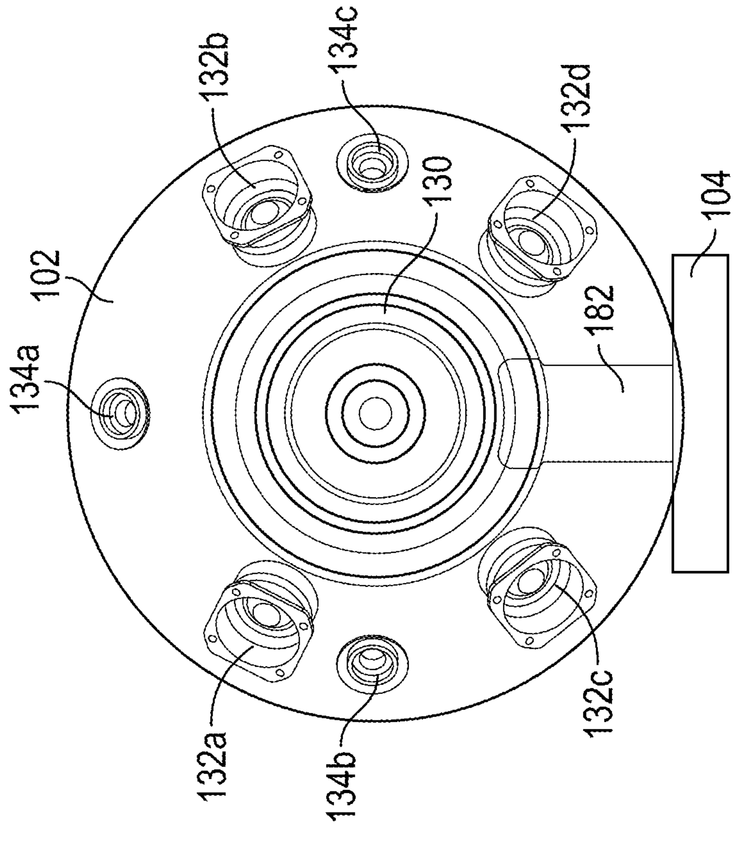
FIG. 22 shows a driver layout for an example speaker.
Figure 24:
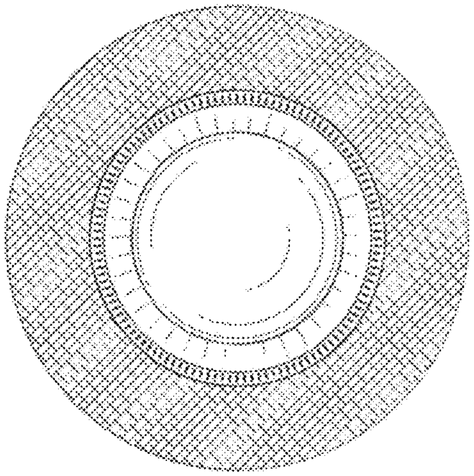
FIG. 24 is a front view of an example speaker.
Figure 25:
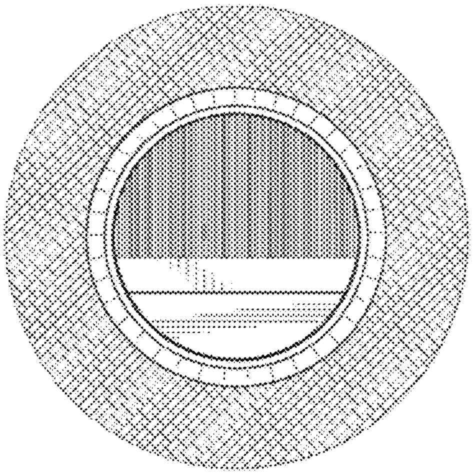
FIG. 25 is a rear view of an example speaker.
Figure 26:
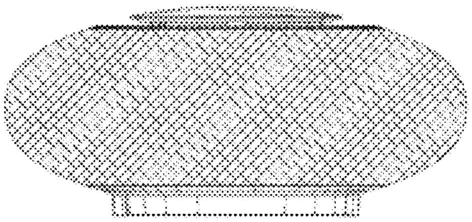
FIG. 26 is a bottom view of an example speaker.
Figure 27:
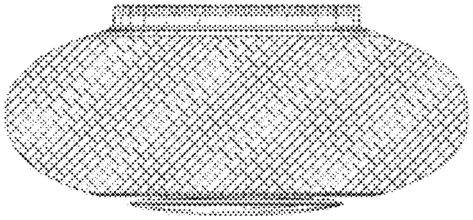
FIG. 27 is a top view of an example speaker.
Figure 28:
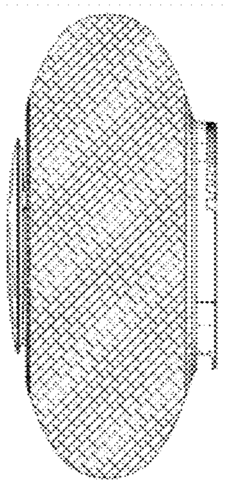
FIG. 28 is a left view of an example speaker.
Figure 29:
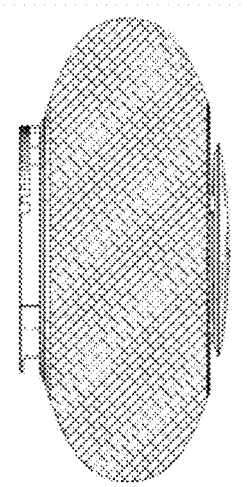
FIG. 29 is a right view of an example speaker.
Figure 30:
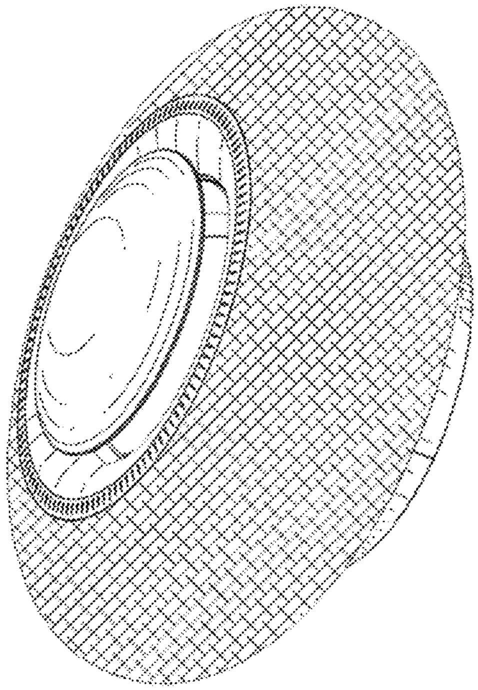
FIG. 30 is a front perspective view of an example speaker.
Figure 31:
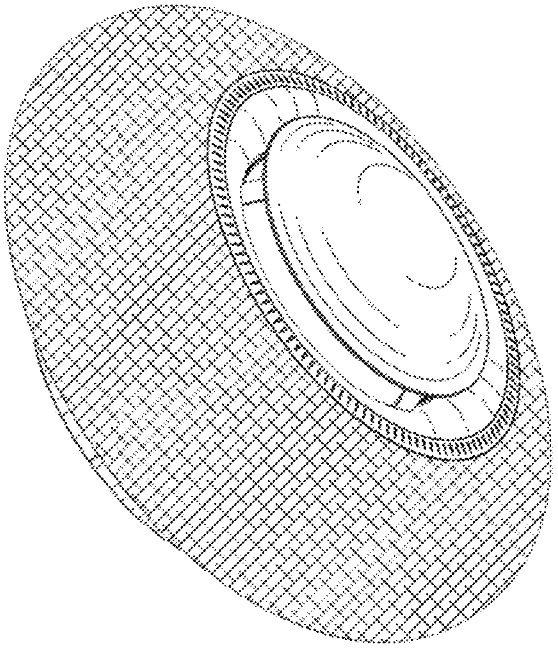
FIG. 31 is another front perspective view of an example speaker.
Figure 32:
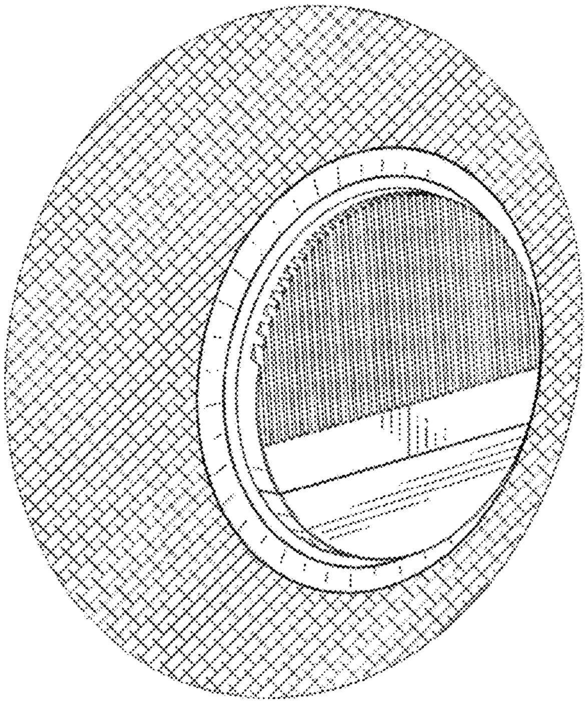
FIG. 32 is a rear perspective view of an example speaker.
Figure 33:
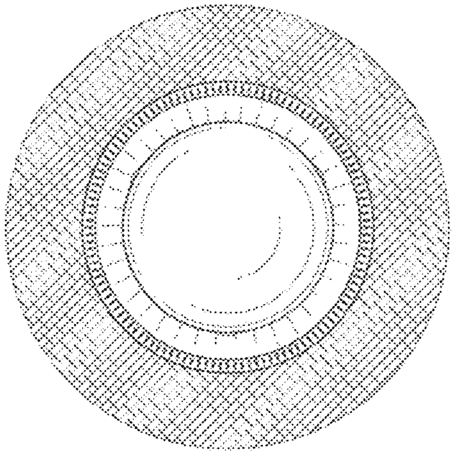
FIG. 33 is a front view of an example speaker.
Figure 34:
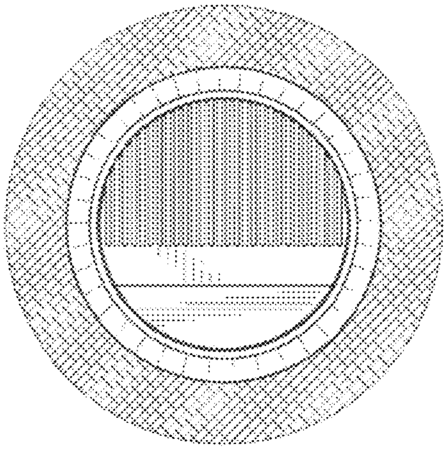
FIG. 34 is a rear view of an example speaker.
Figure 35:
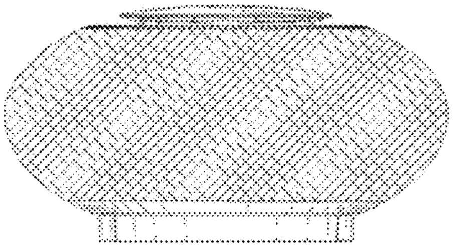
FIG. 35 is a bottom view of an example speaker.
Figure 36:
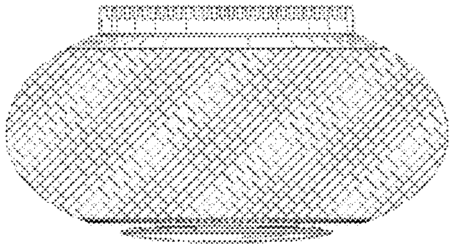
FIG. 36 is a top view of an example speaker.
Figure 37:
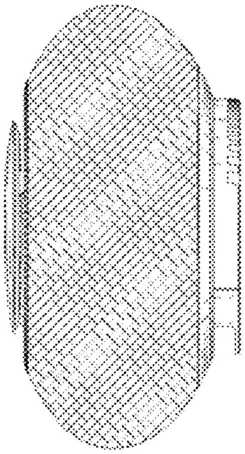
FIG. 37 is a left view of an example speaker.
Figure 38:
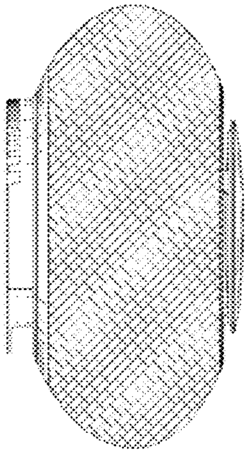
FIG. 38 is a right view of an example speaker.
Figure 39:
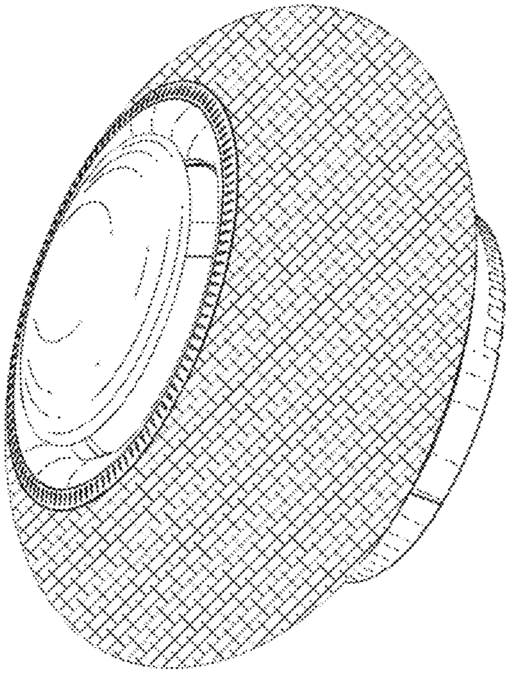
FIG. 39 is a front perspective view of an example speaker.
Figure 40:
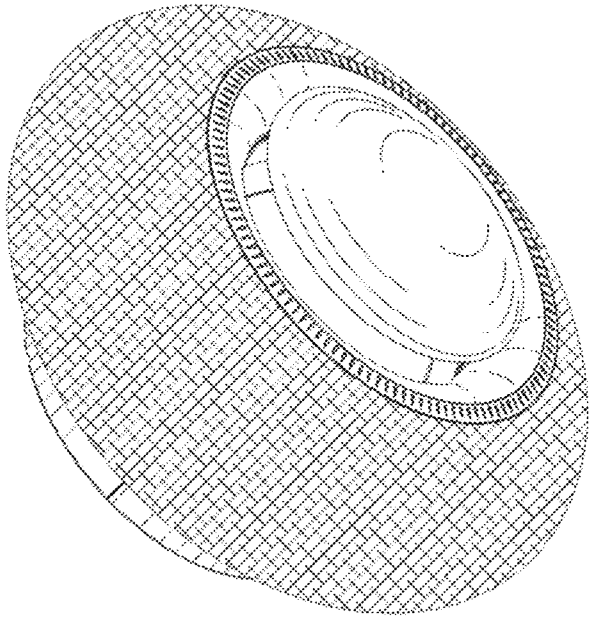
FIG. 40 is another front perspective view of an example speaker.
Figure 41:
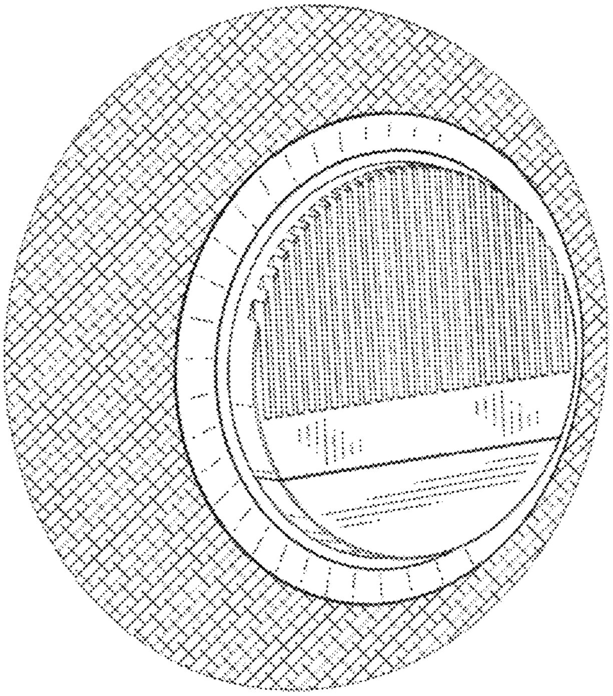
FIG. 41 is a rear perspective view of an example speaker.
Figure 43:
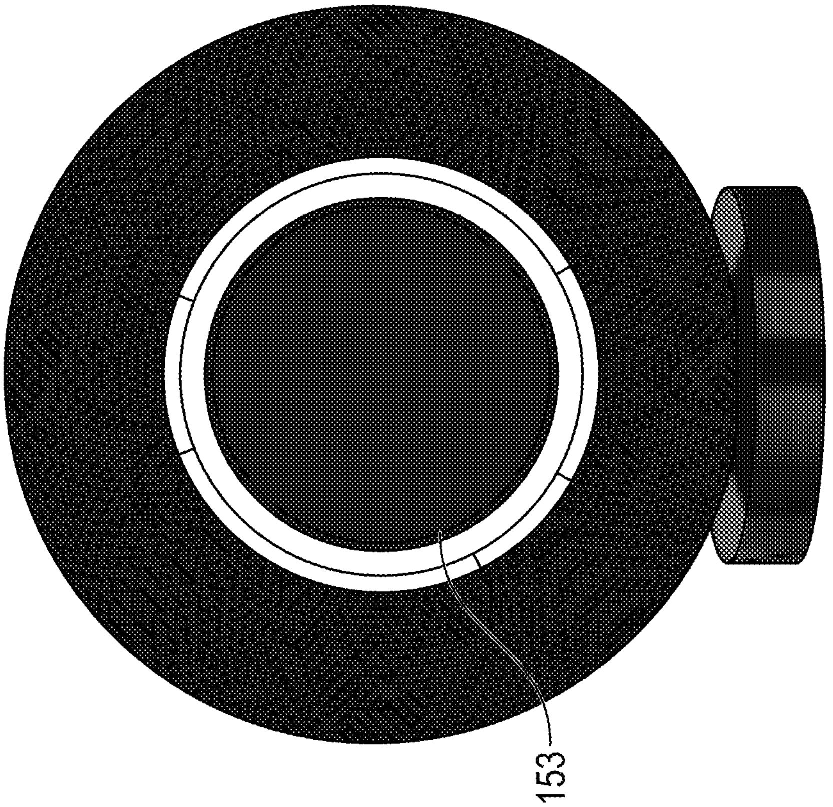
FIG. 43 is a front view of an example speaker.
Figure 42:
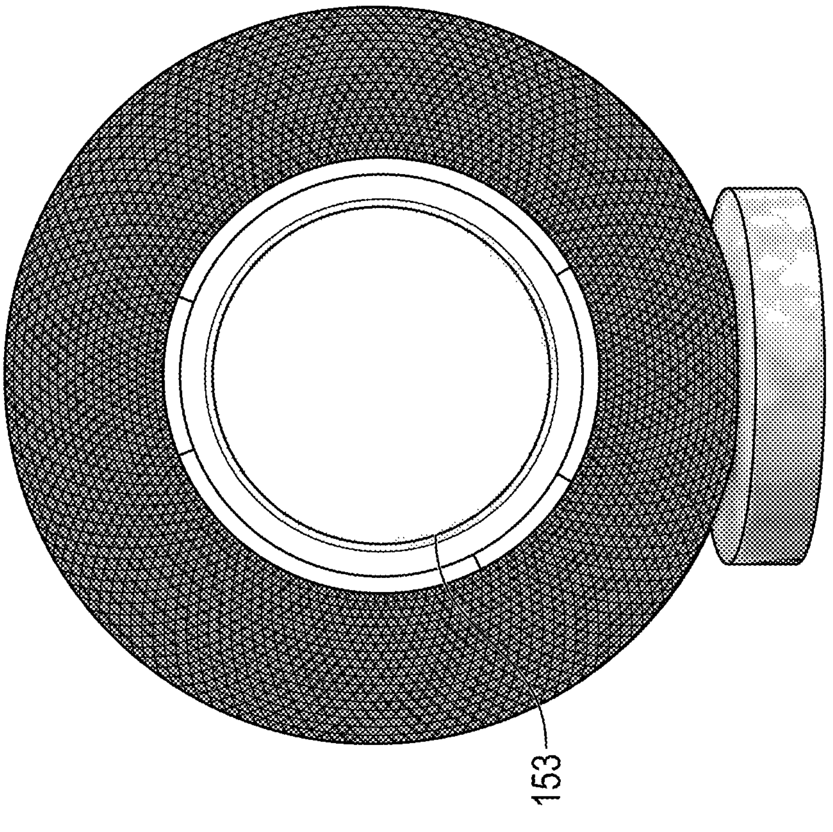
FIG. 42 is a front view of an example speaker.

By way of example, a first (e.g., smaller) speaker 100 can have the configuration shown in FIG. 21. A second (e.g., larger) speaker 100 can have the driver configuration shown in FIG. 22 or 23. The speaker 100 can have three tweeters 134*a-c* including an upper tweeter 132*a*, which can direct sound generally upward from the speaker 100, a right tweeter 134*b*, which can direct sound generally to the right (e.g., and downward in some cases) from the speaker 100, and a left tweeter 134*c*, which can direct sound generally to the left (e.g., an downward in some cases) from the speaker 100. The speaker 100 can have four mid-range drivers including an upper right mid-range drivers 132*a*, which can direct sound generally upward and to the right from the speaker 100, an upper left mid-range driver 132*b*, which can direct sound generally upward and to the left from the speaker 100, and lower right mid-range driver 132*c*, which can direct sound generally downward and to the right from the speaker 100, and a lower left mid-range driver 132*d*, which can direct sound generally downward and to the left from the speaker 100. Various other driver configurations are possible. Various other sizes of speakers can be used. The distribution of drivers in the speaker can provide powerful room-filling performance with a relatively compact speaker size.

Figure 9C:
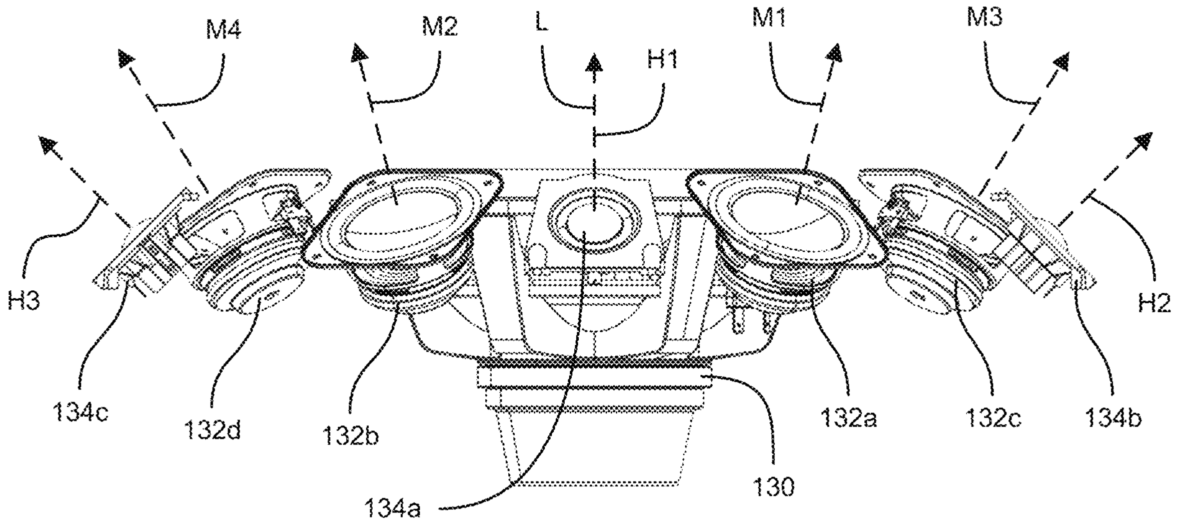
FIG. 9C shows a top view of the drivers of the example speaker.
Figure 9D:
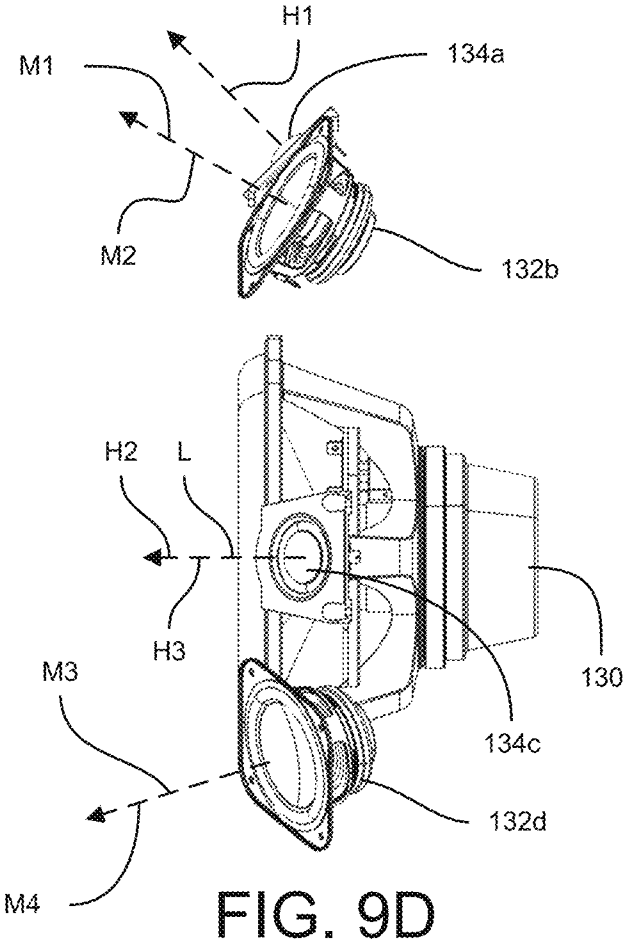
FIG. 9D shows a side view of the drivers of the example speaker.
Figure 10:
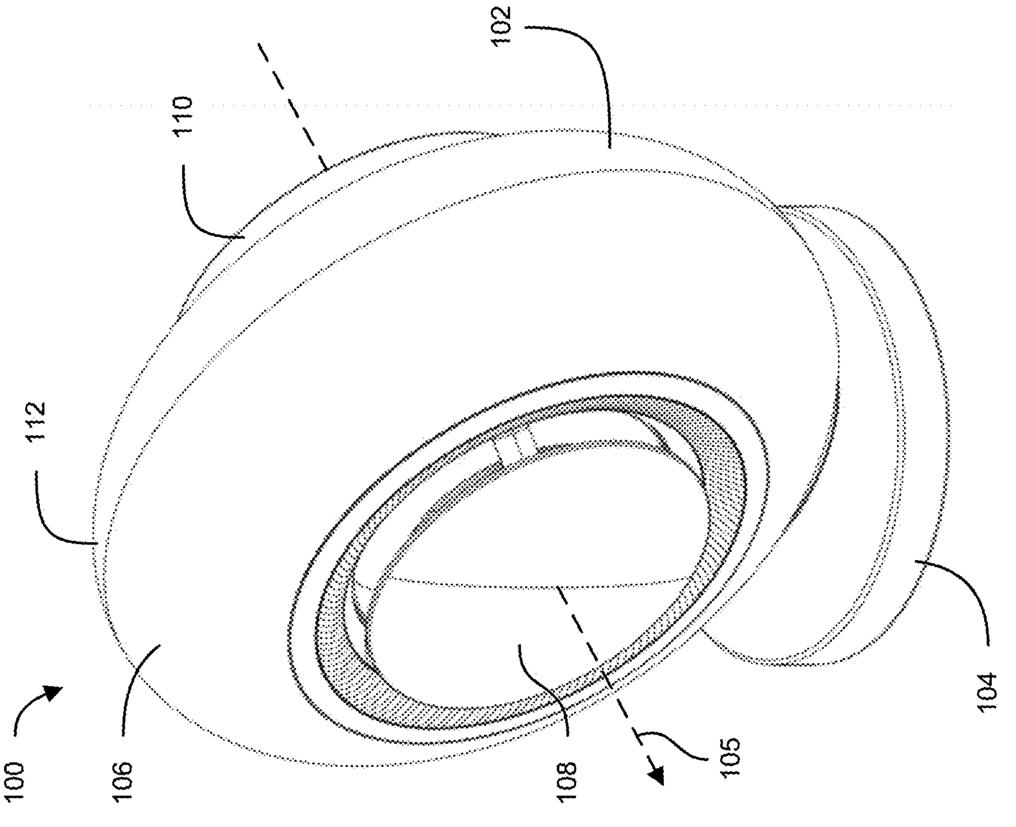
FIG. 10 is a front perspective view of an example speaker.
Figure 11:
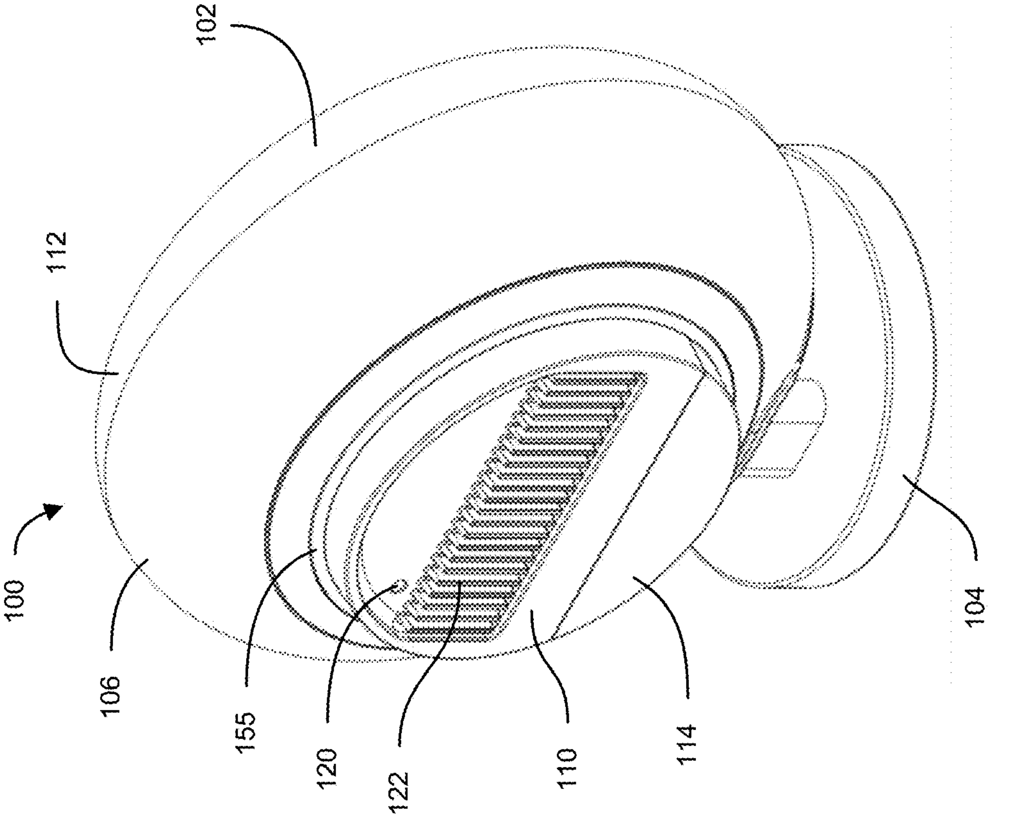
FIG. 11 is a rear perspective view of the example speaker.

FIGS. 9C and 9D show the drivers of the example speaker 100 (e.g., the larger size of speaker in FIGS. 1-8) with the other speaker components omitted from view. FIG. 9C is a top-down view, which shows angle offsets along a horizontal axis, and FIG. 9D is a side view, which shows angle offsets along a vertical axis. The directions that the drivers face are shown in FIGS. 9C and 9D with dashed arrow lines. The low driver 130 can face along a direction L. The low driver 130 can be positioned on the axis 115 of the speaker 100. The longitudinal or rotational axis 115 of the speaker 100 can be substantially collinear with the direction L of the low driver 130. The low driver 130 can face forward, such as in a direction that is substantially directly forward. The direction L of the lower driver 130 can be offset from a forward direction by about 15 degrees, about 10 degrees, about 5 degrees, about 2 degrees, about 1 degree, or about 0 degrees, in both the vertical and horizontal directions, or any values therebetween, or any range between any of these values, although other configurations are possible. The orientations of various drivers are discussed relative to the forward position, but the angles discussed below can also be relative to the direction of the low frequency driver 130.

The direction H1 of the first high-frequency driver 134*a* can be horizontally offset from a forward direction by about 15 degrees, about 10 degrees, about 5 degrees, about 2 degrees, about 1 degree, or about 0 degrees, or any values therebetween, or any range between any of these values, although other configurations are possible. The direction H1 of the first high-frequency driver 134*a* can be vertically offset upward from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction H2 of the second high-frequency driver 134*b* can be horizontally offset to the right from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction H2 of the second high-frequency driver 134*b* can be vertically offset from a forward direction by about 15 degrees, about 10 degrees, about 5 degrees, about 2 degrees, about 1 degree, or about 0 degrees, or any values therebetween, or any range between any of these values, although other configurations are possible. The direction H3 of the third high-frequency driver 134*c* can be horizontally offset to the left from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction H3 of the third high-frequency driver 134*c* can be vertically offset from a forward direction by about 15 degrees, about 10 degrees, about 5 degrees, about 2 degrees, about 1 degree, or about 0 degrees, or any values therebetween, or any range between any of these values, although other configurations are possible.

The direction M1 of the first mid-frequency driver 132*a* can be horizontally offset to the right from a forward direction by about 0 degrees, about 5 degrees, about 10 degrees, about 15 degrees, about 20 degrees, about 25 degrees, or about 30 degrees, or any values therebetween, or any range between any of these values, although other configurations are possible. The direction M1 of the first mid-frequency driver 132*a* can be vertically offset upward from a forward direction by about 15 degrees, about 20 degrees, about 25 degrees, about 30 degrees, about 35 degrees, about 40 degrees, or about 45 degrees, or any values therebetween, or any range between any of these values, although other configurations are possible. The direction M2 of the second mid-frequency driver 132*b* can be horizontally offset to the left from a forward direction by about 0 degrees, about 5 degrees, about 10 degrees, about 15 degrees, about 20 degrees, about 25 degrees, or about 30 degrees, or any values therebetween, or any range between any of these values, although other configurations are possible. The direction M2 of the second mid-frequency driver 132*b* can be vertically offset upward from a forward direction by about 15 degrees, about 20 degrees, about 25 degrees, about 30 degrees, about 35 degrees, about 40 degrees, or about 45 degrees, or any values therebetween, or any range between any of these values, although other configurations are possible. The direction M3 of the third mid-frequency driver 132*c* can be horizontally offset to the right from a forward direction by about 15 degrees, about 20 degrees, about 25 degrees, about 30 degrees, about 35 degrees, about 40 degrees, or about 45 degrees, or any values therebetween, or any range between any of these values, although other configurations are possible. The direction M3 of the third mid-frequency driver 132*c* can be vertically offset downward from a forward direction by about 0 degrees, about 5 degrees, about 10 degrees, about 15 degrees, about 20 degrees, about 25 degrees, about 30 degrees, about 35 degrees, or about 40 degrees, or any values therebetween, or any range between any of these values, although other configurations are possible. The direction M4 of the fourth mid-frequency driver 132*d* can be horizontally offset to the left from a forward direction by about 15 degrees, about 20 degrees, about 25 degrees, about 30 degrees, about 35 degrees, about 40 degrees, or about 45 degrees, or any values therebetween, or any range between any of these values, although other configurations are possible. The direction M4 of the fourth mid-frequency driver 132*d* can be vertically offset downward from a forward direction by about 0 degrees, about 5 degrees, about 10 degrees, about 15 degrees, about 20 degrees, about 25 degrees, about 30 degrees, about 35 degrees, or about 40 degrees, or any values therebetween, or any range between any of these values, although other configurations are possible.

Figure 16:
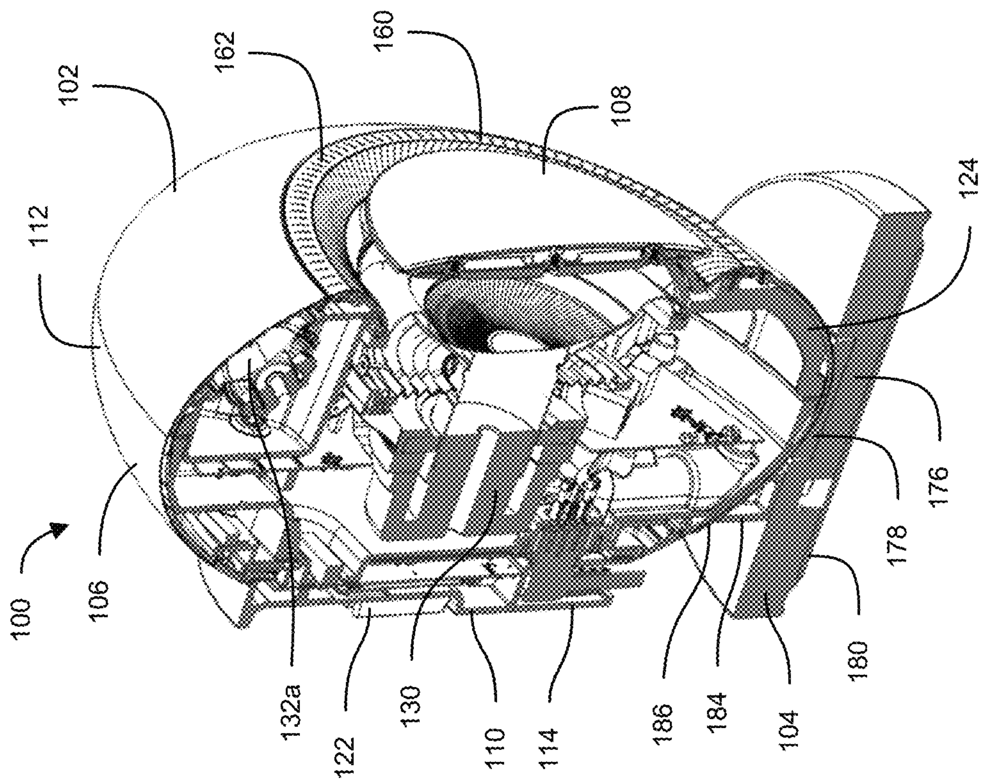
FIG. 16 is a perspective cross-sectional view of the example speaker.
Figure 16A:
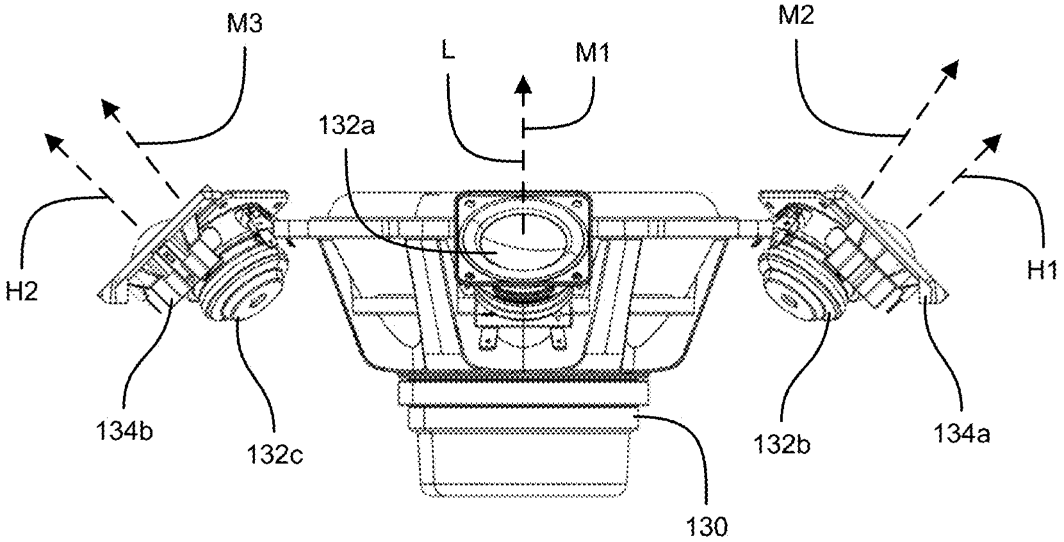
FIG. 16A shows a top view of the drivers of the example speaker.
Figure 16B:
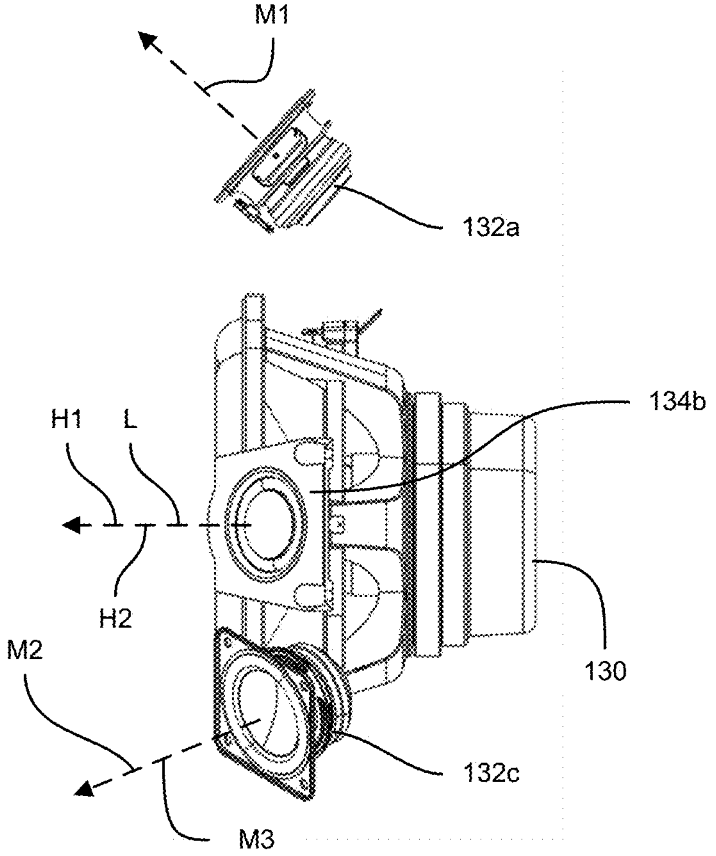
FIG. 16B shows a side view of the drivers of the example speaker.

FIGS. 16A and 16B show the drivers of an example speaker 100 (e.g., the smaller size of speaker in FIGS. 10-15) with the other speaker components omitted from view. FIG. 16A is a top-down view, which shows angle offsets along a horizontal axis, and FIG. 16B is a side view, which shows angle offsets along a vertical axis. The directions that the drivers face are shown in FIGS. 16A and 16B with dashed arrow lines. The low driver 130 can face along a direction L. The low driver 130 can be positioned on the axis 115 of the speaker 100. The longitudinal or rotational axis 115 of the speaker 100 can be substantially collinear with the direction L of the low driver 130. The low driver 130 can face forward, such as in a direction that is substantially directly forward. The direction L of the lower driver 130 can be offset from a forward direction by about 15 degrees, about 10 degrees, about 5 degrees, about 2 degrees, about 1 degree, or about 0 degrees, in both the vertical and horizontal directions, or any values therebetween, or any range between any of these values, although other configurations are possible. The orientations of various drivers are discussed relative to the forward position, but the angles discussed below can also be relative to the direction of the low frequency driver 130.

The direction H1 of the first high-frequency driver 134*a* can be horizontally offset to the right from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction H1 of the first high-frequency driver 134*a* can be vertically offset from a forward direction by about 15 degrees, about 10 degrees, about 5 degrees, about 2 degrees, about 1 degree, or about 0 degrees, or any values therebetween, or any range between any of these values, although other configurations are possible. The direction H2 of the second high-frequency driver 134*b* can be horizontally offset to the left from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction H2 of the second high-frequency driver 134*b* can be vertically offset from a forward direction by about 15 degrees, about 10 degrees, about 5 degrees, about 2 degrees, about 1 degree, or about 0 degrees, or any values therebetween, or any range between any of these values, although other configurations are possible.

The direction M1 of the first mid-frequency driver 132*a* can be horizontally offset from a forward direction by about 15 degrees, about 10 degrees, about 5 degrees, about 2 degrees, about 1 degree, or about 0 degrees, or any values therebetween, or any range between any of these values, although other configurations are possible. The direction M1 of the first mid-frequency driver 132*a* can be vertically offset upward from a forward direction by about 30 degrees, about 35 degrees, about 40 degrees, about 45 degrees, about 50 degrees, about 55 degrees, or about 60 degrees, or any values therebetween, or any range between any of these values, although other configurations are possible. The direction M2 of the second mid-frequency driver 132*b* can be horizontally offset to the right from a forward direction by about 20 degrees, about 25 degrees, about 30 degrees, about 35 degrees, about 40 degrees, about 45 degrees, or about 50 degrees, or any values therebetween, or any range between any of these values, although other configurations are possible. The direction M2 of the second mid-frequency driver 132*b* can be vertically offset downward from a forward direction by about 0 degrees, about 5 degrees, about 10 degrees, about 15 degrees, about 20 degrees, about 25 degrees, about 30 degrees, or about 35 degrees, or any values therebetween, or any range between any of these values, although other configurations are possible. The direction M3 of the third mid-frequency driver 132*c* can be horizontally offset to the left from a forward direction by about 20 degrees, about 25 degrees, about 30 degrees, about 35 degrees, about 40 degrees, about 45 degrees, or about 50 degrees, or any values therebetween, or any range between any of these values, although other configurations are possible. The direction M3 of the third mid-frequency driver 132*c* can be vertically offset downward from a forward direction by about 0 degrees, about 5 degrees, about 10 degrees, about 15 degrees, about 20 degrees, about 25 degrees, about 30 degrees, or about 35 degrees, or any values therebetween, or any range between any of these values, although other configurations are possible.

Some or all of the mid-range drivers 132 and/or some or all of the high-frequency drivers 134 can be angled relative to the forward direction, relative to the direction of the low-frequency driver 130, and/or relative to the axis 115, by angles that are about 30 degrees, about 35 degrees, about 40 degrees, about 45 degrees, about 50 degrees, about 55 degrees, or about 60 degrees, or any values therebetween, or any range between any of these values, although other configurations are possible. The directions that the different drivers are angled can be different from each other, as shown. For example, each driver can face generally forward and can be angled outward in a direction that corresponds to a direction to the driver from the low driver 140.

In some embodiments, the speaker can output sound for a single audio channel. In some embodiments, the speaker can output sound for multiple audio channels, such as for two channels (e.g., left and right channels).

In some embodiments, the speaker 100 can be configured to perform passive cooling. FIG. 20 is a partial rear perspective view of an example speaker 100. The rear housing portion or rear cover 110 can have one or more openings, in some cases, which can enable air to pass through the openings to enter or exit the interior of the speaker. The openings can provide airflow for cooling the interior of the speaker 100 (e.g., the electrical components therein), as shown for example in FIGS. 19 and 20. In some implementations, the speaker 100 can include a fan to move air into or out of the speaker 100, or the speaker 100 can use passive cooling with no fan.

As discussed herein, the speaker 100 can include a support 104, which can be configured to support the housing of the speaker (e.g., upright, or with the short axis 115 of the spheroid or ellipsoid oriented substantially horizontally). The support 104 can include a base, which can extend generally horizontally. The base 104 can be weighted to provide stability to the speaker 100. An arm or post 182 can extend upward from the base and can engage the housing of the speaker 100. In some embodiments, the upper side of the base can include a recess, which can receive a portion of the speaker housing therein. The recess can be curved, and can have a curvature that corresponds to the portion of the outer housing shape that engages the recess. As can be seen in FIGS. 4, 13, 42, 49, and 50 for example, when the speaker 100 is viewed from the front, the arm 182 of the support 104 can be hidden by the housing or main body 102, which can provide the appearance of the speaker housing or main body 102 balancing on its end. The width of the recess can be wider than the width of the support arm, so that the support arm is hidden when viewed from the front.

Figure 45:
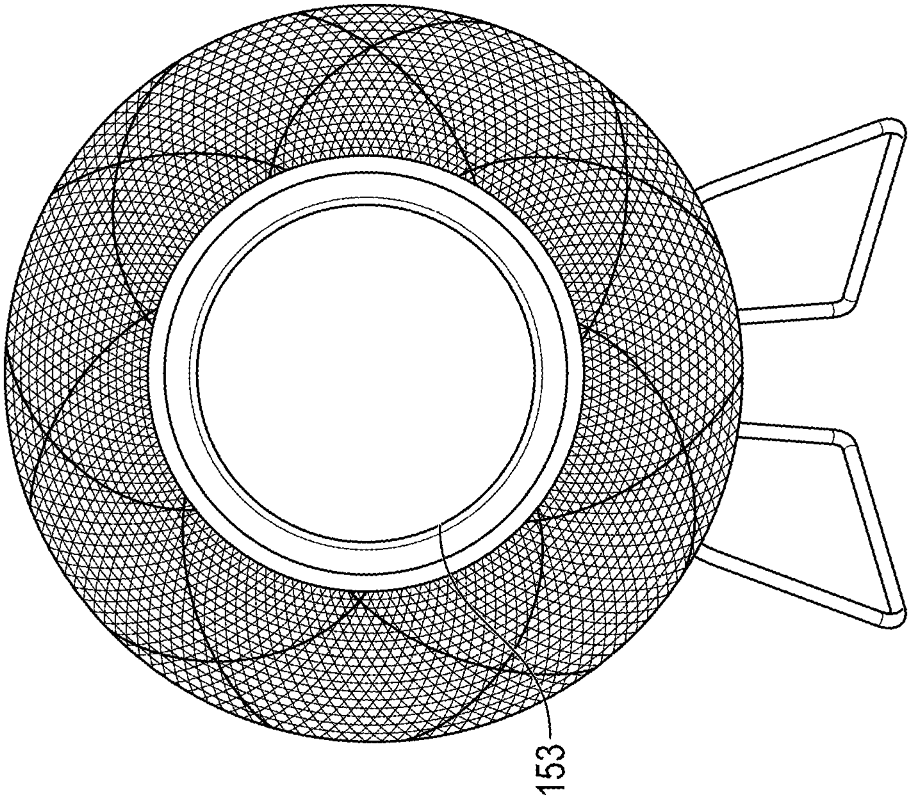
FIG. 45 is a front view of an example speaker with a stand.
Figure 44:
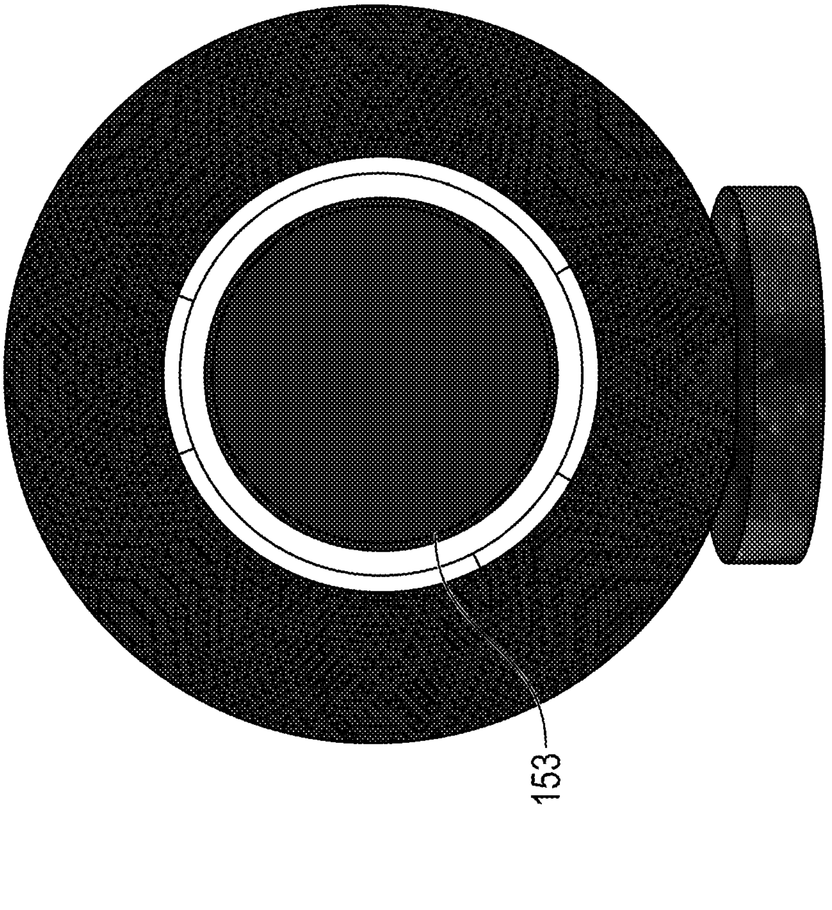
FIG. 44 is a front view of an example speaker.

Various other types of supports can be used for the speaker 100. FIG. 45 shows an example embodiment of a support for the speaker. The support can have a right support member, with a first portion that extends downward from a first location on the speaker housing, a second portion that extends generally horizontally to provide a right support surface that can rest on a table, desk, or other object, and a third portion that extends upward to a second location on the speaker housing. The support can have a left support member, with a first portion that extends downward from a third location on the speaker housing, a second portion that extends generally horizontally to provide a left support surface that can rest on a table, desk, or other object, and a third portion that extends upward to a fourth location on the speaker housing. The support of FIG. 45 can be made of metal, although any suitable material can be used. The support of FIG. 45 can have posts 182, which can extend upward from the first and second portions, so that the support of FIG. 45 can couple to the main body portion 102 similar to other embodiments discussed herein.

Figure 46:
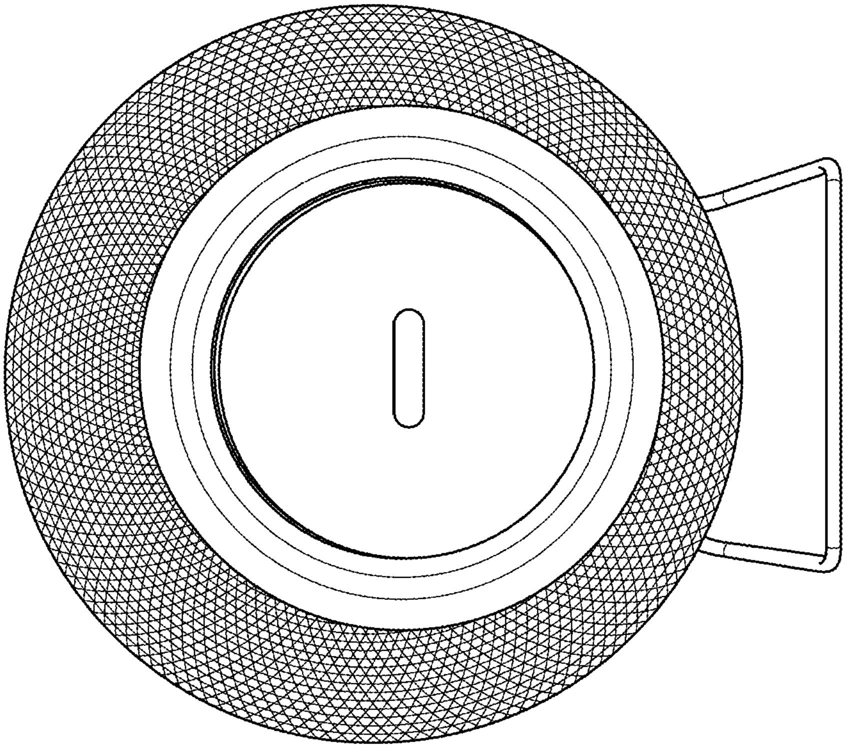
FIG. 46 shows an example speaker with another stand.

FIG. 46 shows another example embodiment of a support for the speaker 100. The support can have a first portion that extends downward from a first location on the speaker housing, a second portion that extends generally horizontally to provide a support surface that can rest on a table, desk, or other object, and a third portion that extends up to a second location on the speaker housing. The second portion can have one or more turns to provide angles sections that lie on substantially the same plane, to provide a stable support surface. The second portion can generally follow three sides of a rectangle, although various other shapes can be used. The support of FIG. 46 can be made of metal, although any suitable material can be used. The support of FIG. 46 can have posts 182, which can extend upward from the first and third portions, so that the support of FIG. 46 can couple to the main body portion 102 similar to other embodiments discussed herein.

Figure 47:
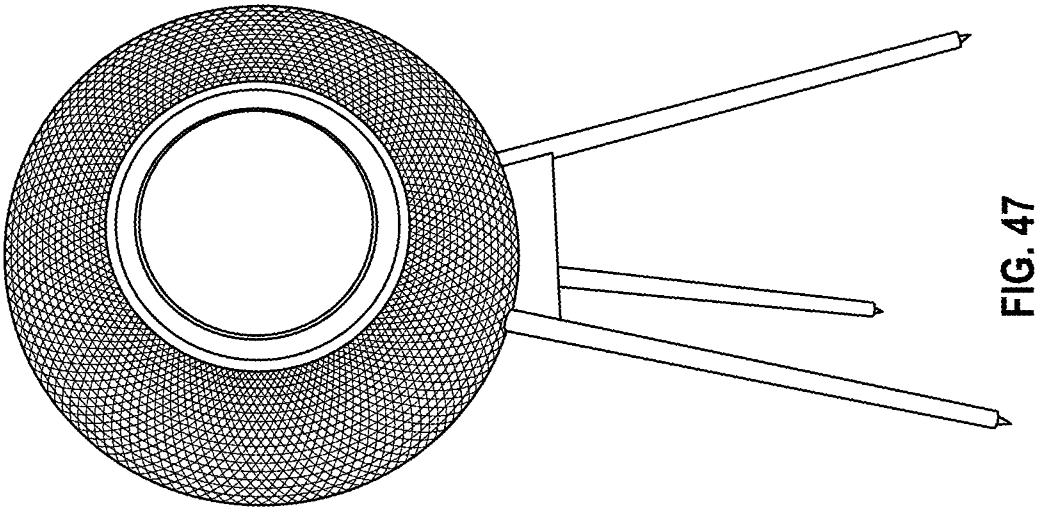
FIG. 47 shows an example speaker with another stand.

With reference to FIGS. 47, the support can include 3 or more legs which can extend downward from a coupling member, and the legs can have any suitable length to position the speaker at any suitable height. The coupling member can engage the housing of the speaker to support the speaker. In some embodiments, the coupling member can include an arm that extends upward similar to other supports disclosed herein. The coupling member of the support of FIG. 47 can have posts 182, which can extend upward therefrom, so that the support of FIG. 47 can couple to the main body portion 102 similar to other embodiments discussed herein.

Figure 48:
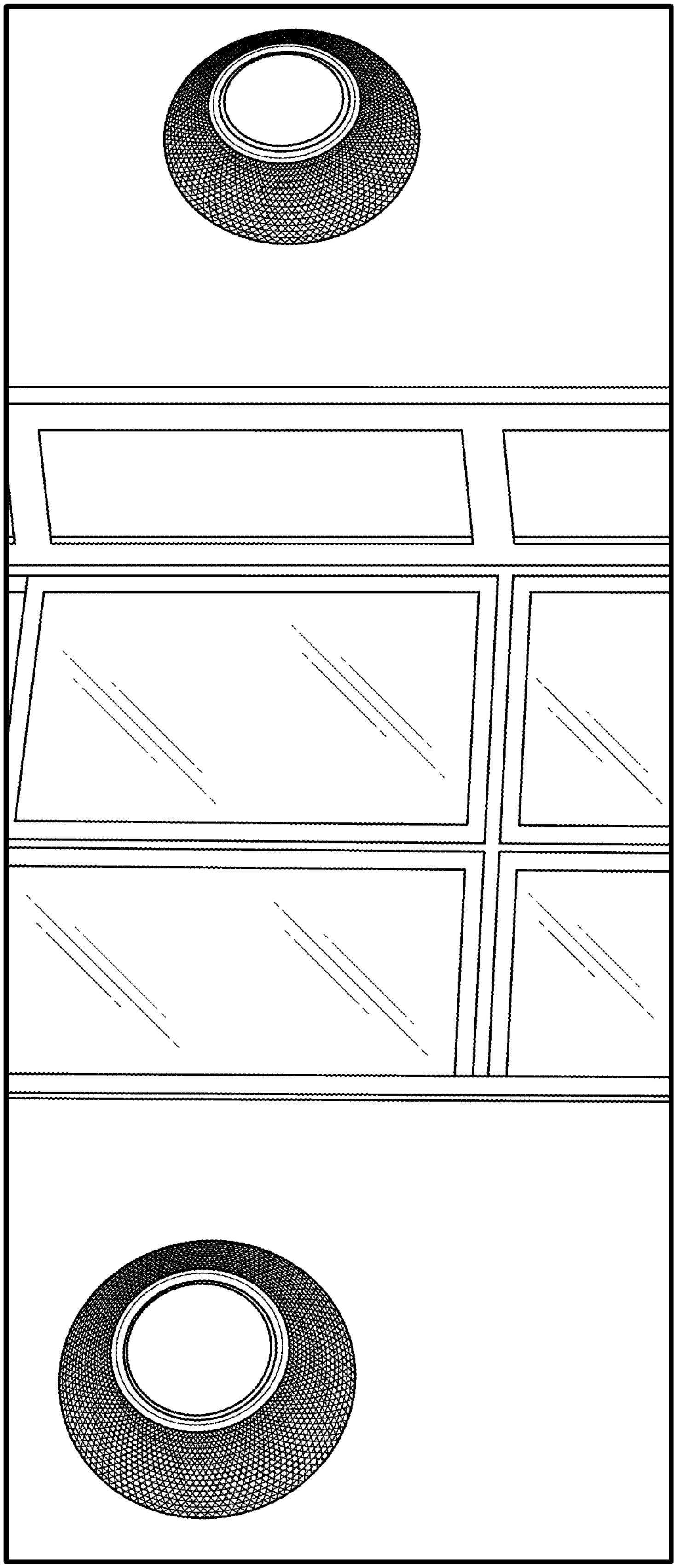
FIG. 48 shows example speakers mounted to a wall.
Figure 49:
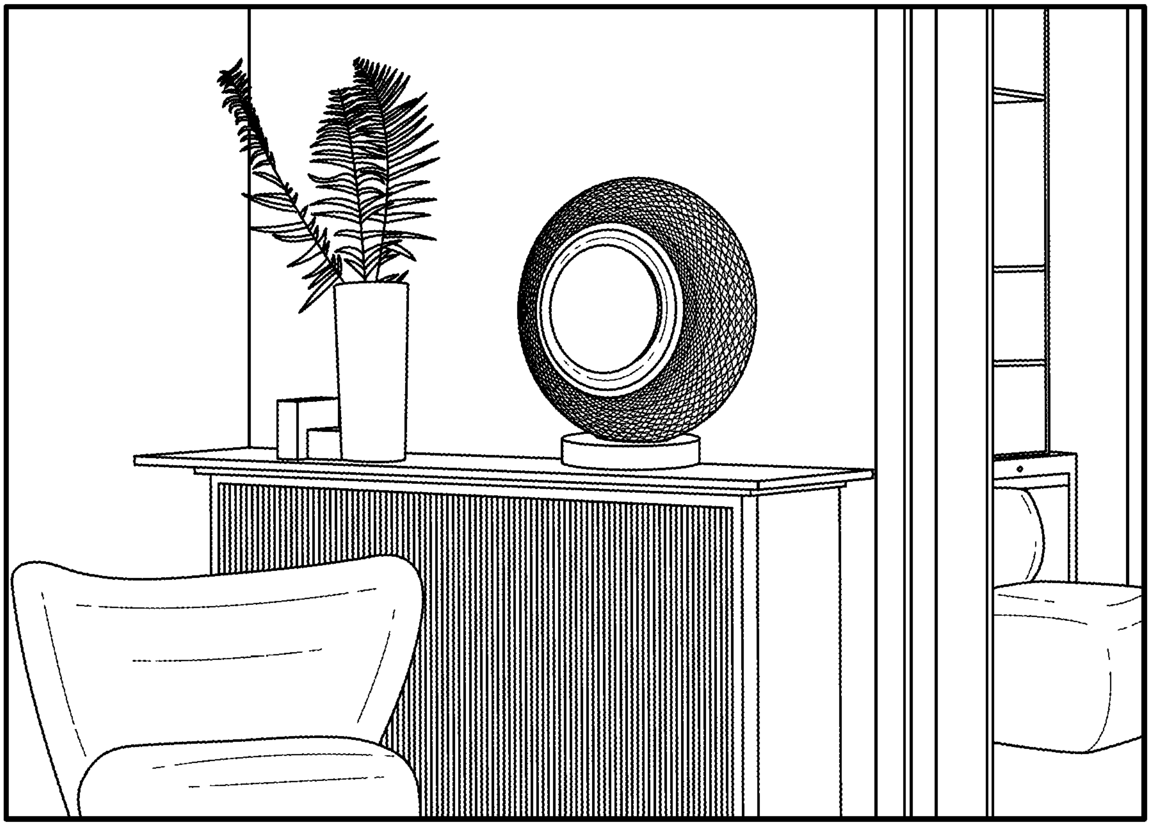
FIG. 49 shows an example speaker.
Figure 50:
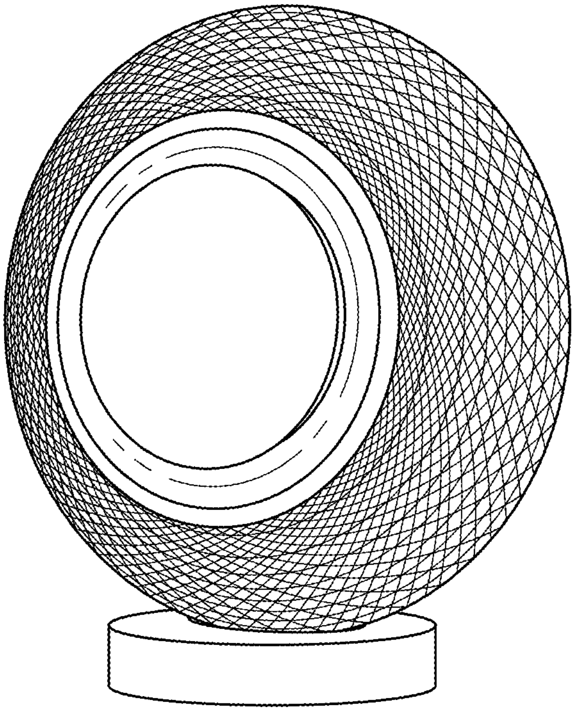
FIG. 50 shows an example speaker.
Figure 51:
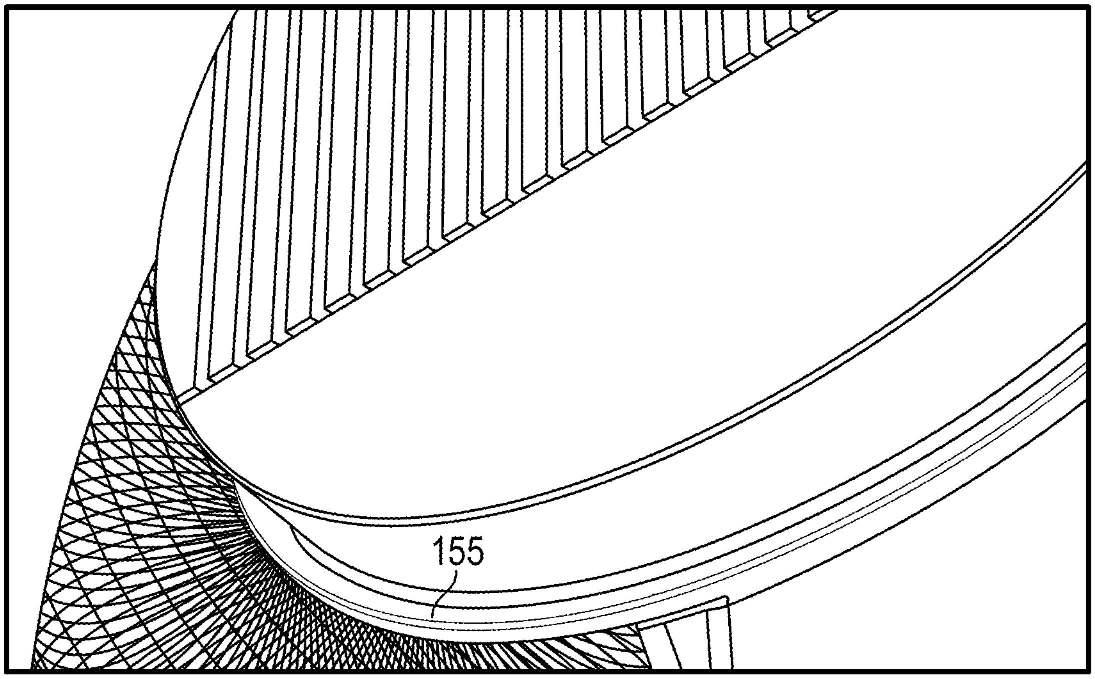
FIG. 51 shows a partial view of a back side of an example speaker.

With reference to FIG. 48, in some embodiments, the speaker can include a wall mount mechanism, which can enable the speaker to be mounted onto a wall. For example, the rear housing portion can include one or more engagement features that can be configured to engage a screw, hook, nail, or other mount structure to mount the speaker onto the wall. In some embodiments, a wall mount mechanism can include posts 182, so that the wall mounts in FIG. 48 can couple to the main body portion 102 similar to other embodiments discussed herein.

As can be seen in FIGS. 19 and 20, for example, the speaker can include electrical components, which can control operation of the speaker. The electrical components can include any combination of circuitry, a printed circuit board, a controller (e.g., including a hardware processor), computer-readable memory, one or more amplifiers, one or more power converters, a power supply, one or more communication modules (such as a Bluetooth communication module, a WiFi communication module, or another wireless communication module), a wired communication port, etc. The memory can include instructions, which can be executed by the processor to operate the speaker and perform the functions disclosed herein. In some embodiments, a printed circuit board can be positioned rearward of the subwoofer 130 and/or in front of the rear housing portion or rear cover 110. The printed circuit board can be positioned between the subwoofer 130 and the rear housing portion or rear cover 110, in some cases.

Figure 52:
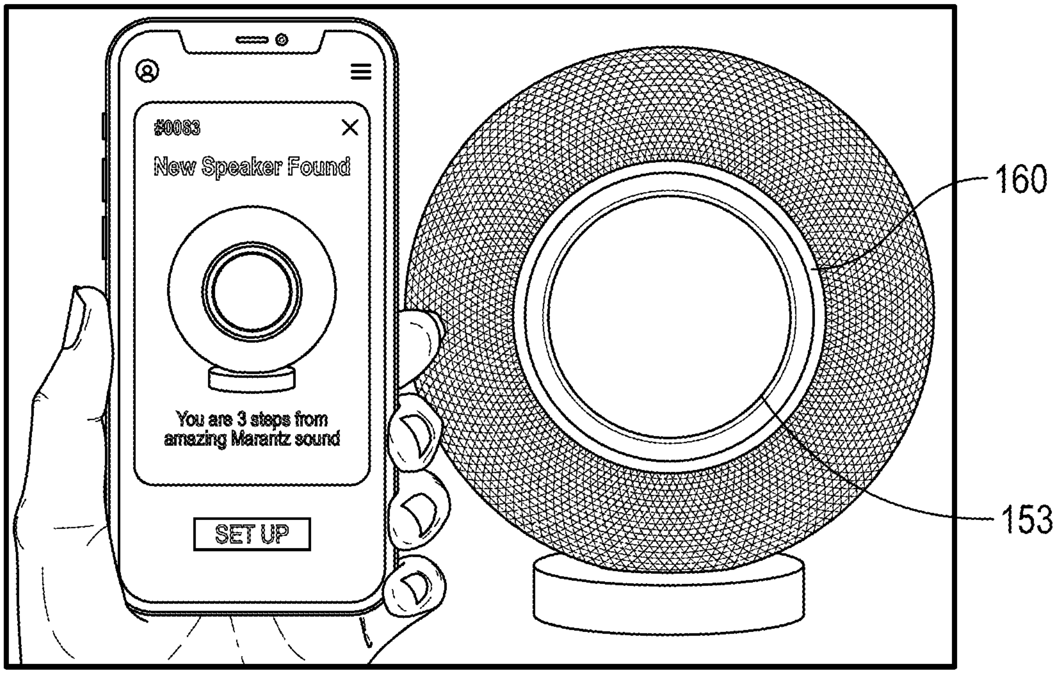
FIG. 52 shows an example speaker and a smartphone running an app for controlling the speaker.

With reference to FIG. 52, the speaker can communicate with a mobile user device (e.g., a watch, smartphone, tablet, laptop) or other computing device, such as using a wireless communication link (e.g., Bluetooth, WiFi, etc.), or combinations of any of the foregoing. The user device can be used to setup the speaker and/or to control the speaker, such as adjust volume, balance, or other audio settings, or to select audio to play on the speaker, etc.

Figure 54:
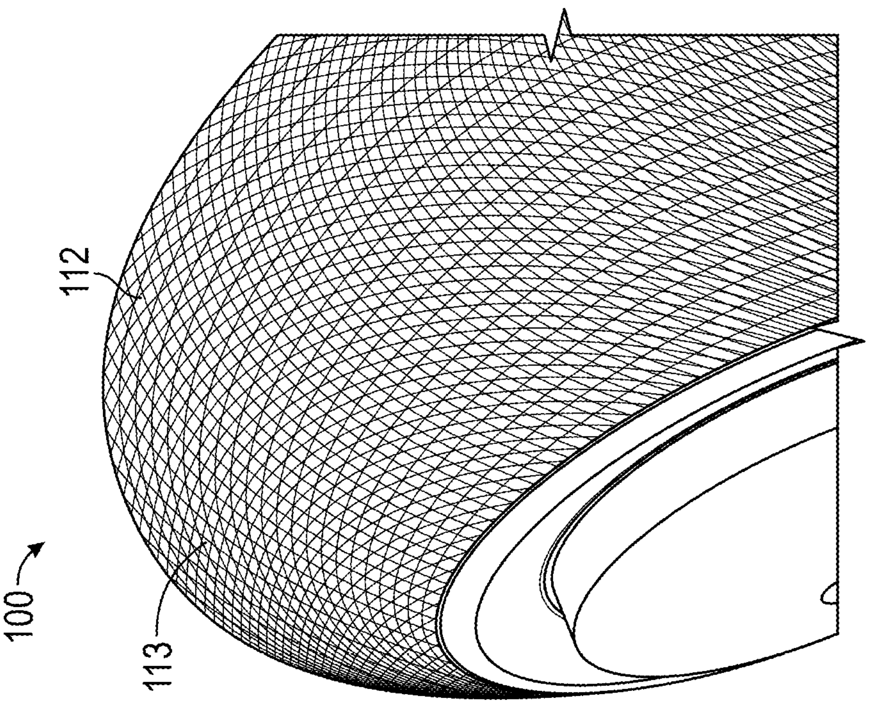
FIG. 54 shows an example speaker with fabric having a seam.
Figure 53:
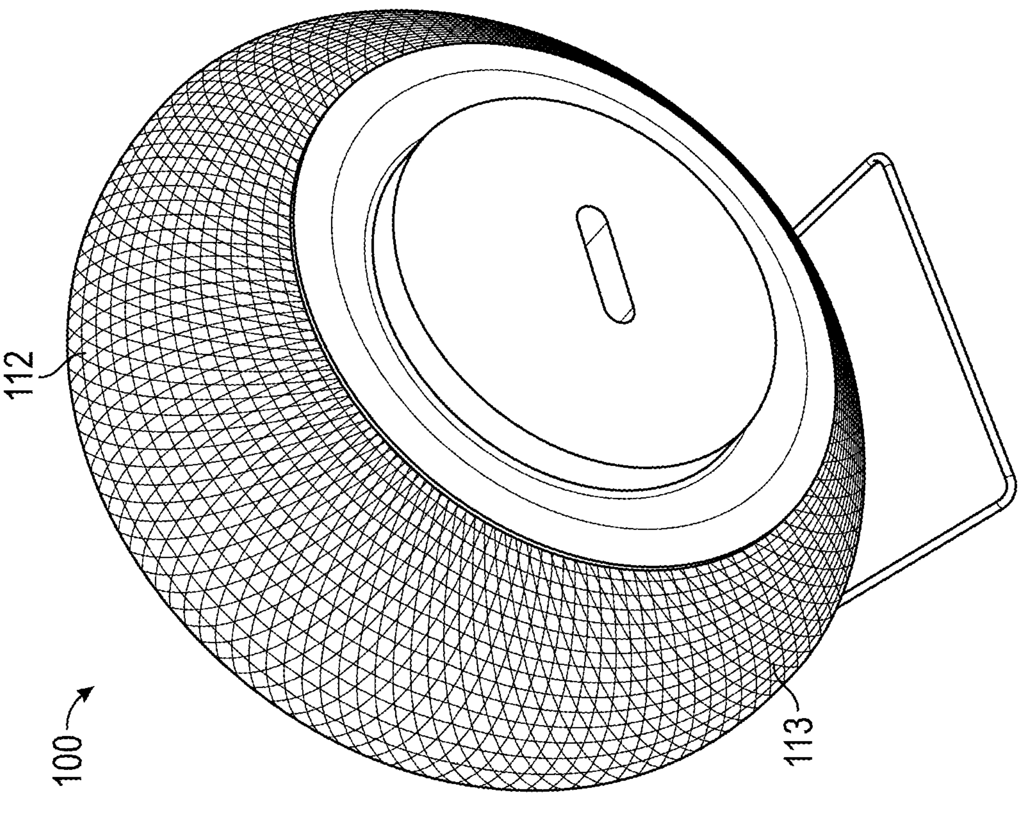
FIG. 53 shows an example speaker with fabric having a seam.
Figure 56:
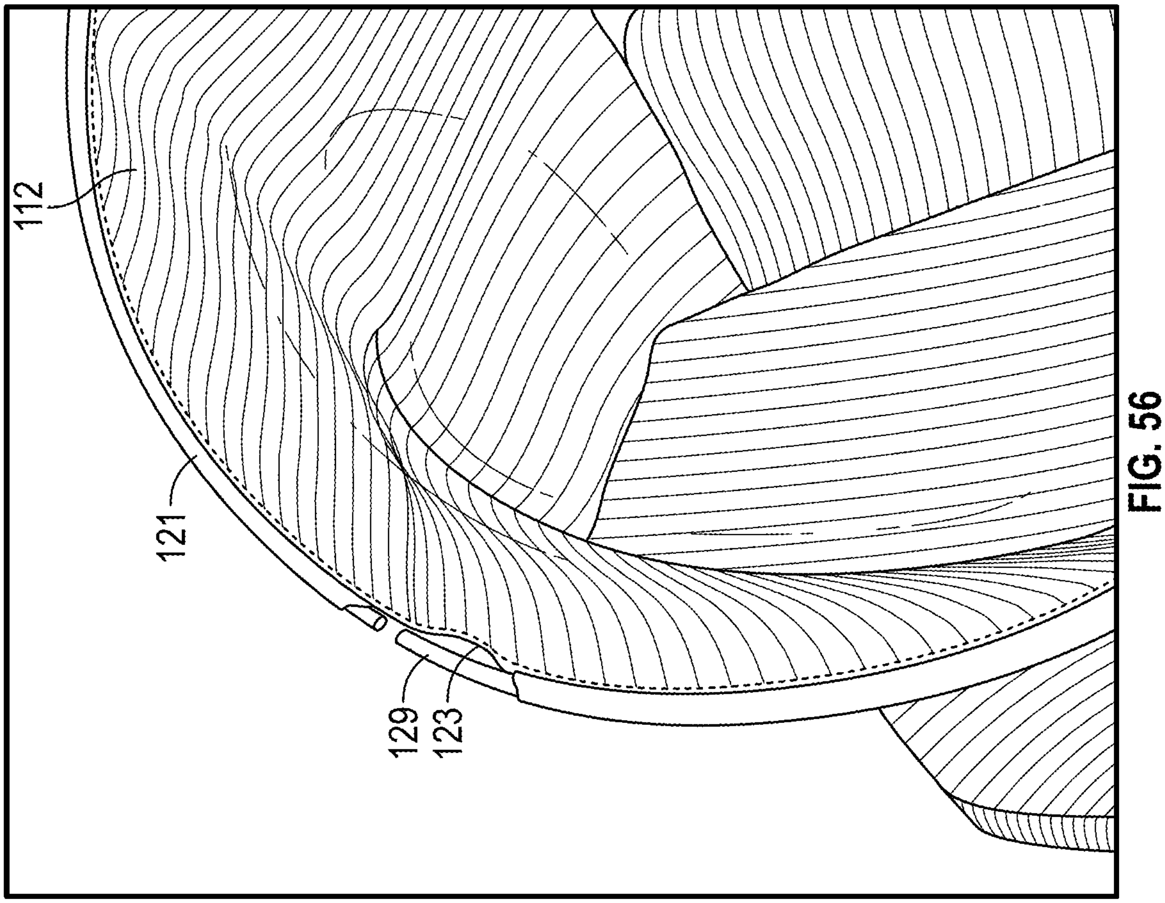
FIG. 56 is a partial view of fabric with a ring in a channel of the fabric.
Figure 55:
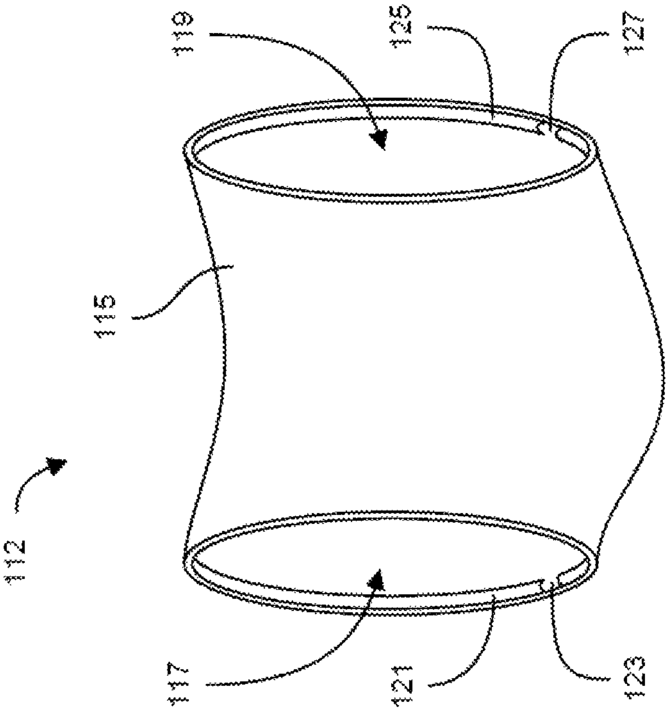
FIG. 55 shows an example of fabric for use with a speaker.

The speaker 100 can include a fabric covering 112, which can cover some or all of the outer housing portion 106. In some embodiments, the fabric can be knitted. The fabric can be knitted using a flat knitting technique, where the fabric is knitted as a flat piece of fabric and then the ends are joined to create the tube of fabric. Joining the ends can result in a seam 113, which can be visible on the speaker, as shown in FIG. 53. In some cases, stitching detail can be used to hide or deemphasize the seam 113, as shown in FIG. 54 for example, but that process can add cost and complexity and in some cases the seam can still be visible. An artisan will recognize from the disclosure herein that the seam 113 can be visibly reduce or entirely eliminated using one or a combination of the applications and techniques described herein. The fabric covering 112 can have a body 115 that has a generally cylindrical shape, as shown in FIG. 55. The fabric 112 can be a knitted tube, in some cases. The fabric 112 can have a first opening 117 at a first end and a second opening 119 at a second end, as can be seen in FIG. 55. The fabric 112 can have a channel 121 formed at the first opening 117. The channel 121 can have an opening 123, which can enable a ring 129 to be inserted into the channel, as shown in FIG. 56. The fabric 112 can have a channel 125 formed at the second opening 119. The channel 125 can have an opening 127, which can enable a draw string to be threaded through the channel 125.

The flat knitting technique can be scaled to different sizes. As discussed herein, in some cases different sizes of speakers can be used, and the flat knitting technique can simplify the production of fabric covers for speakers of various sizes. Also, the flat knitting approach can facilitate the inclusion of additional features into the fabric, such as a welt, a ring channel 121, a drawstring channel 125, and/or holes, etc. In some cases, some or all of these features can be knitted directly into the fabric.

In some embodiments, a circular knitting technique can be used to make the fabric. The circular knitting technique can be used to knit the fabric directly into the circular shape, with no seam 113. However, with the circular knitting technique some of the additional features (e.g., a welt, a ring channel 121, a drawstring channel 125, and/or holes, etc.) may need to be added after knitting. For example, one end of the tube can be knitted with a welt, while the ring channel 121, drawstring channel 125, and/or holes can be formed after knitting. The holes can be cut into the fabric. The ring channel 121 and/or drawstring channel 125 can be formed by folding an end of the fabric over and sewing it to form the channel. In some embodiments, a separate piece of material can be attached to the fabric (e.g., sewn thereto) to form the channel 121 and/or the channel 125 For circular knitting, the knitting can be set to a specific diameter, so that scaling the fabric tube to a different size can require recalibration one or more of the yarn combination, the needle density, and the knitting pattern, etc. The knitted fabric can be made of a single yarn (e.g., "1 end") or multiple yarns (e.g., "3 ends"). In some embodiments, the fabric can be made using some strands of non-elastic yarn and some strands of elastic yarn that are knitted together. In some embodiments, the fabric can include a stretch yarn, which can include elastic and non-elastic yarn that are spun together. In some cases, using the stretch yarn can facilitate concealing of the seam 113 in the fabric, which can result from using the flat knitting approach. The fabric 112 can have sufficient elasticity to stretch over the outer housing portion, as discussed herein. In some embodiments, the yarn and/or knit pattern can be used to produce a swirl pattern, as shown in at least FIGS. 42 and 53.

Figure 57:
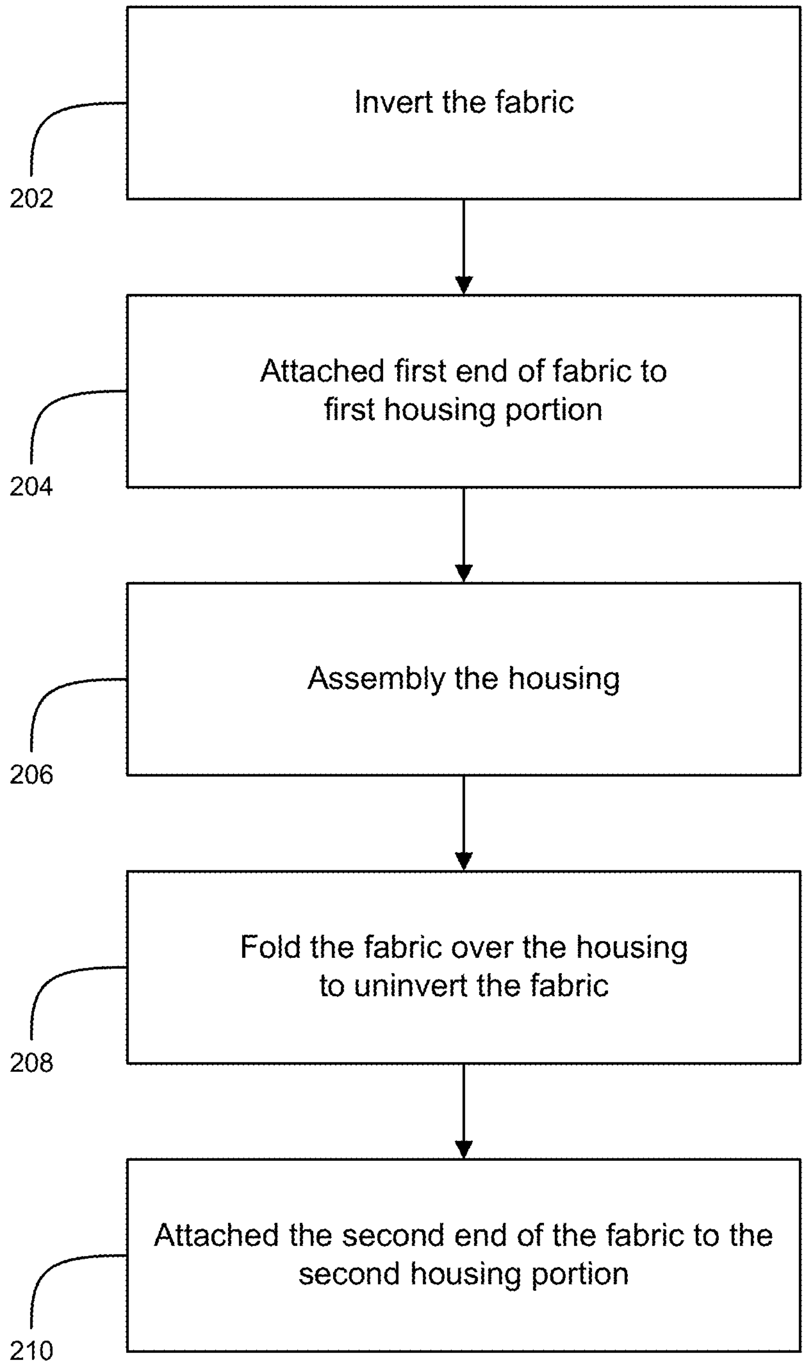
FIG. 57 shows a flowchart for a method of attaching a fabric to a speaker.
Figure 59:
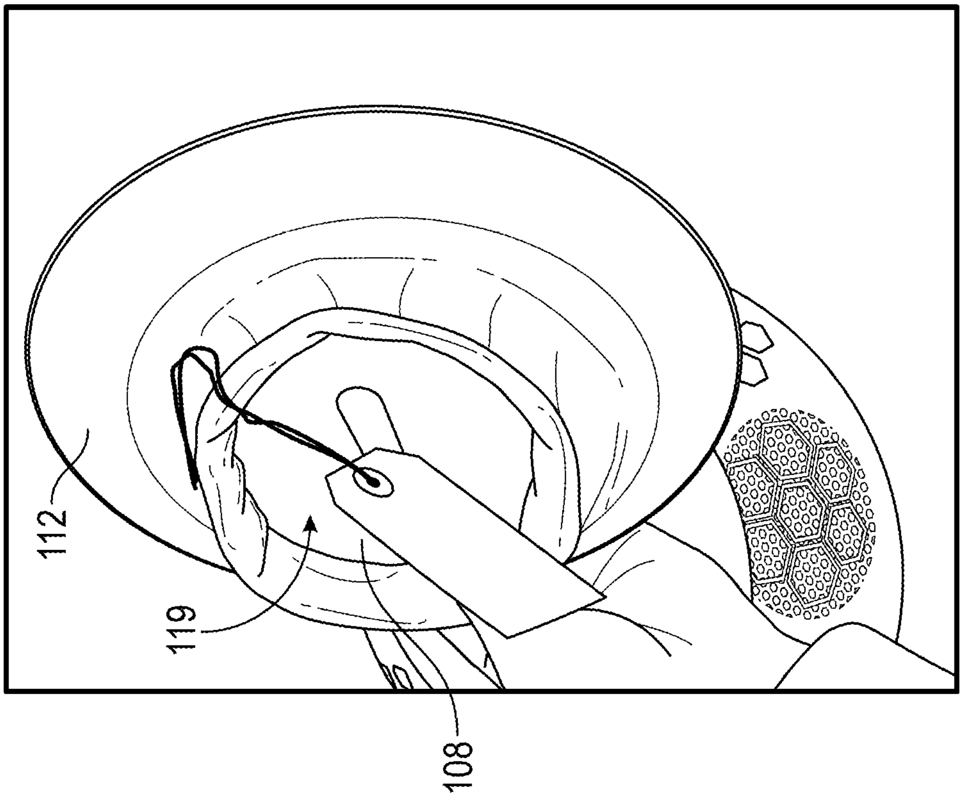
FIG. 59 shows a fabric attached to a front portion of a speaker.
Figure 58:
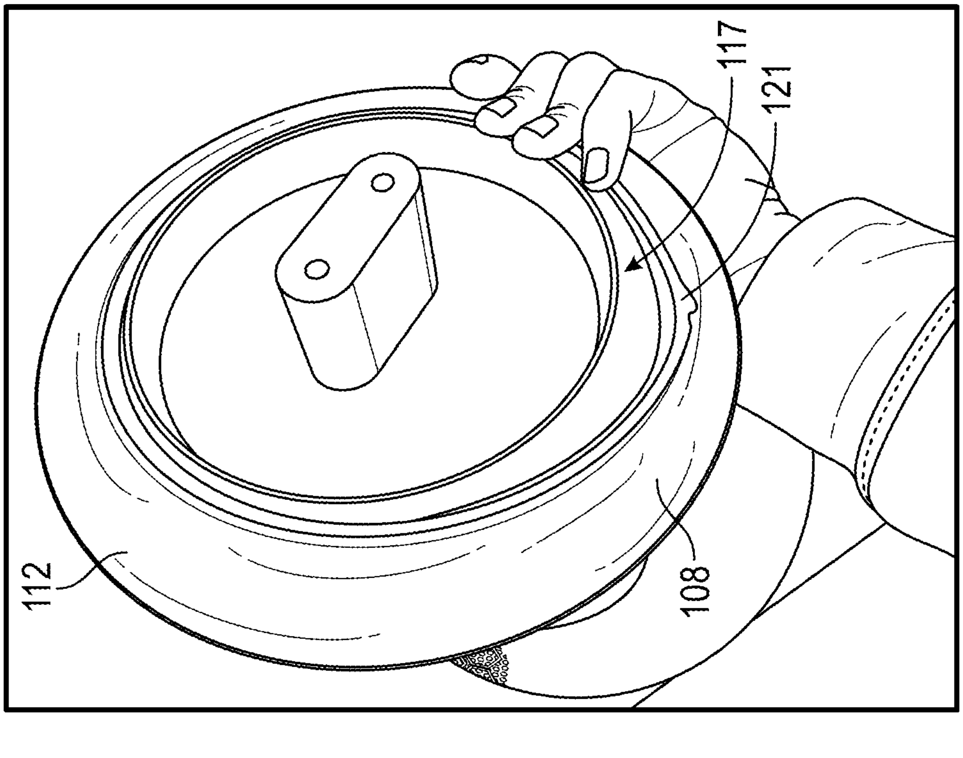
FIG. 58 shows a fabric attached to a front portion of a speaker.

FIG. 57 is a flowchart showing an example method for attaching the fabric 112 to the speaker 100. At block 202, the fabric 112 is inverted so that it is inside-out. At block 204, the first end of the fabric 112 is attached to a first housing portion. The first end of the fabric 112 can be secured to the front housing portion, to a front of the outer housing portion, or can be secured between the front housing portion and the outer housing portion. For example, the first end of the fabric 112 can be attached to the front cover 108, or to the front outer housing portion 124, or any other suitable housing portion. In some cases, the fabric 112 can be attached to the back of the speaker 100 first, and the first end of the fabric 112 can be attached to the back cover 110, to the rear outer housing portion 128, or any other suitable housing portion. FIGS. 58 and 59 show the fabric 112 attached to the front cover 108. By way of example, the front cover 108 can be inserted through the second opening 119 of the inverted fabric 112 and advanced through the tube of fabric until it reaches the first opening 117, as shown in FIGS. 58 and 59. The ring 129 can be smaller than the front cover 108, so as to impede the front cover 108 from passing through the first opening 117.

Figure 61:
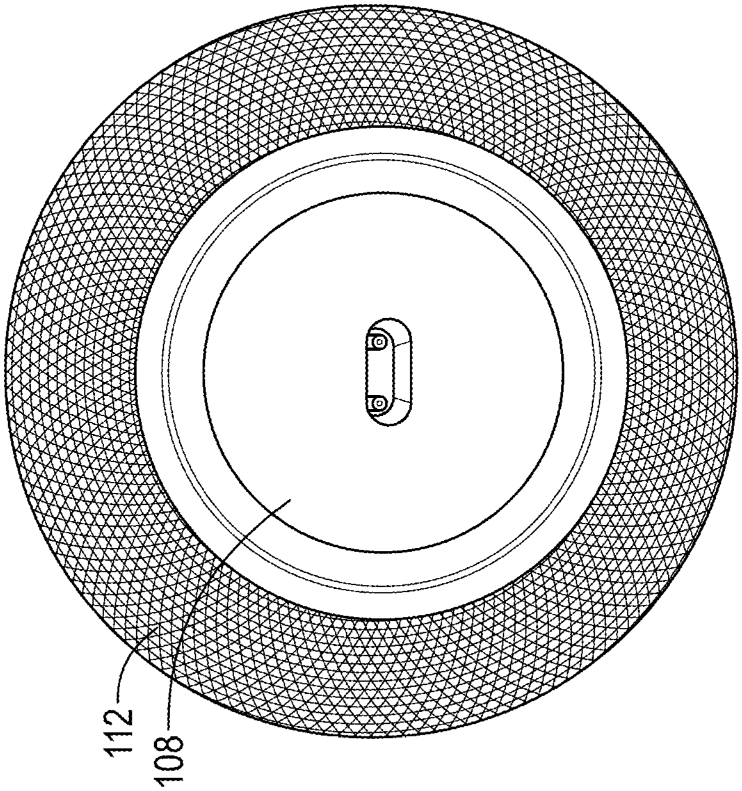
FIG. 61 shows a fabric on a speaker.
Figure 60:
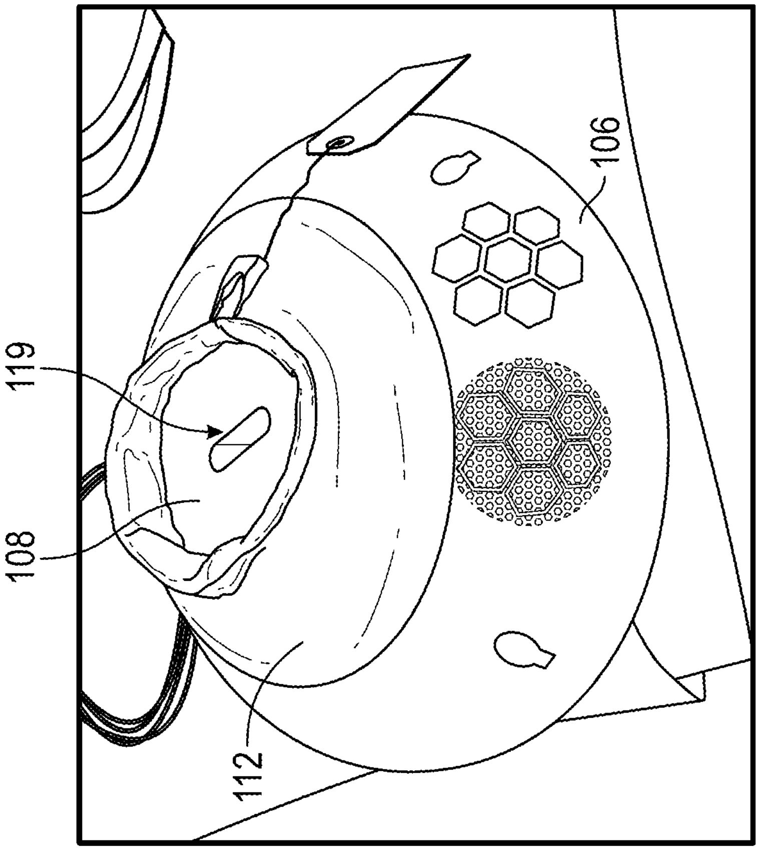
FIG. 60 shows a fabric attached to a front portion of a speaker.

At block 206, the housing of the speaker can be assembled. The portion that has the fabric 112 attached thereto can be coupled additional portions of the housing. By way of example, the front cover 108, with the fabric 112 attached thereto, can be coupled to the outer housing portion 106, as shown in FIG. 60. At block 208, the fabric 112 can be folded over the housing outer portion 106, which can uninvert the fabric back to the right-side-out configuration, as shown in FIG. 61. The body 115 of the fabric 112 can be stretched over the outer housing portion 106 of the speaker 100. The fabric pieces can be formed (e.g., knitted) for induvial speakers (as opposed to being cut out from a larger sheet of fabric). The fabric body 115 can be wider in the middle to accommodate the shape of the outer housing portion 106. The knitting process can enable the color, finish, and/or design of the fabric to be tailored or adjusted. By way of example, the fabric of FIG. 45 can have the unique design that is produced by selecting certain colors (e.g., of yarn) and using a particular knitting pattern to produce the design.

At block 210, the second end of the fabric can be coupled to a second housing portion, such as to a rear housing portion, such as the rear outer housing portion 128 or the back cover 110. The second end of the fabric can be secured to the rear housing portion, to a rear of the outer housing portion 128, or can be secured between the rear housing portion and the outer housing portion, or to any other suitable housing portion. In some embodiments, a ring can be inserted into the channel 125, and the ring can be smaller than the outer housing portion 106, to impede the fabric 112 from coming off, similar to the discussion of the ring 129 in the channel 121.

With reference to FIG. 56, the fabric can include a channel 121 at the first end, such as by the first opening. A ring 129 (e.g., made of metal or other sufficiently rigid material) can be inserted into the channel 121, as discussed herein. The ring 129 can have a break or gap, and the channel can have at least one opening. An end of the ring 129 can be inserted into the channel through the opening 123, and the ring 129 can be threaded into the channel 121. The ring 129 can be coupled to the front housing portion (e.g., which can be a plastic grille in some embodiments), or any other suitable housing portion. FIG. 58 shows an example of a fabric member coupled to a back side of the front housing portion 108. The front housing portion 108 can have a protrusion that extends rearward in the embodiment of FIG. 58, although various designs are possible for the front housing portion 108. The ring 129 (e.g., threaded inside the channel 121 in the fabric) can have a larger diameter than the protrusion, so that the protrusion can be inserted through the ring. The protrusion can impede the ring 129 from disconnecting from the housing by sliding to the side. The front housing portion 108 can have a larger width or diameter than the diameter of the ring 129, so that the ring 129 and fabric 112 are impeded from being pulled off of the front housing portion 108 (e.g., during assembly). As shown in FIG. 59, the fabric 112 can be pulled forward over the front housing portion. The fabric 112 can be inside-out during this stage of assembly. The front housing portion 108 can be inserted into the fabric tube. As mentioned above, the ring 129 can impede the fabric from pulling off of the front housing portion 108 and/or can impede the front housing portion 108 from passing completely through the fabric tube.

The outer housing portion can be coupled to the front housing portion, as shown for example in FIG. 60. A portion of the fabric can extend between the front housing portion 108 and the outer housing portion 106. In some embodiments, the front housing portion 108 can include an extension that extends rearward to abut with another component of the housing, and one or more screws or other fasteners can be used to couple the front housing portion to the other housing component (e.g., the rear housing portion or the outer housing portion). The front housing portion can have an opening to provide access to the one or more screws or other fasteners, as shown in FIG. 61, although various other designs can be used. The front housing portion 108 can be coupled to the outer housing portion 106 by various other suitable mechanisms. For example, with reference to FIG. 20, the speaker 100 can have a front cover 108, a first ring (e.g., the trim 150), and a second ring (e.g., the rear light ring 155). The first end of the fabric 112 (e.g., and the ring 129) can fit onto the first ring (e.g., the trim 150), can be coupled between the first and second rings, etc. In some embodiments, the ring 129 and the fabric channel 121 can be omitted. The fabric can be coupled to the housing (e.g., to the front housing portion and/or to the outer housing portion) using an adhesive, using one or more fasteners such as screws, clamps, pins, etc., or by a friction fitting, or in any other suitable manner. In some embodiments, the fabric can include a welt at the first end (e.g., by the first opening), and the thickened material of the welt can impede the first end of the fabric from pulling through a narrow gap (e.g., formed between the front housing portion and the outer housing portion).

Figure 62:
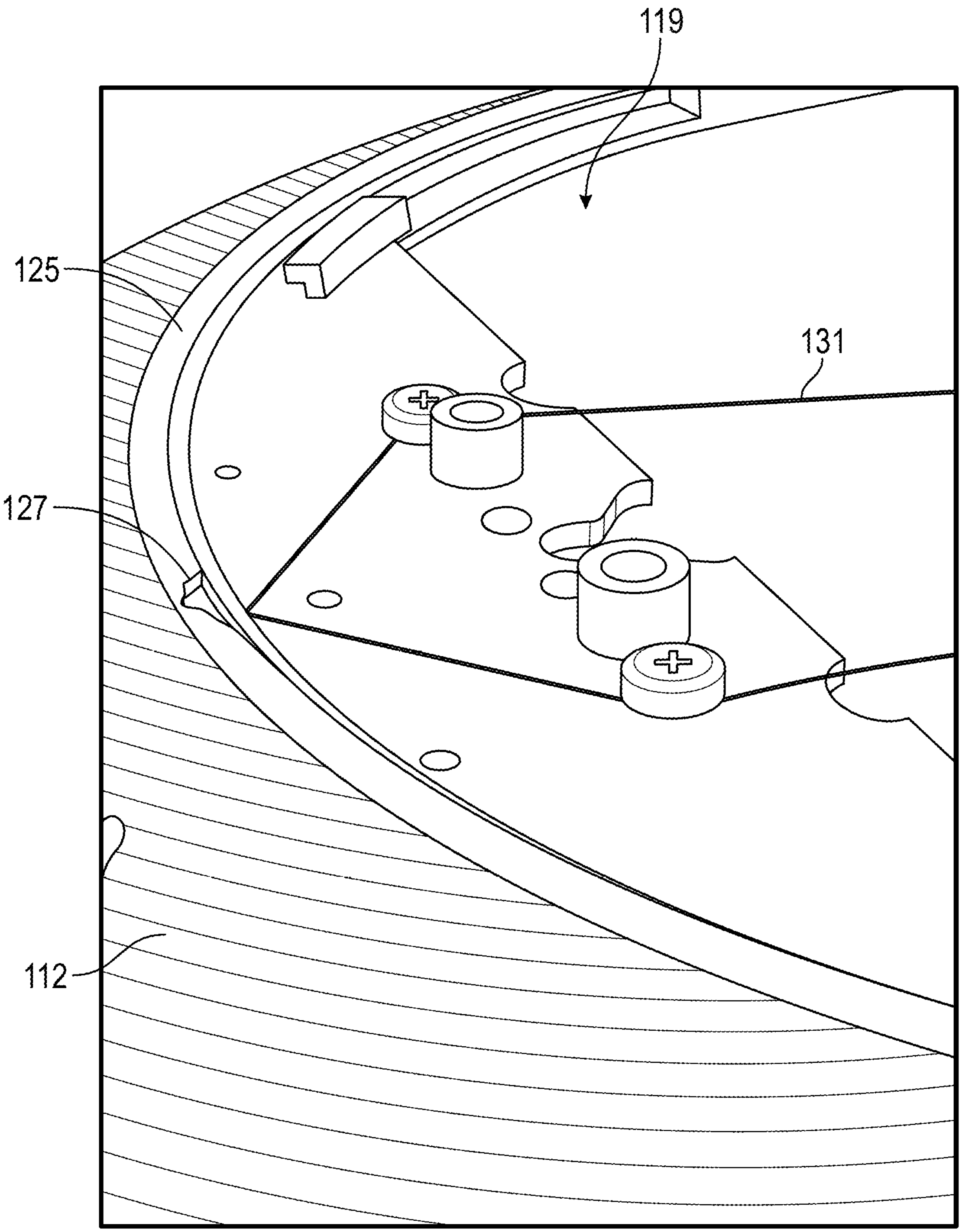
FIG. 62 shows a fabric attached to a speaker with a drawstring.

The fabric can be pulled over the outer housing portion so that the fabric turns right-side-out, and so that the second opening 119 moves from the front of the housing to the rear of the housing. The second opening 119 can stretch to widen sufficiently to let the outer housing portion 106 pass through the second opening 119. The fabric 112 can have a drawstring 131, as shown in FIG. 62, which can be used to shrink the second opening 119 down around the rear side of the housing. The fabric 112 can have a channel 125 at the second end (e.g., by the second opening 119). A drawstring 131 can be disposed in the channel 125. The channel 125 can have at least one opening 127, which can provide access to the drawstring 131, so that the drawstring 131 can be tightened (e.g., by pulling) to synch down the side of the second opening 119. The draw string 131 can be secured to impede the drawstring 131 from loosening again. For example, one or more screws can be tightened to clamp down on the drawstring 131. The drawstring 131 can be tied to a structure on the housing to impede the drawstring 131 from loosening. Various alternatives, such as a clip, clamp, or knot can be used to impede the drawstring 131 from loosening. The fabric 112 can be stretched over the outer housing portion 106, in some cases. Tightening the drawstring 131 can stretch the fabric 122 across the outer housing portion 106. The stretching of the fabric can improve the acoustic transparency of the fabric 112.

Figure 64:
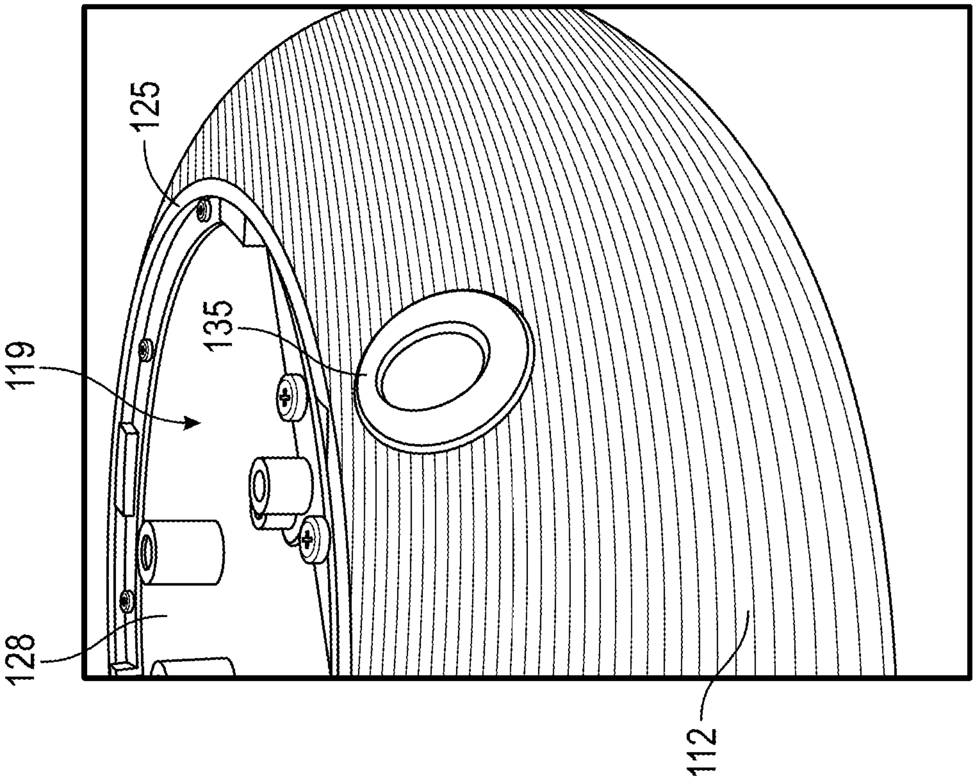
FIG. 64 shows a speaker with a cap in a hole.
Figure 63:
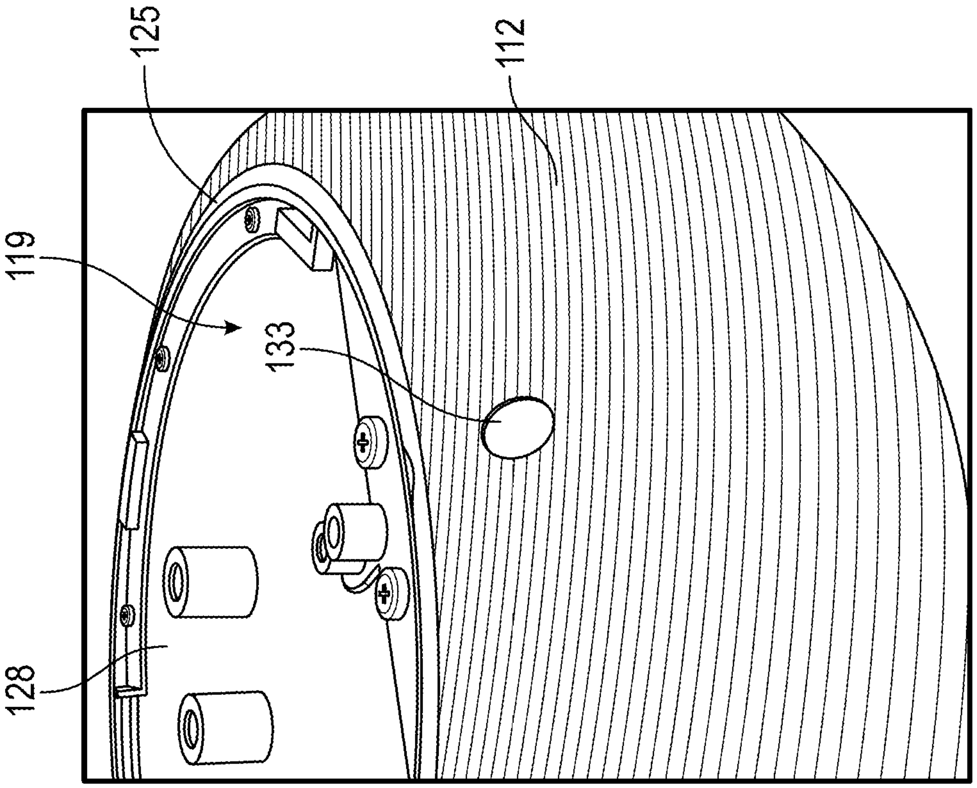
FIG. 63 shows a fabric with a hole on a speaker.
Figure 66:
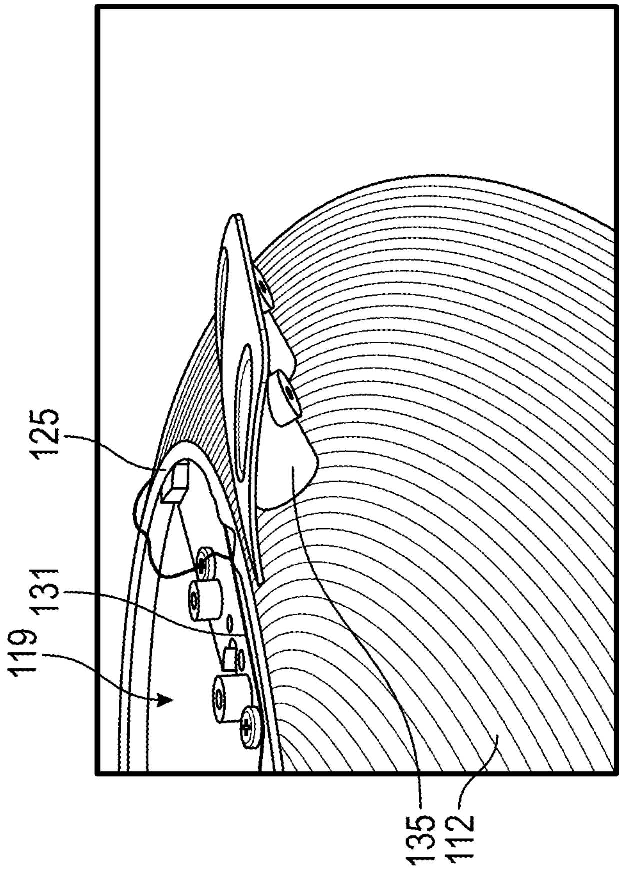
FIG. 66 shows a speaker with a cap in a holes.
Figure 65:
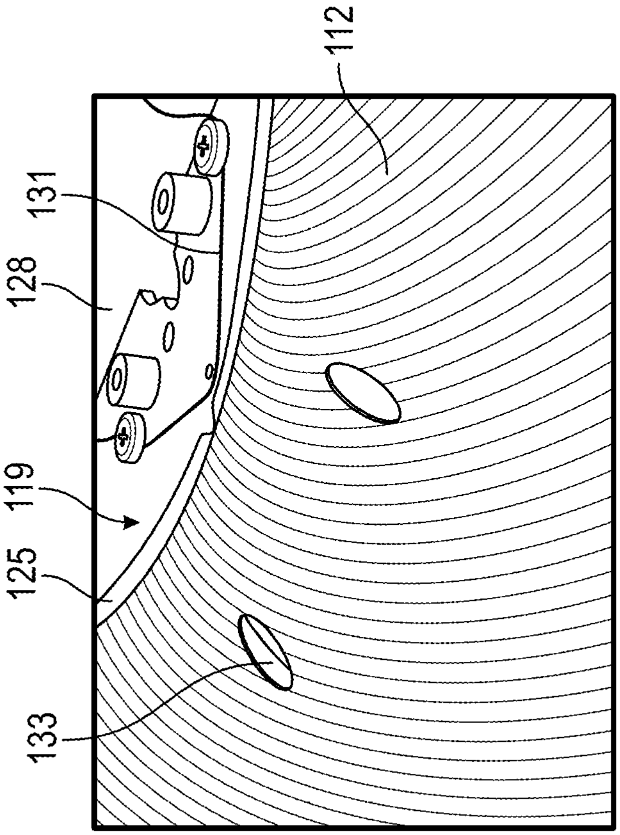
FIG. 65 shows a fabric with holes on a speaker.

With reference to FIGS. 63 to 66, in some embodiments, the fabric 112 can include one or more holes 133 or openings. The fabric 112 can be oriented on the housing so that the one or more holes 133 can substantially align with one or more corresponding features on the housing (e.g., mounting holes or other mechanisms). In some embodiments, a cap 135 can be inserted into the hole 133, as shown in FIG. 64 for example, and the cap 135 can cover the edge of the hole 133 in the fabric 112. The cap 135 can have an opening, such as for receiving a post 182 or other portion of the support 104 to couple the support 104 to the housing 102. In the embodiment of FIG. 64, a single post can be used. FIGS. 65 and 66 show an embodiment with two holes 133 in the fabric 112, which are partially aligned with two support holes on the housing 102. In some embodiments, the fabric 112 can be shifted or repositioned so that the one or more holes 133 in the fabric 112 align with the one or more holes or other corresponding features on the housing 102. FIG. 66 shows a plastic cap 135 that can engage two holes on the housing 102, and can cover the edges of the holes 133 in the fabric. The cap 135 of FIG. 66 can have arms that extend from the holes and a flange. The flange can have holes and screws (or other fasteners) can be used to secure the cap to another component (e.g., to a support base 104 or arm or wall).

Figure 68:
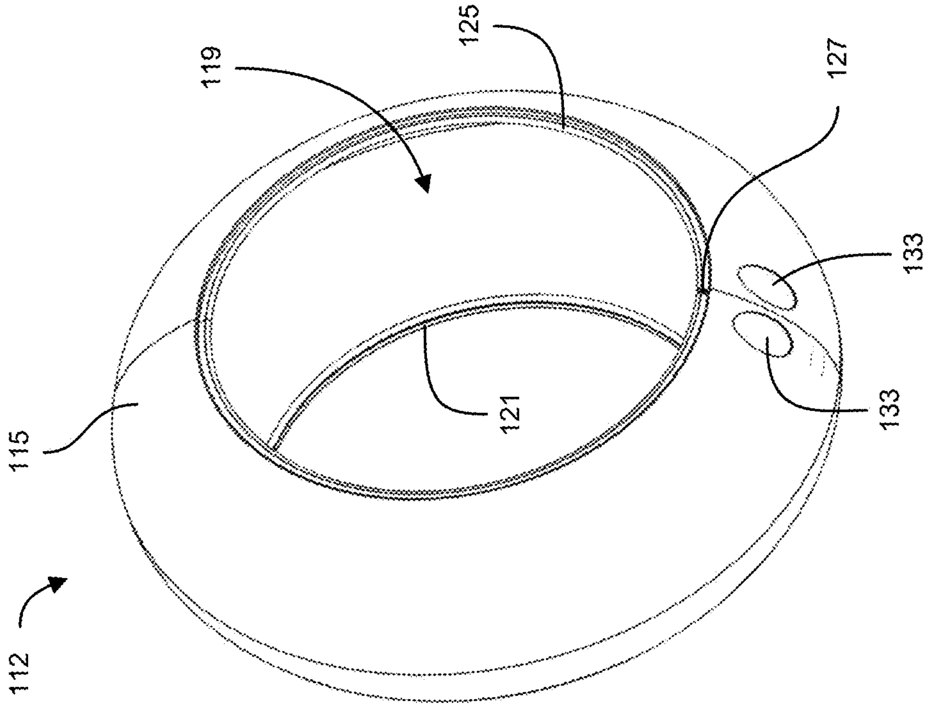
FIG. 68 shows rear view of an example of a fabric for use with a speaker.
Figure 67:
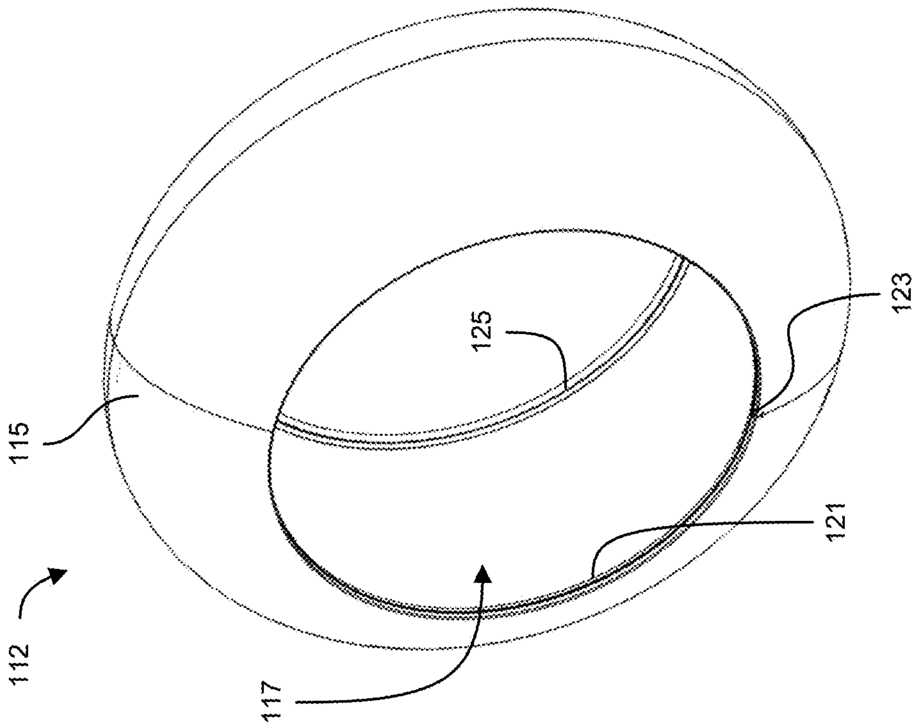
FIG. 67 shows front view of an example of a fabric for use with a speaker.
Figure 69:
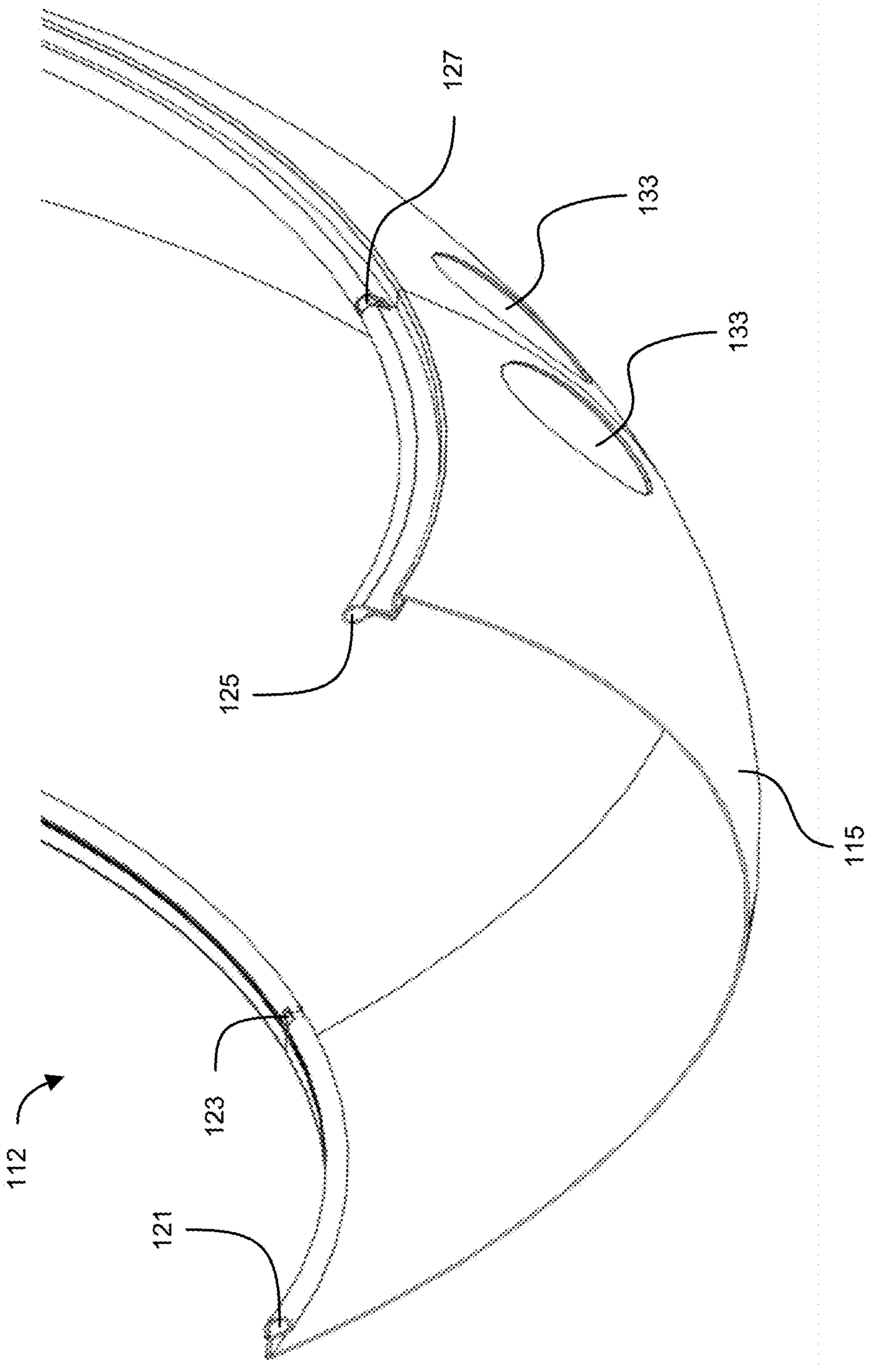
FIG. 69 shows cross-sectional view of an example of a fabric for use with a speaker.

FIG. 67 shows a front perspective view of the fabric 112, with the other components of the speaker 100 omitted from view. FIG. 68 is a rear perspective view of the fabric 112. FIG. 69 is a partial cross-sectional view of the fabric 112. The fabric 112 can have a body portion 115, a first opening 117 (e.g., at the front end), and a second opening 119 (e.g., at the back end). The fabric 112 can have a first channel 121 formed at a first (e.g., front) end of the fabric 112, such as at the first opening 117. The channel 121 can be formed by folding the end of the fabric back to form a loop, and then sewing or otherwise securing the folded back material in place. The first channel 121 can have an opening 123, which can enable a ring or drawstring to be threaded through the first channel 121. The fabric 112 can have a second channel 121 formed at a second (e.g., back) end of the fabric 112, such as at the second opening 119. The channel 125 can be formed by folding the end of the fabric back to form a loop, and then sewing or otherwise securing the folded back material in place. The first channel 121 can have an opening 123, which can enable a ring or drawstring to be threaded through the first channel 121.

Figure 70:
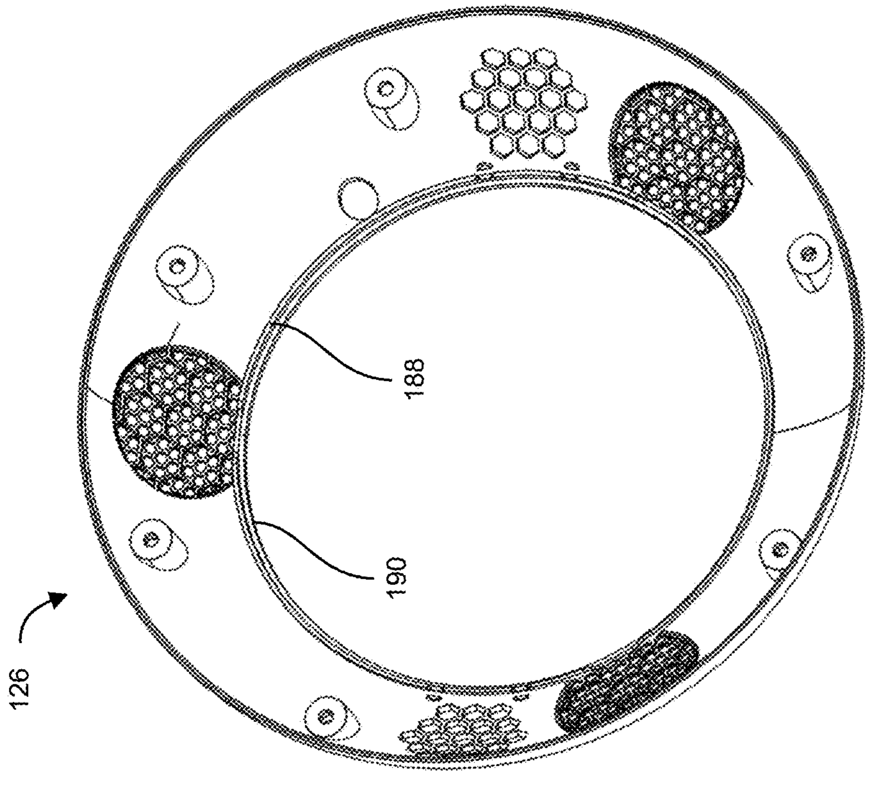
FIG. 70 shows a back side of a front outer housing portion of a speaker.

FIG. 70 shows a back side of the front outer housing portion 126. A ridge 188 can extend at least partially around the opening on the back side of the front outer housing portion 126. The ridge 188 can be spaced outward from the opening by a distance to form a flange 190. The ring 129 can be sized to fit inside of the ridge 188. The diameter of the ring 129 can be larger than the diameter of the opening through the front outer housing portion 126, and smaller than the diameter of the ridge 188. The fabric 112 (e.g., which can be inverted) can be fed through the opening of the front outer housing portion 126 from the back side to the front, until the ring 129 reaches the flange 190. The ring 129 can be seated inside of the ridge 188. The flange 190 can impede the ring 129 and the fabric 112 from pulling all the way through the opening. The ridge 188 can impede the ring 129 from moving laterally.

Figure 71:
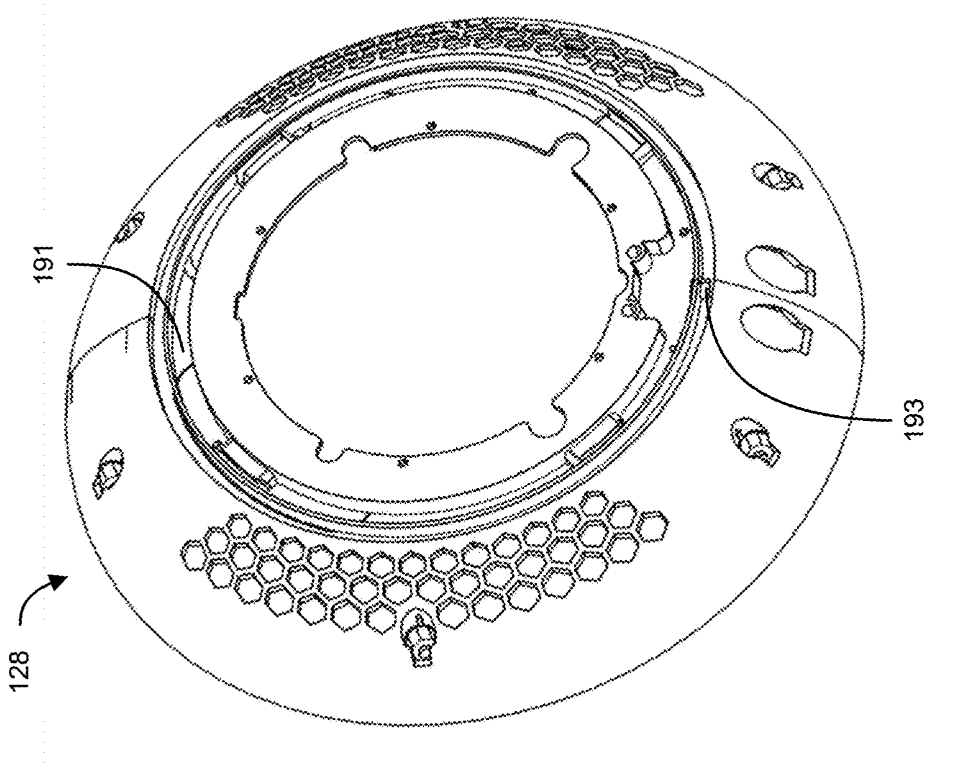
FIG. 71 shows a back side of a rear outer housing portion of a speaker.
Figure 72:
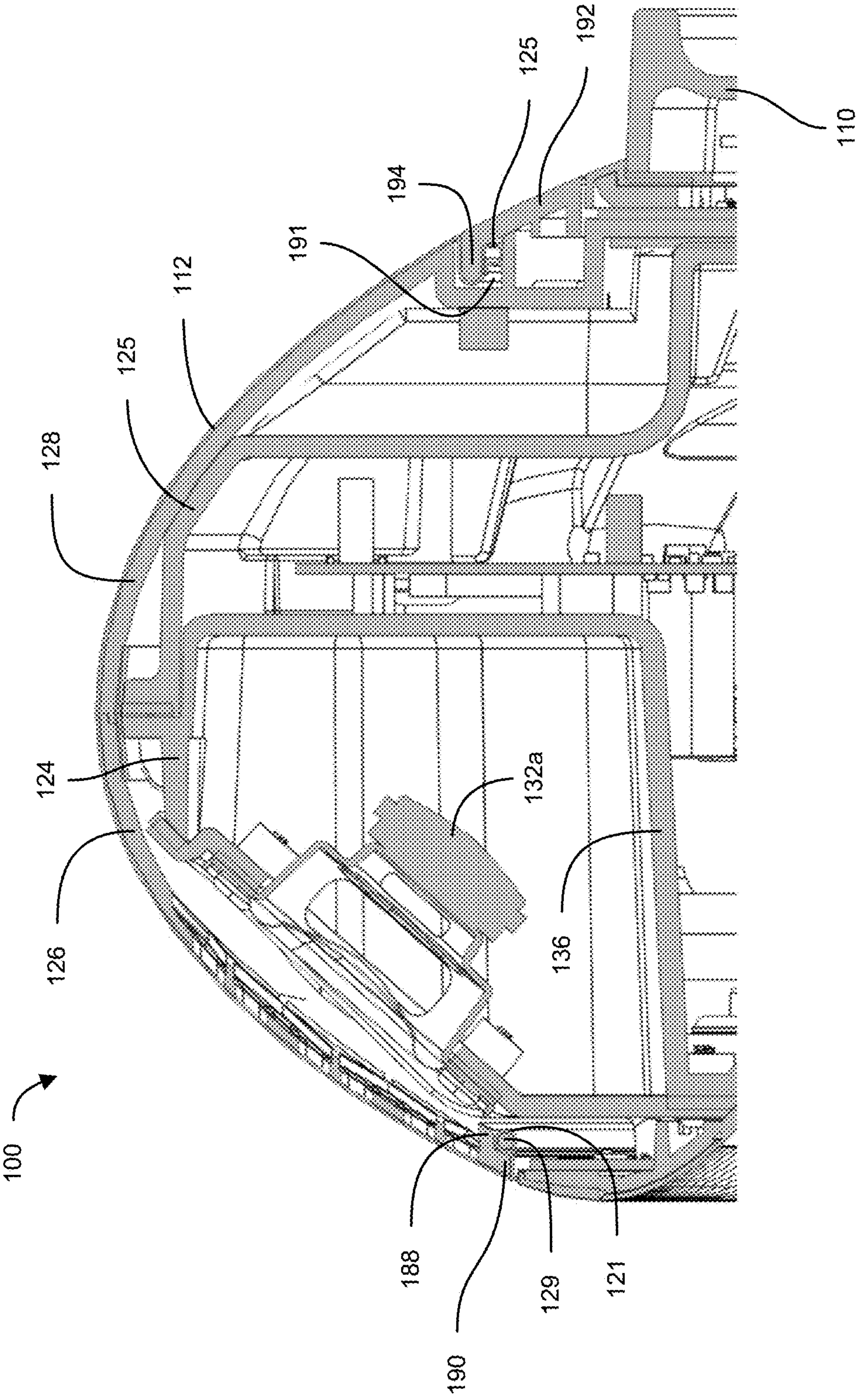
FIG. 72 shows a partial cross-sectional view of a speaker with a fabric attached thereto.

The front outer housing portion 126 can be attached to the rear outer housing portion 128. In some cases, other components of the speaker 100 can also be assembled at this stage. The fabric 112 can then be folded over the outside of the outer housing portion 106 (e.g., formed by the front outer housing portion 126 and the rear outer housing portion 128. FIG. 71 shows the back side of the rear outer housing portion 128. FIG. 72 shows a partial cross-sectional view of the speaker 100 with the fabric 112 installed. The back side of the rear outer housing portion 128 can include a recess 191, which can have an annular shape. The channel 125 can be placed into the recess 191. In some cases, the drawstring 131 can be tightened to reduce the size of the channel 125 and the second opening 119 of the fabric 112 so that it fits into the recess 191. In some embodiments, the recess 191 can have an opening 193 through which the drawstring 131 can be passed to the front side of the rear outer housing portion 128. The drawstring 131 can be pulled through the opening 192 to tighten the drawstring 131, which can facilitate keeping the channel 125 in the recess 191 during tightening. A trim piece 192 can at least partially cover the recess 191. The trim piece 192 can have a ridge 194, which can extend into the recess 191. The channel 125 or end of the fabric 112 can be positioned between the ridge 194 of the trip piece 192 and the radially inner end of the recess 191. The fabric 112 can extend between the radially outer end of the recess 191 and the ridge 194, and the fabric 112 can wrap around the ridge 194 to the radially inner side of the ridge 194, in some cases.

Many variations are possible. For example, the fabric 112 can be attached first on the back side of the speaker 100 (e.g., using a support ring in the rear channel 125, and the fabric can be attached to the front side using the drawstring in the front channel 121. The fabric can be secured to the speaker portions by any suitable manner, such as an adhesive, tacks, clamps, screws, other fasteners, etc. The fabric 112 can be coupled to any suitable portion of the speaker 112, such as to the front inner housing 124, to the rear inner housing 125, to the front outer housing 126, to the rear outer housing 128, to the front cover 108, to the rear cover 110, to a trim piece, or any other suitable component, or any combinations thereof.

The fabric 112 can be made of various types of materials, such as natural or synthetic materials, including cotton, linen, silk, nylon, acrylic, rayon, polyester, Polyethylene Terephthalate (PET), Polyethylene (HDPE), other polymers or plastics. In some embodiments, the fabric 112 can be made of Polyethersulfone (PES). In some embodiments, the fabric 112 can be made of recycled plastic, such as recycled ocean plastic. The material can be used to form yarn, which can be knitted to form the shape of the fabric 112. In some cases, seamless knitting can be used to form the fabric without a seam 113. The fabric 112 can have acoustic transparency that produces acoustic loss across 100 Hz to 20 kHz that is less than about 6 dB, less than about 5 dB, less than about 4 dB, less than about 3.5 dB, less than about 3 dB, less than about 2.5 dB, less than about 2.25 dB, less than about 2 dB, less than about 1.75 dB, less than about 1.5 dB, less than about 1.25 dB, or less than about 1 dB, or any values therebetween, or any ranges between any of these values, although other configurations can be used. The stretching of the fabric 112 can improve the acoustic transparency of the fabric 112. By way of example the fabric 112 can have a stretch percentage of about 10%, about 20%, about 30%, about 40%, about 50%, about 60%, about 70%, about 80%, about 90%, about 100% (e.g., to double its un-stretched size), or any values therebetween, or any ranges between any of these values, although other configurations can be used in some cases. The fabric 112 can be a heavy weave cloth. Construction of the grill for the speaker 100 can be just the fabric 112. In some implementations, the fabric 112 is not assembled to a frame or other supporting structure that is attached to the speaker 100. Some speakers can use a tube grill with a supporting structure to which the fabric is attached and then the grill assembly is attached to the speaker. The speaker 100 can omit that extra step, as the fabric can be attached directly to the speaker 100 without an intermediate frame or other support piece.

Various different types of yarns were tested for the fabric. Changing the yarn can change the knit outcome (e.g., the size and fit) even if the same pattern or type of stitch is used. In many instances, a minor change in the type of yarn used can cause unpredictable changes in the size of the resulting fabric. Various samples were created using different types of yarn, and the samples were tested for acoustic transparency.

Figure 73A:
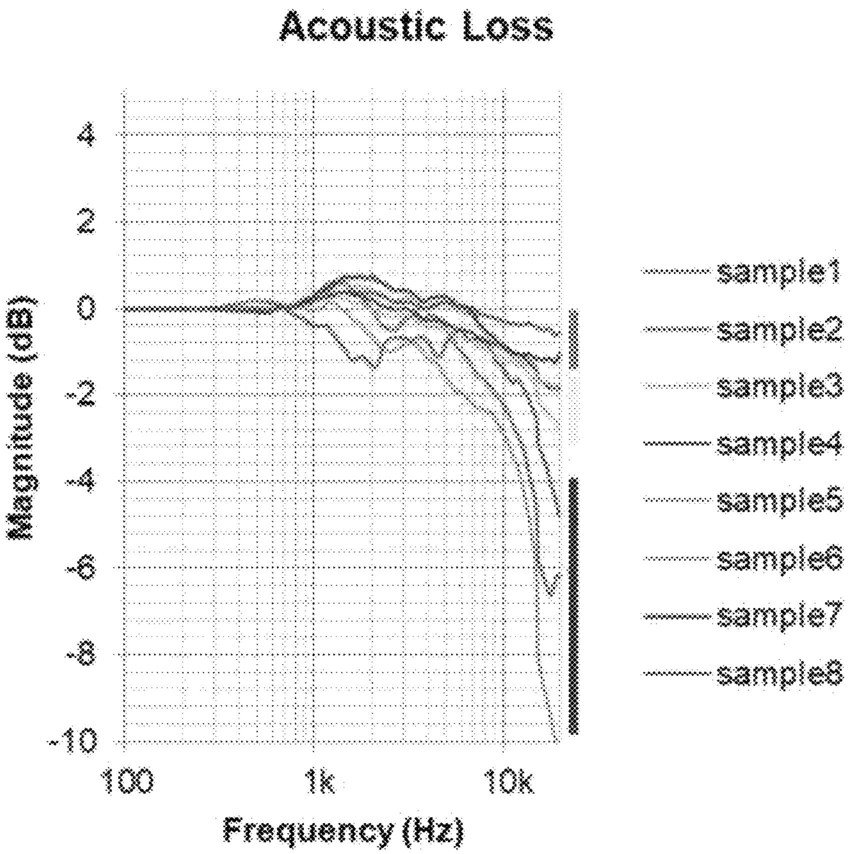
FIG. 73A is a graph showing acoustic loss for various fabrics.
Figure 73B:
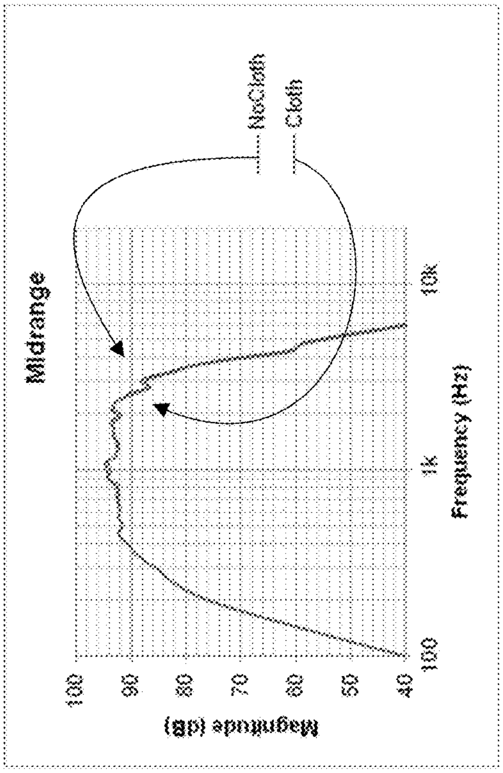
FIG. 73B is a graph comparing the midrange driver output with and without the fabric.
Figure 73C:
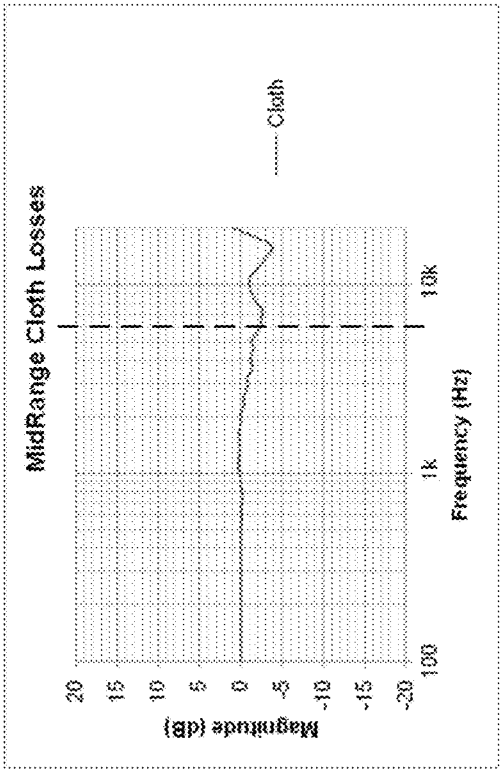
FIG. 73C is a graph showing acoustic loss for the midrange driver from the fabric.
Figure 73D:
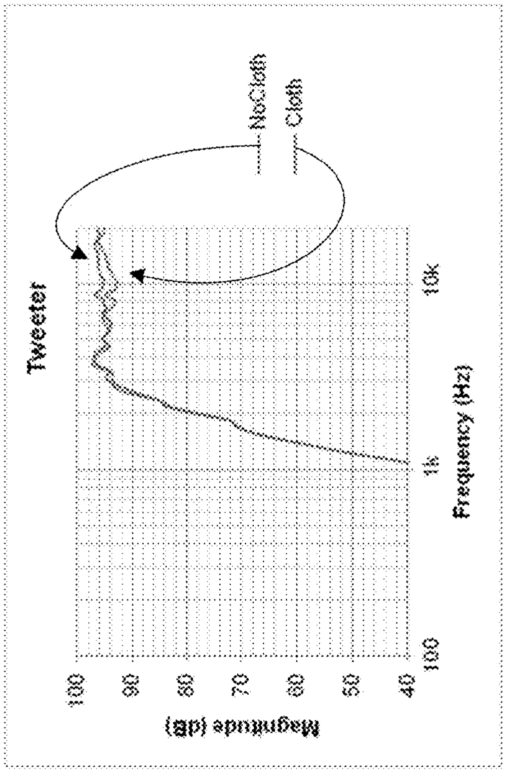
FIG. 73D is a graph comparing the tweeter driver output with and without the fabric.
Figure 73E:
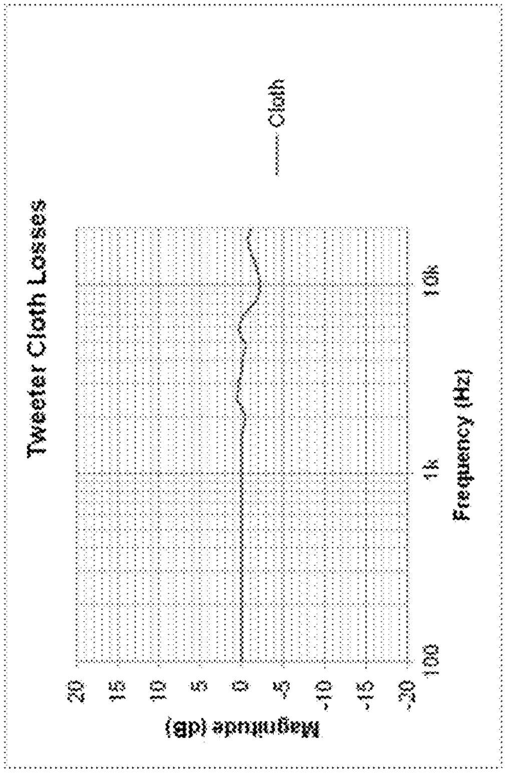
FIG. 73E is a graph showing acoustic loss for the tweeter driver from the fabric.

The graph of FIG. 73A shows an exemplary embodiment of acoustic loss for various fabric samples, with some fabric samples providing more acoustic loss than others. An artisan will recognize from the disclosure herein that such loss can be adjusted, predicted or designed by considering desired weave type and/or material properties, including, for example, cloth thickness and others. FIGS. 73B-73E are graphs showing the acoustic transparency of an example fabric 112 made of Polyethersulfone (PES). FIG. 73B compares the midrange driver output with and without the fabric 112. FIG. 7C shows the acoustic loss for the midrange driver. As shown in FIG. 73B, the midrange driver can output sound below a frequency (e.g., a cross-over frequency), which can be at 6 kHz or lower, for example. FIG. 73C includes a dashed line at 6 kHz, indicating that losses in FIG. 73C to the right of the dashed line (e.g., above 6 kHz) are not realized. In some embodiments, a different (e.g., lower) cross-over frequency can be used. In FIG. 73C, the maximum loss produced by the fabric 112 for the midrange drivers can be less than about 3 dB or less than about 2.5 dB, for example. The peak between 10 kHz and 20 kHz that has a magnitude of about 4 dB can be above the cross-over frequency so that loss is not realized. FIG. 73D compares the high-frequency (e.g., tweeter) driver output with and without the fabric 112. FIG. 7E shows the acoustic loss for the high-frequency driver. The maximum loss produced by the fabric 112 for the high-frequency drivers can be less than about 3 dB, less than about 2.5 dB, less than about 2.25 dB, for example.

As discussed herein, the speaker 100 can include a user interface that enables a user to provide touch input to control the speaker. For example, at least one portion of the housing (e.g., on the front housing portion or front cover 108 and/or on the outer housing portion 106) can have one or more touch sensors, such as capacitive touch elements. The speaker 100 can have a touch-sensitive ring 162, as shown and discussed herein, which can be on the front of the speaker 100, such as on the front housing portion 108 (e.g., at an outer periphery of the front housing portion 108), or on the front outer housing portion 124 (e.g., next to the opening through front outer housing portion 124). The touch sensitive ring 162 can have a capacitive touch sensor, but any suitable type of touch sensor could be used. The touch sensitive ring 162 can receive a tap input (e.g., at a predefined location that is associated with a function, such as play, pause, next track, previous track, volume up, volume down, etc.). In some embodiments, the user can adjust the speaker 100 to set different functions for different touch locations on the ring (e.g., for user-defined functions). In some embodiments, the touch sensitive ring 162 can enable a user to provide input by swiping or dragging a finger along the ring 162. For example, to increase the volume, the user can touch the ring 162 with a finger and drag the finger clockwise along the ring (e.g., along a specific volume control portion of the ring), and to decrease the volume, the user can touch the ring 162 with a finger and drag the finger counter-clockwise along the ring (e.g., along volume control portion of the ring). Various other types of touch inputs can be provided to the speaker. In some embodiments, the touch ring 162 can be configured to receive a pinch input, such as where the user touches two locations on the ring and then drags one or both of the touch locations towards each other. The touch ring 162 can be configured to receive a spread input, such as where the user touches two locations on the ring and then drags one or both of the touch locations away from each other. In some embodiments, the full annular ring 162 can be touch sensitive, while in other embodiments only one or more select portions or arcs can be touch sensitive. In some embodiments, a touch sensitive arc can be used, such as if the ring does not extend around a full 360 degrees. The speaker can include other input elements, such as one or more microphones (e.g., which can be used to receive voice commands).

An artisan will recognize from the disclosure herein that an application executing on virtually any computing device, including a watch, smartphone, tablet, music player, PC, etc., or combinations thereof, can also provide the same or similar control functions for the speaker 100.

The speaker can provide audio and/or visual output, such as for feedback to the user. For example, the speaker can provide audio cues. In some embodiments, the speaker can include one or more lights, which can turn on or off, change color, change intensity, etc. to provide information to the user. The front housing portion can include one or more lights configured to produce a first lighting element. In some embodiments, a plurality of lights 160 can be arranged along a ring (e.g., along the touch sensitive ring 162) and can be independently controlled. In some embodiments, the lights 160 can have the appearance of a plurality of lines or shapes (e.g., diamonds) that extend radially outward on the ring. Various other shapes or configurations of the lights of the first lighting element can be used. The individual lights 160 on the ring 162 can be independently controlled. One or more first lights can be brighter than one or more second lights. The lights can be used to convey information to the user. By way of example, the full ring of lights can pulse brighter to indicate that an input command was received, or to indicate some other event. A bright spot that travels around the ring (e.g., clockwise or counterclockwise), such as to indicate that the speaker is busy or waiting, etc. A number of bright lights can indicate a volume level, or other sound parameters. For example, along the ring or arc segment, 5 adjacent lights can be illuminated or set brighter, whereas 15 lights can be off or set less bright, which can indicate a volume setting of one fourth. When the volume is changed to one half (e.g., by the user touching the ring or arc segment and dragging the finger along the ring or arc segment), 10 lights can be illuminated or brighter and 10 lights can be off or set less bright. Various other audio settings can be adjusted or conveyed to the user in this manner, such as equalization, balance, etc. In some embodiments, the colors and/or brightness of the lights of the first lighting element can be adjusted as a whole or individually.

An artisan will recognize from the disclosure herein that an application executing on virtually any computing device, including a watch, smartphone, tablet, music player, PC, etc., or combinations thereof, can also provide visual and audio output that correspond to the visual and audio output of the speaker.

The front housing portion can include a recess or gap, which can be illuminated by the one or more lights 153, such as to provide a second lighting element. In some embodiments, the colors and/or brightness of the lights of the second lighting element can be adjusted as a whole or individually. FIGS. 42-45 show four examples of different speaker designs, which can have different configurations for the lights, such as different colors and/or intensity of the light 153. The different colors or intensities of the light 153 can be used as an aesthetic feature of the speaker design, in some cases. In some embodiments, the colors and/or brightness of the lights of the second lighting element can be adjusted together as a whole or individually.

The rear housing portion can include a third lighting element 155, such as at the outward periphery of the rear housing. The rear housing portion can have one or more lights, which can be configured to illuminate a ring along the outer periphery of the rear housing portion. The third or rear lighting element 155 can be configured to illuminate an area around the speaker 100 (e.g., by casting light onto a wall positioned behind the speaker 100). In some embodiments, the colors and/or brightness of the lights of the third lighting element can be adjusted as a whole or individually. In some embodiments, the first lighting element, the second lighting element, and/or the third lighting element can be omitted.

Figure 74:
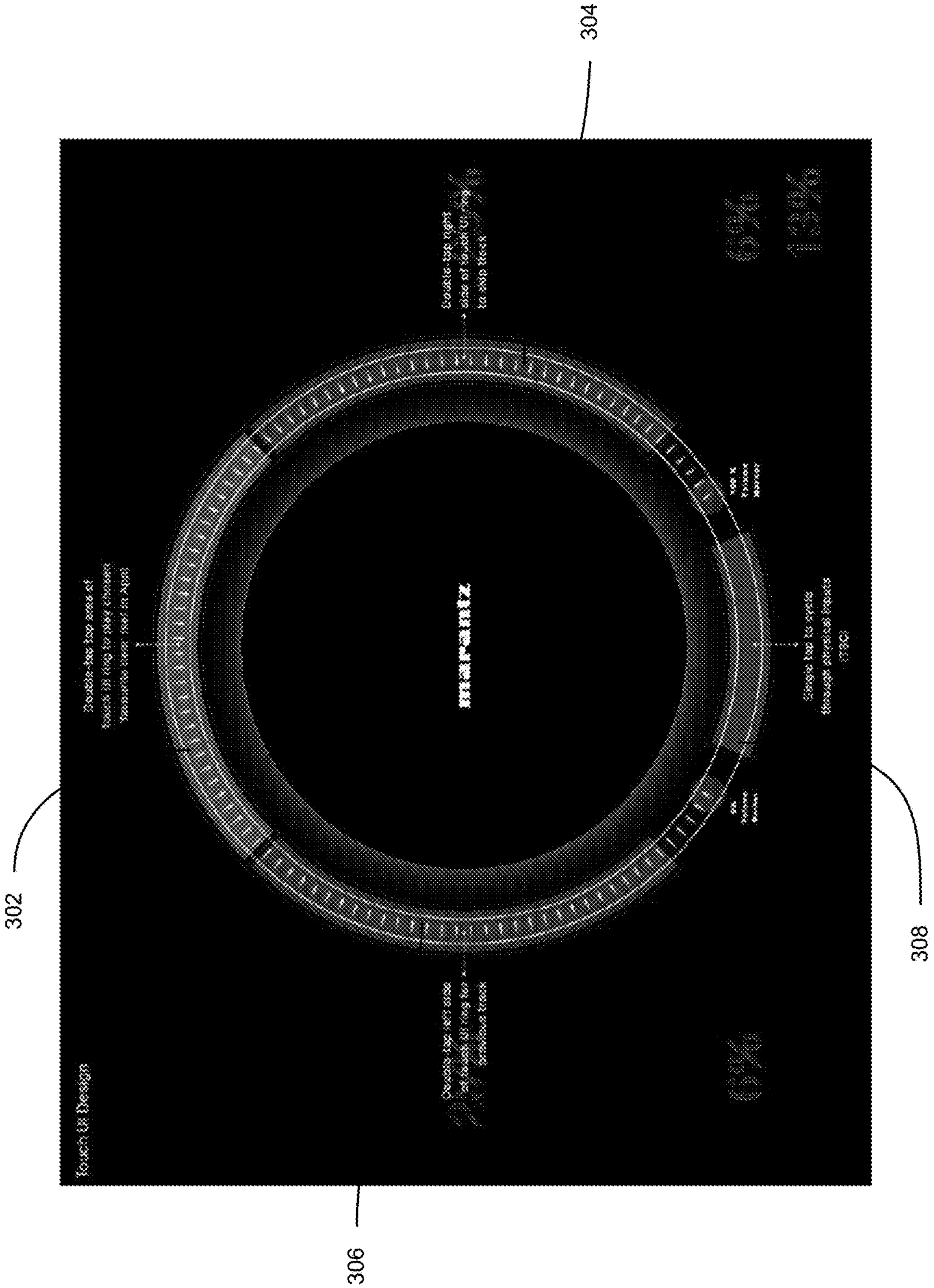
FIG. 74 shows an example user interface for a speaker.

FIG. 74 shows an example embodiments of a touch user interface incorporated into a ring 162. The UI ring 162 may advantageously include any combination of playback controls, volume controls, source audio input controls, additional controls recognizable to an artisan from the disclosure herein, including favorites, playlists, user preferences or lists, party playlists, music type or genre, streaming service, local and/or online library files, combinations of the same or the like. The UI ring 162 of FIG. 74 may also include control of lighting functions, such as a Halo Light 153 that emanates from the core of the speaker, beneath the driver cover 108, where the sound emanates from the front, and/or around the amplifier features on the back. In certain embodiments, some or all of the lights are synchronized to each other, in groups, and/or synchronized to the audio or other content. In some embodiments, the lights may synchronize to time, or some other user-defined rate. In some embodiments, the UI ring may comprise markers. As shown in FIG. 74, the markers may include 120 visual indicators, such as dashes (e.g., lights 160), arranged around the UI ring 162. However, an artisan will recognize from the disclosure herein that more or less dashes could be used or other visual indicators such as gas bars, analog gauges, statistical representations, graphs, lines, shapes, arrows, combinations of the same or the like could be implemented on the UI ring 162. The UI feature 162 can be a circular ring or arc, or any other suitable shape. An artisan will recognize from the disclosure herein that the shape could be a single shape including the disclosed UI rings, other shapes of almost any number of sides, curves, circles, ovals, or the like, a number of the same or different shapes in a grouping or different areas on the speaker housing, combinations of the same or the like.

Figure 75:
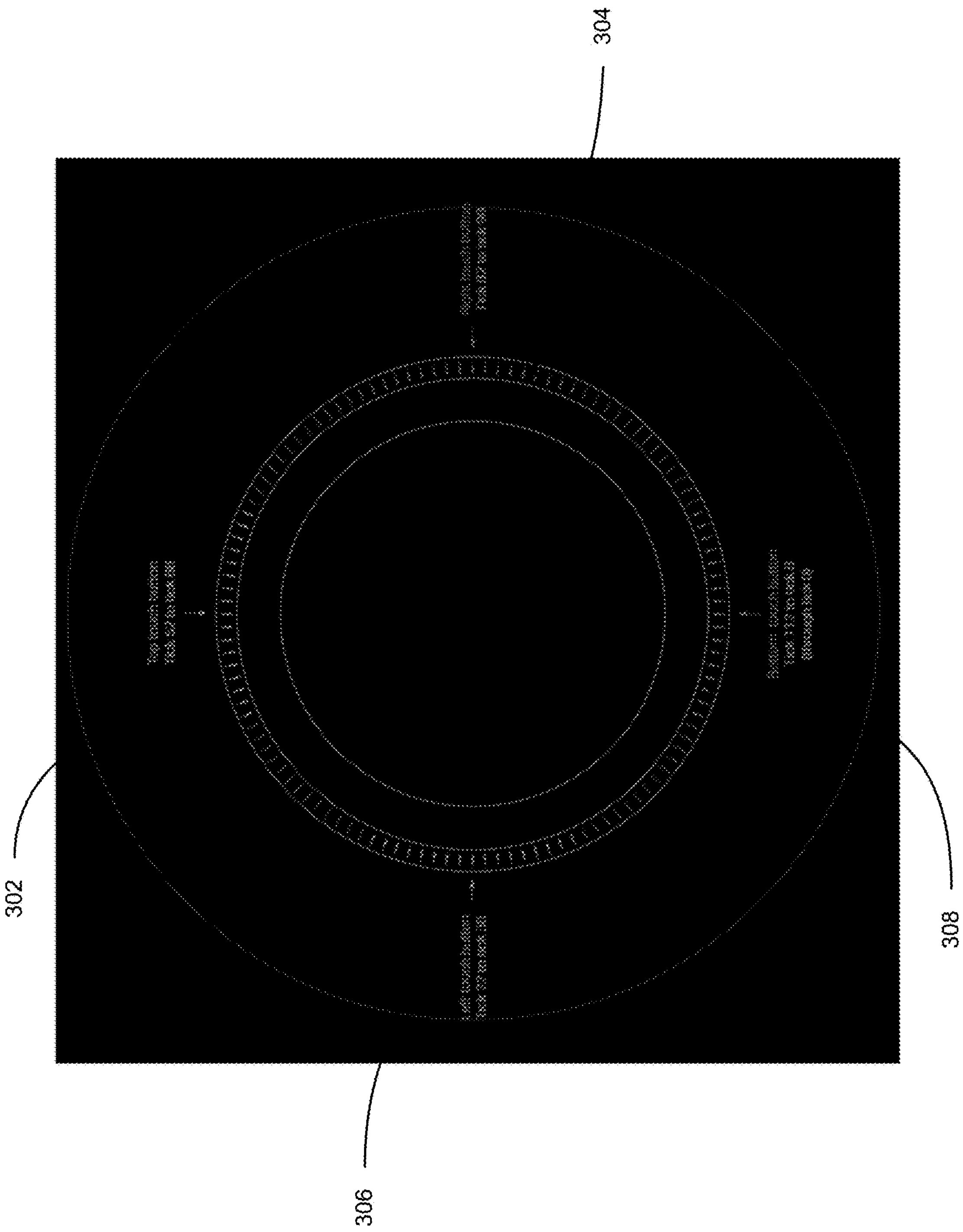
FIG. 75 shows an example user interface for a speaker.
Figure 76:
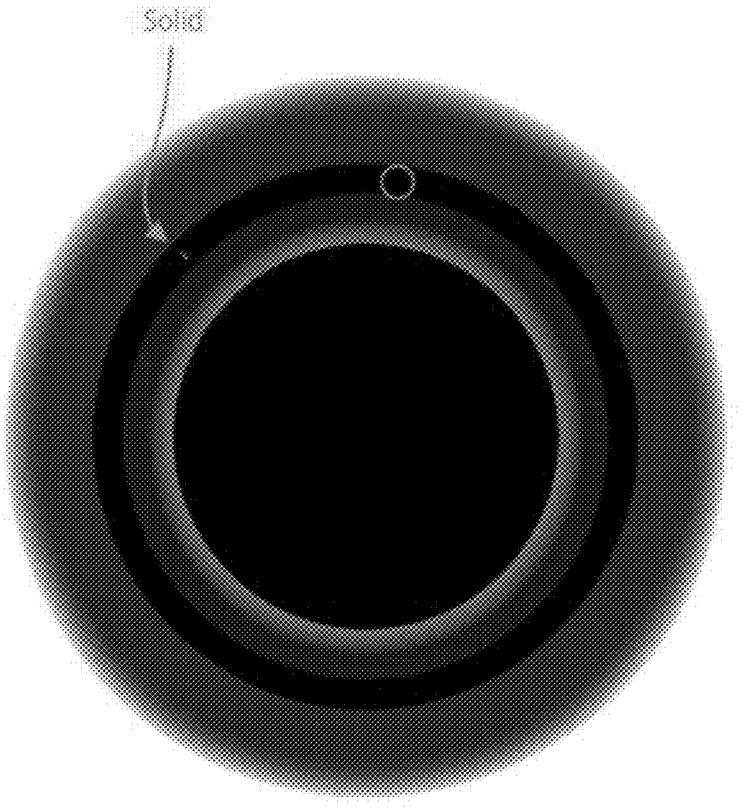
FIG. 76 shows an example user interface for a speaker.
Figure 77:
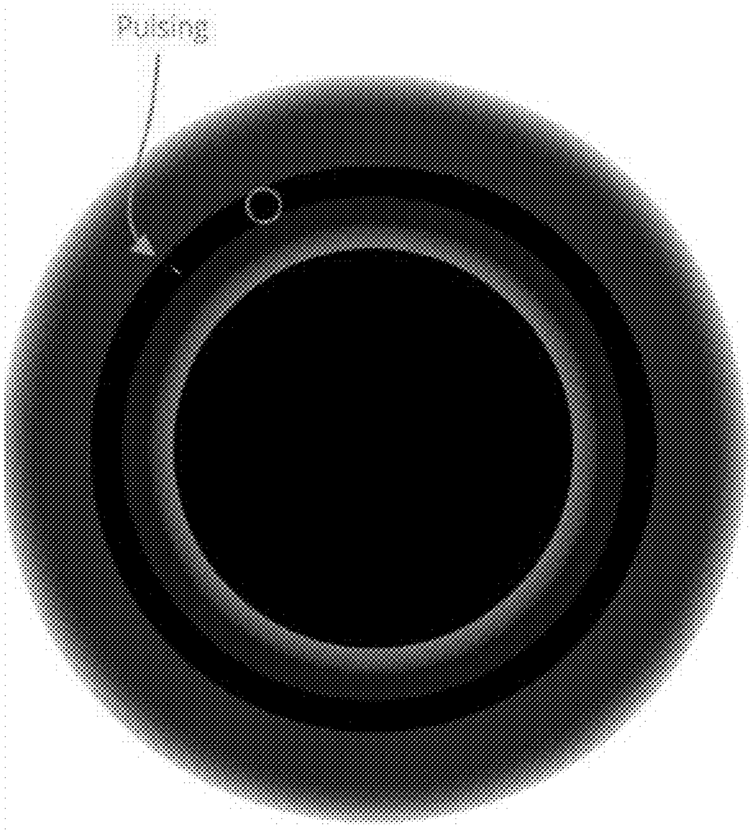
FIG. 77 shows an example user interface for a speaker.
Figure 78:
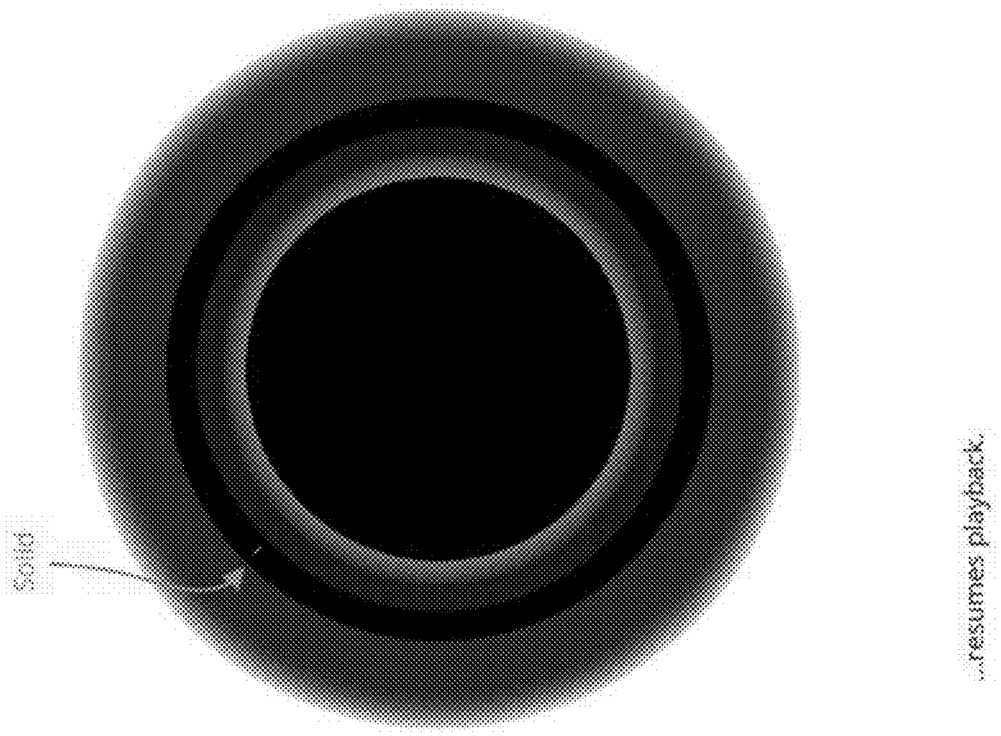
FIG. 78 shows an example user interface for a speaker.
Figure 79:
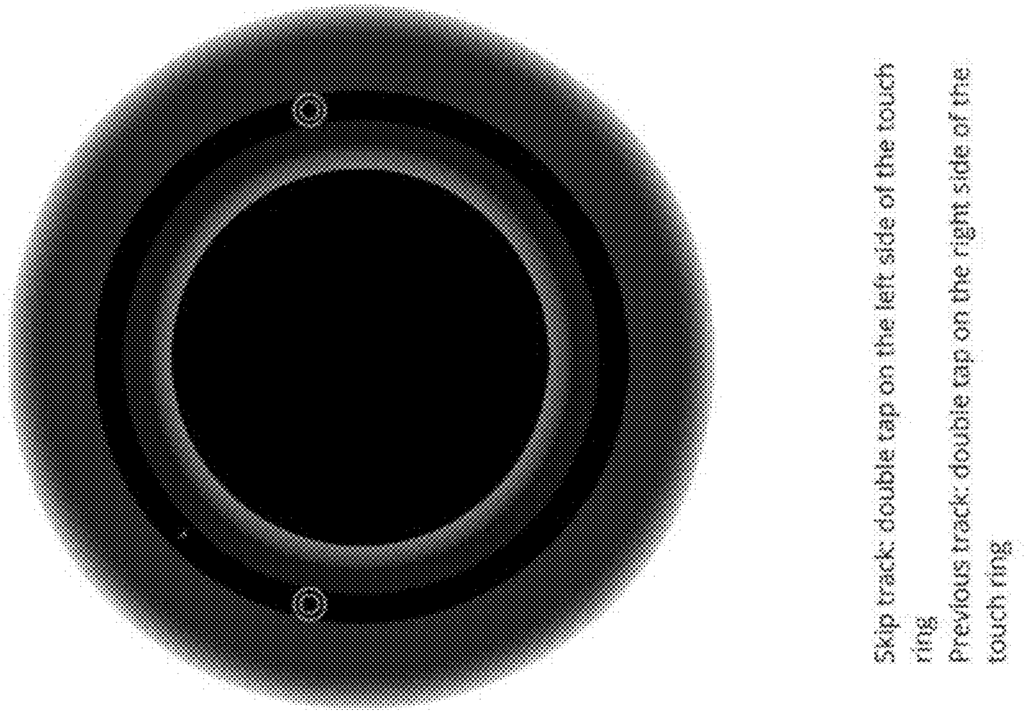
FIG. 79 shows an example user interface for a speaker.

Various types of inputs can be provided to the UI ring 162, and the UI ring 162 can provide various types of information to the user. In some cases, a single tap anywhere (or at a particular location or area) on the UI ring 162 can invoke play or pause of current content (e.g., see FIGS. 76 to 78). In some cases, different portions of the UI ring 162 can have different functions. The UI ring 162 can be divided into different areas that have different functions, such as an upper area 302, a right area 304, a left area 306, and a lower area 308. The UI ring 162 can be divided into 2, 3, 4, 5, 6, 7, 8, 10, 12, 16, or more areas, which can have different functions. The areas can be separated by non-functional portions, which can impede unintended inputs. As discussed herein, the UI ring 162 can include 120 visual indicators (sometimes referred to as ticks), and the disclosure can consider the lowest visual indicator to be tick 0 or 120, and the numbering can progress along a clockwise direction. Tick 30 can be positioned on the most left side, tick 60 can be positioned at the top, and tick 90 can be positioned at the most right side. As can be seen in FIG. 75, the upper touch area 302 can extend from tick 52 to 68, the right touch area 304 can extend from tick 82 to tick 98, the left touch area 306 can extend from tick 22 to tick 38, and the lower tough area can extend from tick 112, though tick 0/120, to tick 8. A double tap to the upper touch area 302 can cause the speaker 100 to play a preselected item (e.g., a favorite item, which can be set using an app or other interface). A double tap on the right touch area 304 can cause the speaker to skip to the next track (e.g., see FIG. 79). A double tap on the left touch area 306 can cause the speaker to go to the previous track (e.g., see FIG. 79). A single tap on the lower touch area 308 can cycle through inputs (e.g., physical inputs) for the speaker. Many variations are possible. The lower touch area 308 can use a double tap input. Any of the touch areas can use a single tap input to perform the function. Various other functions can be performed in response to inputs to the touch areas on the UI ring 162. In some implementations, a touch (e.g., single tap) to the upper touch area 302 can toggle between play and pause. A touch to the left touch area 304 can advance to the next track, if available. A touch to the right touch area 306 can change to the previous track, if available. A touch to the lower touch area 308 can play a pre-selected audio (e.g., a favorite selected via an app or other interface), and in some cases multiple touches can cycle through pre-selected audio. In some cases, touching multiple touch areas simultaneously can cause the speaker to implement other functions. For example, touching the left touch area 306 and the right touch area 304 can cause the speaker to save a log. Touching the upper touch area 302 and the lower touch area 308 can cause the speaker 100 to enter a mode to interfacing with a wireless device. Various other functions can be similarly implemented.

Figure 80:
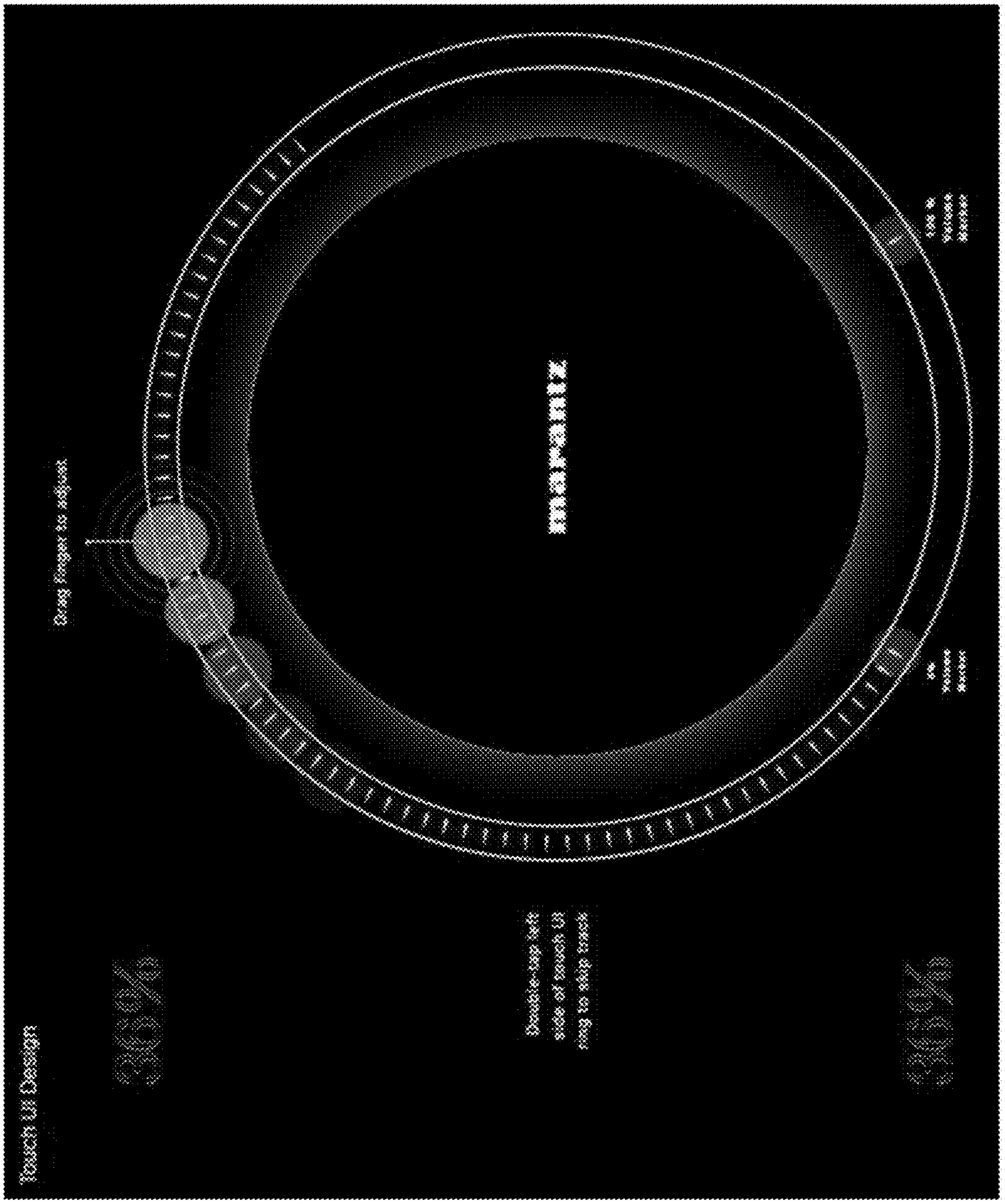
FIG. 80 shows an example user interface for a speaker.

In some cases, the UI ring 162 can indicate the volume level of the speaker 100. There are 120 ticks, or visual indicators, arranged around the UI ring 162. Between minimum and maximum volume levels there are 100 LED dashes, and each dash can represent an amplifier volume step. These markers are also used for various UI states, as discussed herein. By way of example, the user can swipe to adjust the volume level (e.g., anywhere on the UI ring 162), as can be seen in FIG. 80. The user can see feedback via the LED markers on the UI ring 162. The first tick, representing a volume level of 0% can be located at tick 10 and the last tick representing a volume level of 100% can be located at tick 110, if the ticks are counted clockwise with tick 0 being the bottom most tick.

Figure 81:
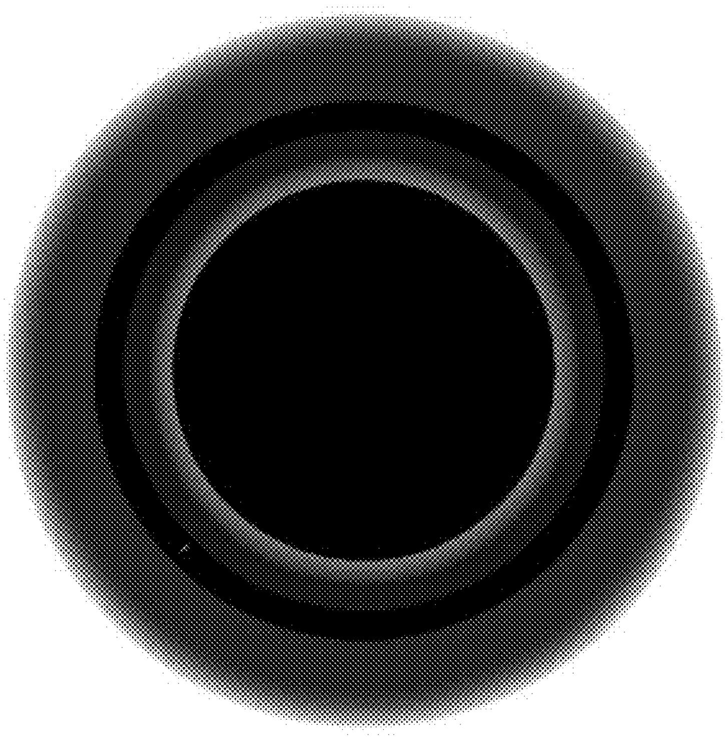
FIG. 81 shows an example user interface for a speaker.
Figure 82:
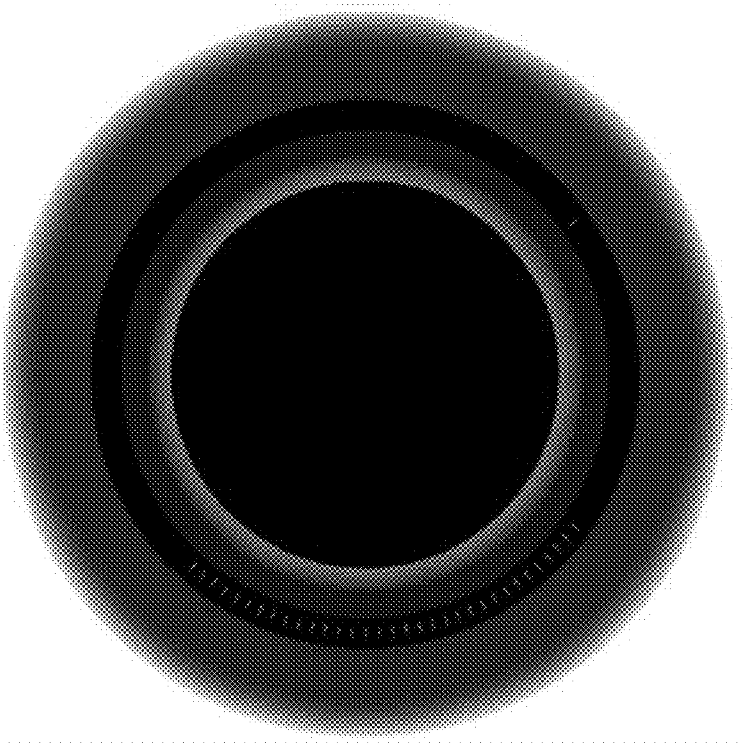
FIG. 82 shows an example user interface for a speaker.

In a sleep mode and/or a normal playback mode, the UI ring 162 can show the current volume level with a single illuminated tick, as shown in FIG. 81. The sleep state can be used when the user is not detected (e.g., within a set distance) by a proximity sensor on the speaker 100, and/or when the UI ring 162 is not being used, and/or after a set amount of time after being controlled (e.g., by the speaker UI and/or by an external device). In a wake or active mode, the UI ring 162 can show the current volume level by illuminating all the ticks from zero to the current volume level, as shown in FIG. 82. The tick associated with the maximum volume level can be illuminated as well, in some cases. The wake state can be used when the UI ring 162 is being used, when the proximity sensor has been triggered (e.g., within a set distance), and/or when the speaker 100 is being controlled (e.g., locally or remotely).

Figure 83:
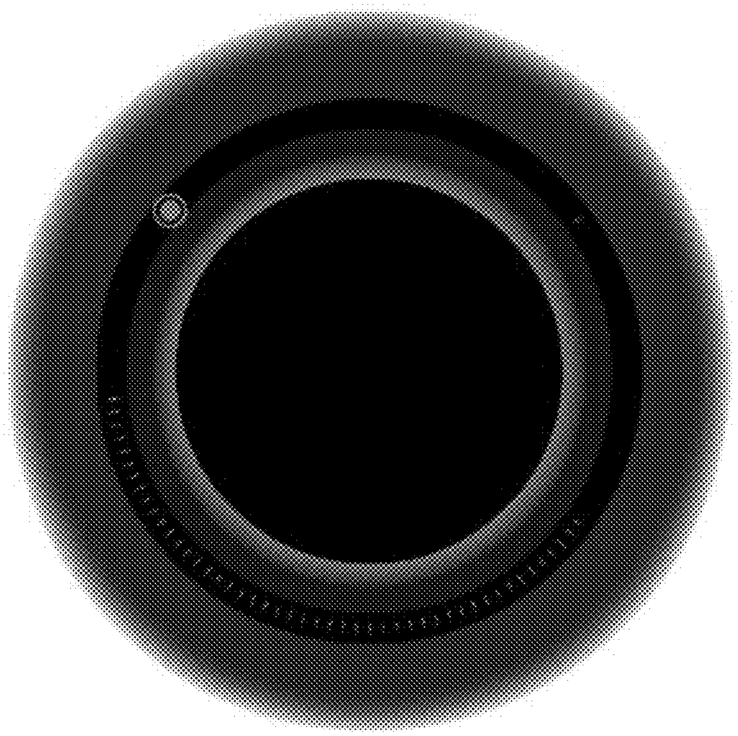
FIG. 83 shows an example user interface for a speaker.
Figure 84:
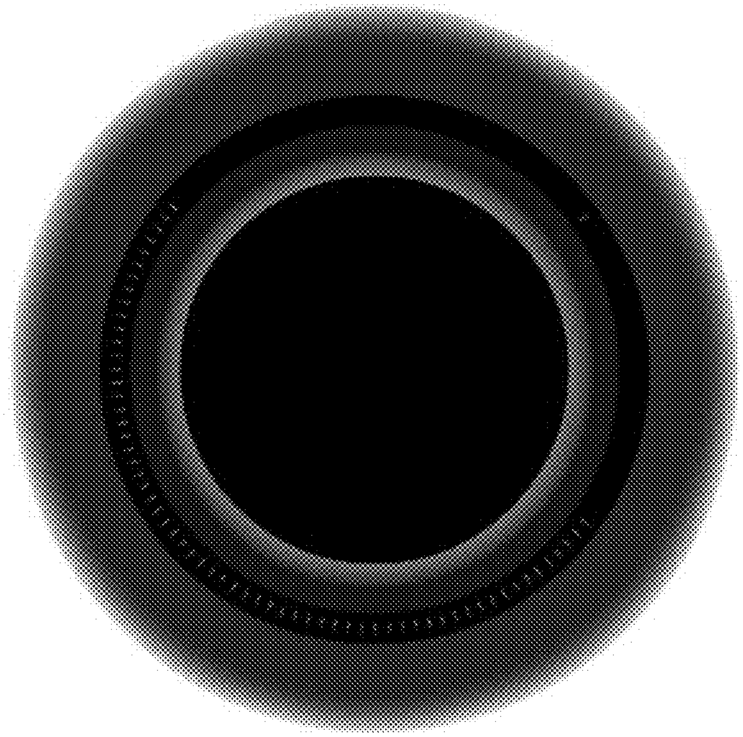
FIG. 84 shows an example user interface for a speaker.
Figure 85:
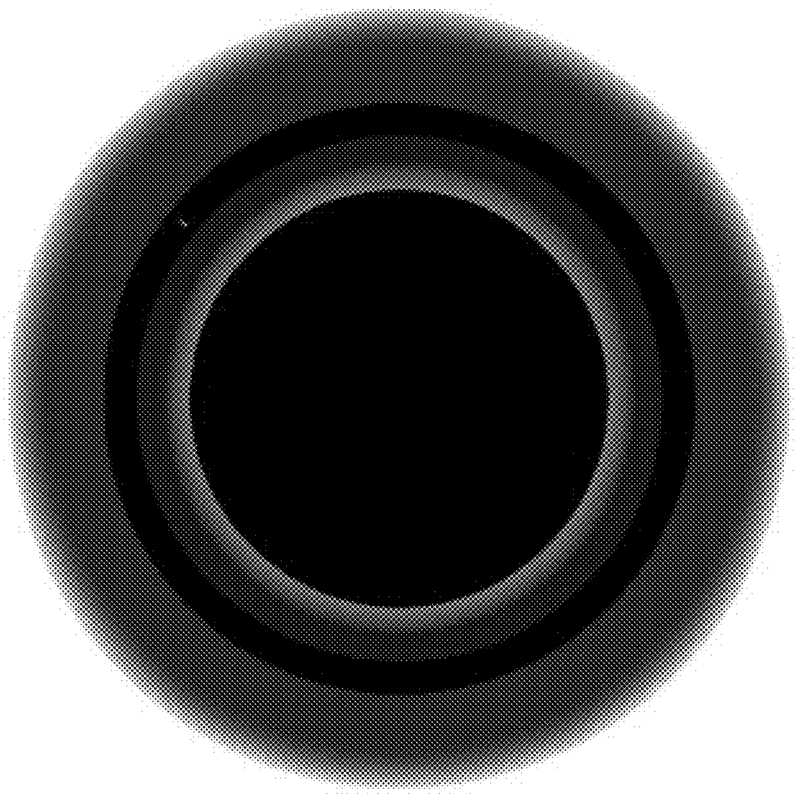
FIG. 85 shows an example user interface for a speaker.
Figure 87:
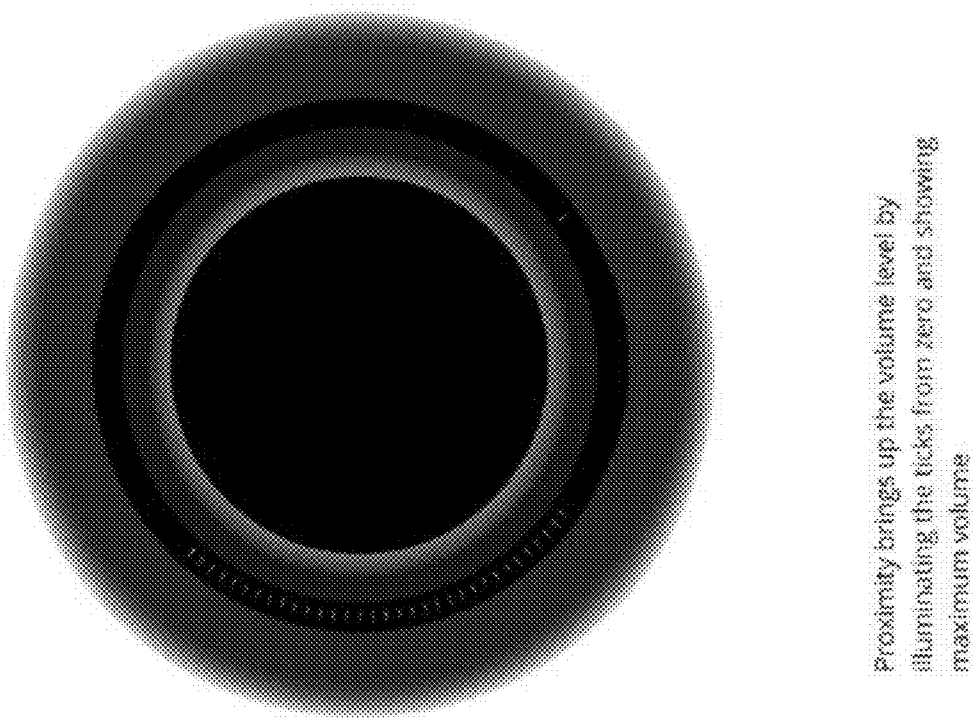
FIG. 87 shows an example user interface for a speaker.
Figure 86:
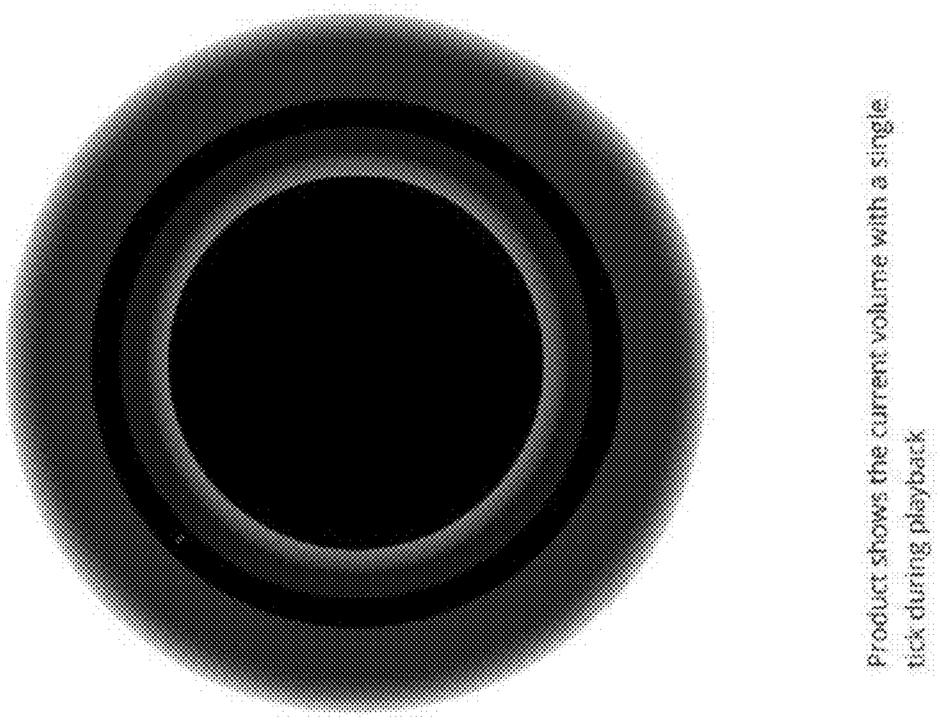
FIG. 86 shows an example user interface for a speaker.
Figure 88:
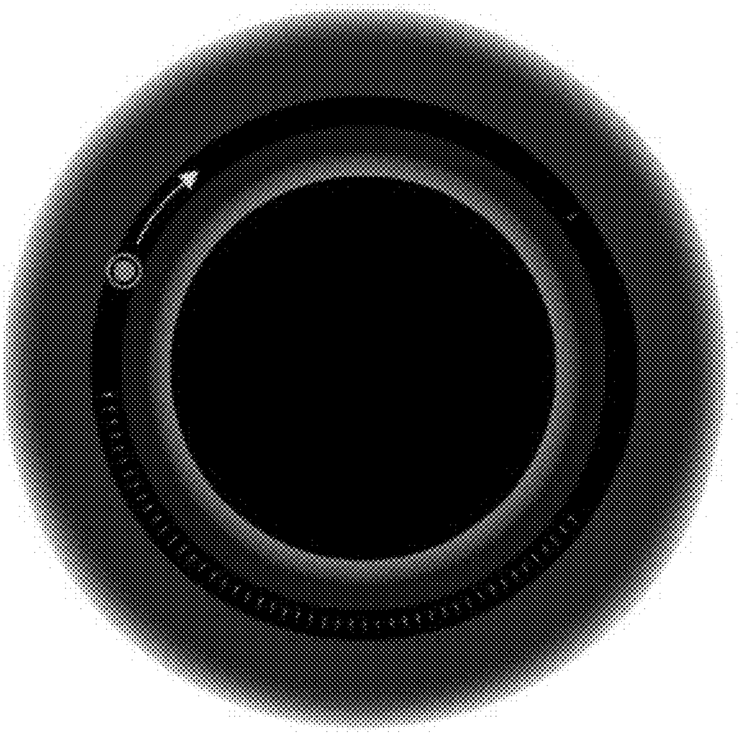
FIG. 88 shows an example user interface for a speaker.
Figure 89:
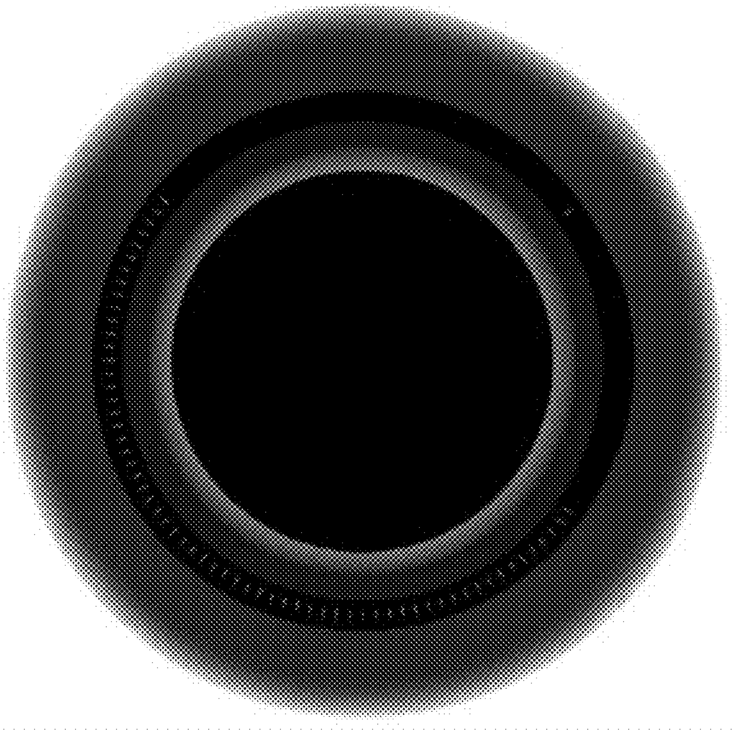
FIG. 89 shows an example user interface for a speaker.
Figure 90:
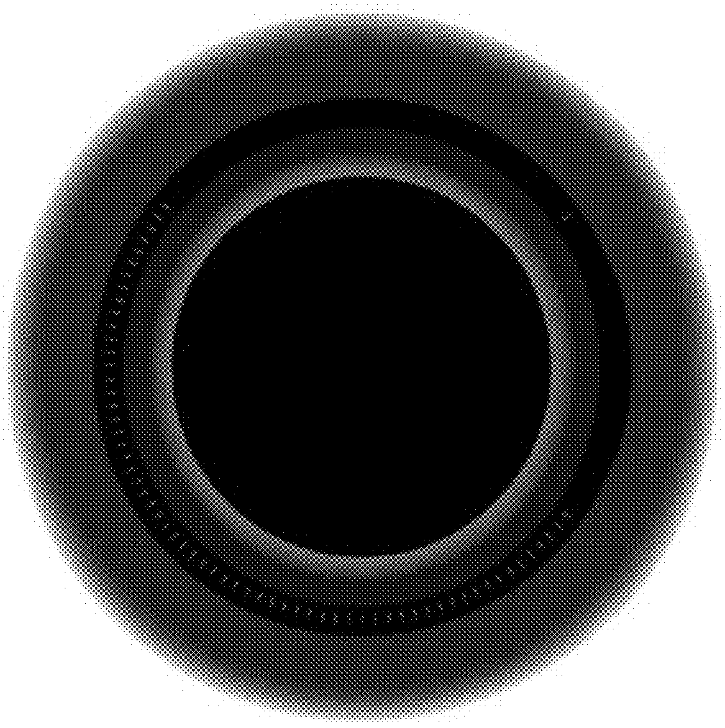
FIG. 90 shows an example user interface for a speaker.
Figure 91:
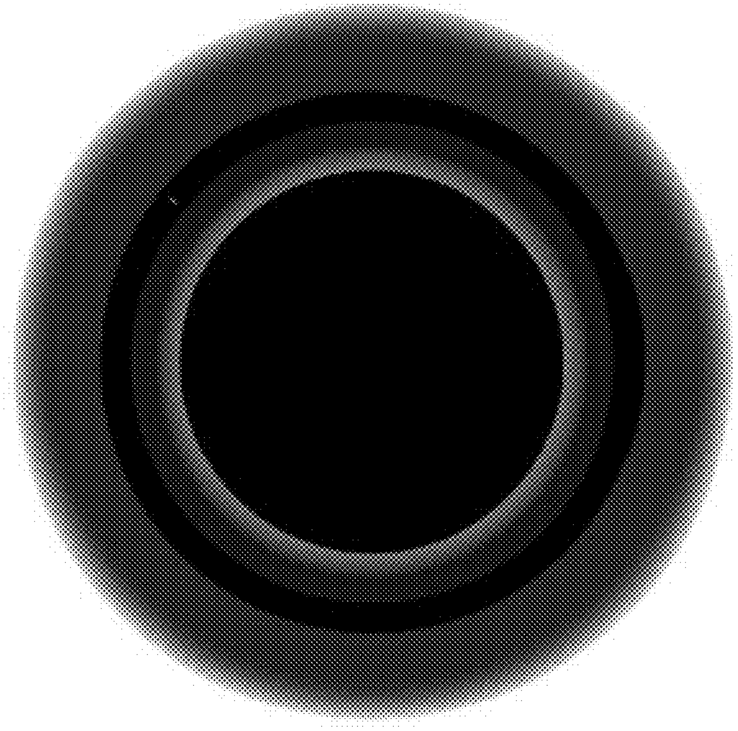
FIG. 91 shows an example user interface for a speaker.

The volume can be adjusted by touching the UI ring 162 (e.g., in the area between the volume 0 and volume 100 ticks). With reference to FIGS. 83 to 85, if the user holds for more than a set time (e.g., 0.5 seconds), the volume will start to increment from its current level to that of the users touch position (e.g., by 1 every 0.075 seconds, although other values could be used). When the user stops touching the UI ring 162, the volume will stay at its current position and does not continue incrementing to the last touch point.

With reference to FIGS. 86 to 91, if the user moves their finger while still touching the UI ring 162, the target volume level can change to correspond to the new touch point. In some cases, the user can touch the UI ring on the current volume level marker and can move their finger along the UI ring 162, and the volume level can track the touch position until the user stops touching the UI ring 162.

Figure 92:
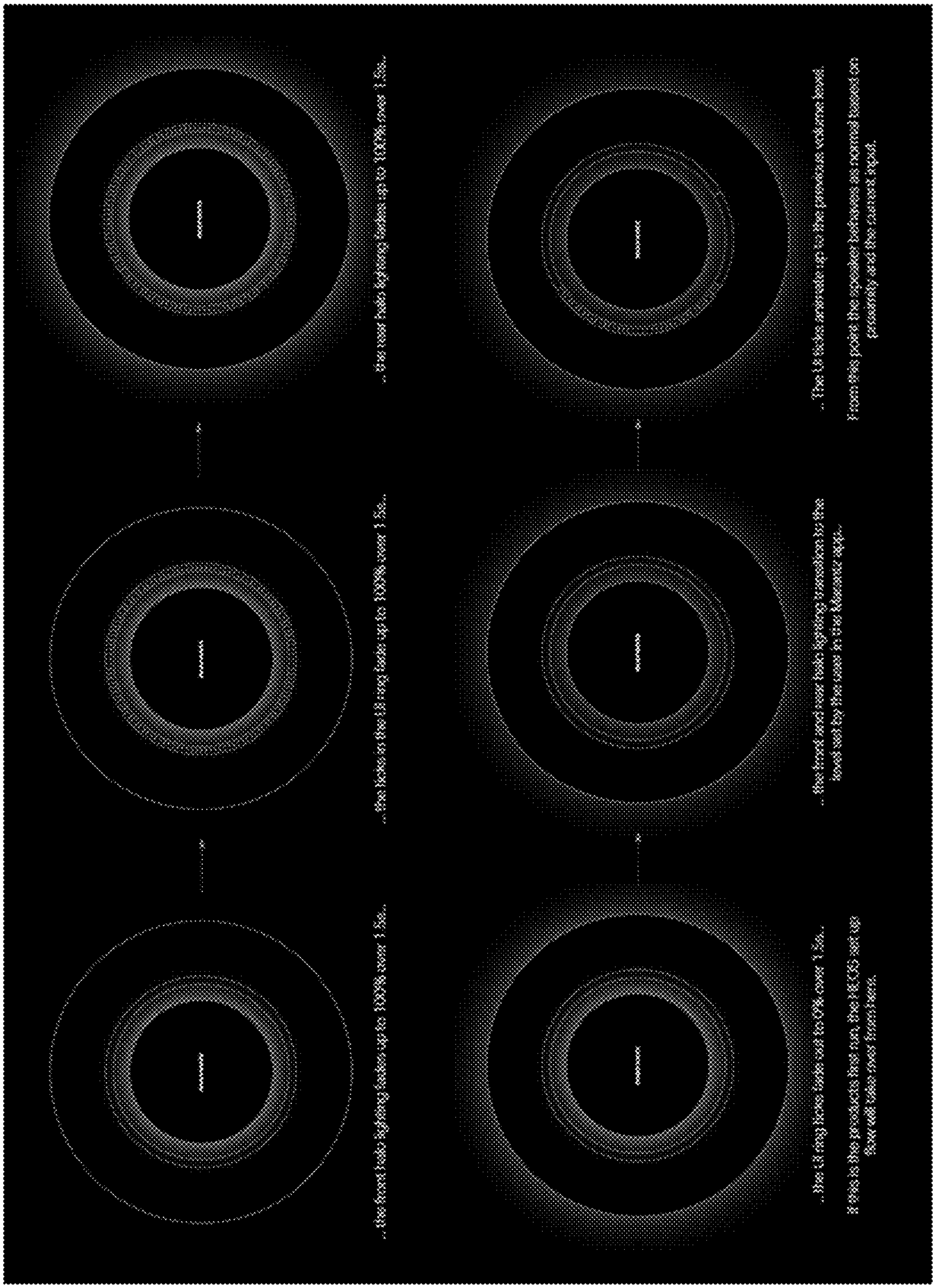
FIG. 92 shows different lighting states for an example speaker.

With reference to FIG. 92, in some cases, the speaker 100 can perform a lighting operation, such as when the speaker 100 is turned on, wakes up, or senses a user (e.g., with a proximity detector). The lighting sequence can be used during a loading phase. The lighting sequence can be an indicator that the speaker 100 is on, but that it is not ready to respond to normal inputs. First, the light 153 at the front of the speaker 100 can illuminate (e.g., fading up over a set time, such as from 0% to 100% brightness over 1.5 seconds). Then, the lights 160 on the UI ring 162 can illuminate (e.g., fading up over a set time, such as from 0% to 100% brightness over 1.5 seconds). Then the rear light 155 can illuminate (e.g., fading up over a set time, such as from 0% to 100% brightness over 1.5 seconds). The rear light 155 can illuminate an area around the speaker 100, in some cases. The lighting sequence can have the effect of the light beginning in the center of the speaker 100 and progressing outward, as can be seen in FIG. 85. In some cases, the lights 160 on the UI interface 162 can turn of (e.g., by fading over time, such as over 1.5 seconds). The front light 153 and the rear light 155 can then transition to the normal operating brightness level, which can be set by a user in some cases (e.g., using the app). In some cases, then UI ring 162 can then illuminate to show the current or previous volume setting. In some cases, the brightness of the front light 153, of the rear light 155, and/or of the lights on the UI ring 162 can be modified (e.g., using the an app or other interface device).

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A speaker comprising:

an outer housing portion that substantially conforms to the shape of a spheroid having an axis of rotation that is substantially horizontal;

a first driver positioned facing forward in a direction that is substantially parallel with the axis of rotation;

a plurality of additional drivers that are distributed around the first driver, wherein each of the plurality of additional drivers partially faces forward and is angled partially outward away from the axis of rotation;

a front cover positioned in front of the first driver, wherein the front cover is suspended with an annular gap between the outer housing portion and the front cover;

a front light configured to illuminate the annular gap between the outer housing portion and the front cover; and a user interface ring that includes a plurality of lights arranged along a circle that is concentric with the annular gap, wherein the lights are individually controllable to convey information to a user, wherein the first driver and the plurality of additional drivers incorporate at least one of a group consisting of at least one neodymium magnets, a paper cone diaphragm, a silk dome tweeter, carbon fiber, and combinations thereof.

2. The speaker of claim 1, wherein the first driver is a sub-woofer.

3. The speaker of claim 2, wherein the plurality of additional drivers includes at least two mid-range drivers, and at least two tweeters.

4. The speaker of claim 1, wherein an axis of the first driver is substantially collinear with the axis of rotation.

5. The speaker of claim 1, wherein each of the plurality of additional drivers is angled relative to the axis of rotation by an angle between about 30 degrees and about 60 degrees.

6. The speaker of claim 1, wherein each of the plurality of additional drivers is angled relative to the axis of rotation by an angle between about 40 degrees and about 50 degrees.

7. The speaker of claim 1, wherein a front surface of the front cover can substantially conform to the shape of the spheroid.

8. The speaker of claim 1, wherein the user interface ring is touch sensitive to receive touch inputs.

9. The speaker of claim 8, wherein the user interface ring is configured to indicate a current volume level by illuminating one of the lights that corresponds to the current volume level.

10. The speaker of claim 8, wherein a subset of the lights on the user interface ring correspond to an available volume range, and wherein the user interface ring is configured to indicate a current volume level by illuminating one of the lights that corresponds to the current volume level and by also illuminating the lights that correspond to volume levels lower than the current volume level.

11. The speaker of claim 10, wherein the user interface ring is configured to also illuminate the light that corresponds to a maximum volume level.

12. The speaker of claim 1, wherein the outer housing portion is covered with a fabric covering.

13. The speaker of claim 12, wherein the fabric covering is a seamless knitted fabric.

14. The speaker of claim 12, wherein the fabric covering includes a first opening at a front end, and a second opening at a back end.

15. The speaker of claim 12, wherein the fabric covering includes a first channel at the front end.

16. The speaker of claim 15, comprising a ring that extends through the first channel.

17. The Speaker of claim 1, further comprising a rear light configured to illuminate a rear of the speaker.

18. The Speaker of claim 1, further comprising a reflective ring disposed in the annular gap, wherein the reflective ring is positioned to reflect light from the front light.

19. The Speaker of claim 1, comprising a controller to adjust the color and/or intensity of the plurality of lights to convey information to the user.

20. The Speaker of claim 1, wherein the user interface ring includes at least 70 individually controllable lights arranged along the circle.

* * * * *